United States Patent
Yang et al.

(10) Patent No.: US 10,026,009 B2
(45) Date of Patent: Jul. 17, 2018

(54) METHODS AND SYSTEMS FOR DETERMINING A PERCEPTUAL SIMILARITY BETWEEN IMAGES

(71) Applicant: BicDroid Inc, Petersburg (CA)

(72) Inventors: En-Hui Yang, Petersburg (CA); Xiang Yu, Kitchener (CA); Jin Meng, Kitchener (CA)

(73) Assignee: BicDroid Inc, Petersburg (CA)

( * ) Notice: Subject to any disclaimer, the term of this patent is extended or adjusted under 35 U.S.C. 154(b) by 36 days.

(21) Appl. No.: 15/168,326

(22) Filed: May 31, 2016

(65) Prior Publication Data

US 2016/0275370 A1 Sep. 22, 2016

Related U.S. Application Data

(63) Continuation of application No. 14/221,948, filed on Mar. 21, 2014.

(51) Int. Cl.
*G06K 9/62* (2006.01)
*G06K 9/46* (2006.01)
(Continued)

(52) U.S. Cl.
CPC ......... *G06K 9/6212* (2013.01); *G06K 9/4642* (2013.01); *G06K 9/6206* (2013.01);
(Continued)

(58) Field of Classification Search
None
See application file for complete search history.

(56) References Cited

U.S. PATENT DOCUMENTS

2007/0133889 A1\* 6/2007 Horie ............... H04N 19/176
                                              382/232
2008/0152225 A1\* 6/2008 Iwamoto ............ G06K 9/4642
                                              382/190
(Continued)

OTHER PUBLICATIONS

E.-H. Yang and X. Yu, "Soft decision quantization for H.264 with main profile compatibility", IEEE Trans. Circ. Syst. for Video Tech., vol. 19, No. 1, pp. 122-127, Jan. 2009.
(Continued)

*Primary Examiner* — Sumati Lefkowitz
*Assistant Examiner* — Jiangeng Sun
(74) *Attorney, Agent, or Firm* — Bereskin & Parr LLP/S.E.N.C.R.L., s.r.l.

(57) ABSTRACT

Systems, methods and computer program products for determining perceptual similarity between independent images are described. The described systems, methods and computer program products use a similarity distance to determine the perceptual similarity between a first image having a first arrangement of pixels and a second image having a second arrangement of pixels. A processor can determine a first image array corresponding to the first arrangement of pixels and a second image array corresponding of the second arrangement of pixels. The processor can generate a first pixel group set based on the first image array and a second pixel group set based on the second image array. A plurality of pixel group pairs can be generated, and each pixel group pair can be associated with a corresponding pixel group pair distortion. The similarity distance between the first image and the second image can be determined based on the plurality of pixel group pair distortions.

8 Claims, 17 Drawing Sheets

(51) Int. Cl.
    *G06K 9/36*     (2006.01)
    *G06T 7/00*     (2017.01)
    *H04N 1/60*     (2006.01)

(52) U.S. Cl.
    CPC ......... *G06K 9/6215* (2013.01); *G06K 9/6297* (2013.01); *G06T 7/0002* (2013.01); *H04N 1/6027* (2013.01); *G06K 2009/363* (2013.01); *G06K 2009/366* (2013.01); *G06T 2207/20012* (2013.01); *G06T 2207/30168* (2013.01)

(56) References Cited

U.S. PATENT DOCUMENTS

2011/0075935 A1\*   3/2011   Baqai .................. G06T 7/0002
                                                                      382/195
2016/0078584 A1\*   3/2016   Song ................... G06T 7/0002
                                                                        382/100

OTHER PUBLICATIONS

E. Chalom, E. Asa, and E. Biton, "Measuring image similarity: An overview of some useful application", IEEE Instrumentation and Measurement Magazine, vol. 16, No. 1, pp. 24-28, Feb. 2013.
R. Datta, D. Joshi, J. Li, and J. Wang, "Image retrieval: Ideas, influences, and trends of the new age", ACM Computing Surveys, vol. 40, No. 2, Article 5, pp. 1-60, Apr. 2008.
O. Chapelle, P. Haffner, and V. Vapnik, "Support vector machines for histogram-based image classification", IEEE Trans. on Neural Networks, vol. 10, No. 5, pp. 1055-1064, Sep. 1999.
A. Barla, F. Odone, and A. Verri, "Histogram intersection kernel for image classification", Proc. of the 2003 Int. Conf. on Image processing, vol. 3, pp. 513-516, Sep. 2003.
D. G. Lowe, "Distinctive image features from scale-invariant keypoints", Int. Journal of Computer Vision, 60, 2, pp. 91-110, Jan. 2004.
T. Lindeberg, "Scale invariant feature transform", Scholarpedia, 7 (5): 10491, May 2012.
A. Vedaldi, "An implementation of SIFT detector and descriptor".
L. Kang, C. Hsu, H. Chen, C. Lu, C. Lin, and S. Pei, "Feature-based sparse representation for image similarity assessment" IEEE Trans. on Multimedia, vol. 13, No. 5, pp. 1019-1030, Oct. 2011.
H. Ling, K. Okada, "An efficient earth mover's distance algorithm for robust histogram comparison", IEEE Trans. on Pattern Analysis and Machine Intelligence, vol. 29, No. 5, pp. 840-853, May 2007.
G. Wang, D. Hoiem, and D. Forsyth, "Learning image similarity from Flickr groups using fast kernel machines", IEEE Trans. on Patern Analysis and Machine Interlligence, vol. 34, No. 11, pp. 2177-2188, Nov. 2012.
J. Huang, S. Kumar, M. Mitra, W.J. Zhu, and R. Zabih, "Spatial color indexing and applications", Int. Journal of Computer Vision, 35(3), pp. 245-268, 1999.
C. Ponce and A. Singer, "Computing steerable principle components of a large set of images and their rotations", IEEE Trans. on Image Processing, vol. 20, No. 11, pp. 3051-3062, Nov. 2011.
T. Wiegand, G. J. Sullivan, and A. Luthra. "Draft itu-t rec. h.264/ iso/iec 14496-10 avc". Joint Video Team of ISO/IEC MPEG and ITU-T VCEG, 2003.
G.J. Sullivan; J.-R. Ohm; W.-J. Han; T. Wiegand , "Overview of the high efficiency video coding (HEVC) standard", IEEE Trans. on Circ. Syst. for Video Tech, vol. 22, No. 12, pp. 1649-1668, Dec. 2012.

Z. Wang, A. C. Bovik, H. R. Sheikh and E. P. Simoncelli, "Image quality assessment: From error visibility to structural similarity," IEEE Trans. on Image Processing, vol. 13, No. 4, pp. 600-612, Apr. 2004.
Harold W. Kuhn, "The Hungarian method for the assignment problem", Naval Research Logistics Quarterly, 2:83-97, 1955.
J. Munkres, "Algorithms for the assignment and transportation problems", Journal of the Society for Industrial and Applied Mathematics, 5(1):32-38, Mar. 1957.
J. Edmonds. "Maximum matching and a polyhedron with 0-1 vertices", Journal of Research at the National Bureau of Standards, 69B:125-130, 1965.
E.-H. Yang, X. Yu, J. Meng, and C. Sun, "Transparent composite model for DCT coefficients: Design and analysis", IEEE Trans. on Image Processing, vol. 23, No. 3, pp. 1303-1316, Mar. 2014.
E.-H. Yang and X. Yu, "Transparent composite model for large scale image/video processing", Proc. of the 2013 IEEE conference on BigData, Santa Clara, CA, Oct. 6-9, pp. 38-44, 2013.
Y. Rubner, C. Tomasi, L. J. Guibas, "A metric for distributions with applications to image databases", Proc. of the 1998 ICCV, Bombay, India, pp. 59-66, 1998.
Y. Rubner, C. Tomasi, and L. J. Guibas, "The earth mover's distance as a metric for image retrieval", Int. Journal of Computer Vision, 40(2), pp. 99-121, 2000.
O. Pele, and M. Werman, "Fast and robust earth mover's distances", Proc. of the 2009 ICCV, Kyoto, Japan, pp. 460-467, Sep. 2009.
J. Schwartz, A. Steger, and A. Weibl, "Fast algorithms for weighted bipartite matching", Lecture Notes in Computer Science, vol. 3503, pp. 476-487, 2005.
Vladimir Kolmogorov, "Blossom V: A new implementation of a minimum cost perfect matching algorithm." Mathematical Programming Computation, 1(1):43-67, Jul. 2009.
H. Jegou, M. Douze and C. Schmid "Hamming embedding and weak geometry consistency for large scale image search", Proc. of the 10th European conference on Computer vision, Marseille, France, Oct. 12-18, pp. 304-317, 2008.
W. K. Pratt, Digital Image Processing (fourth edition). John Wiley & Sons, Inc., 2007.
C. Villani, Optimal Transportation Old and New. Grundlehren der mathematischen Wissenschaften, vol. 338, 2009.
M. Lew, N. Sebe, C. Djeraba, and R. Jain, "Content-based multimedia information retrieval: State of the art and challenges", ACM Trans. on Multimedia Computing, Communications, and Applications, vol. 2, No. 1, pp. 1-19, Feb. 2006.
E.-H. Yang, C. Sun, and J. Meng, "Quantization table design revisited for image/video coding," Proc. of the 2013 IEEE Int. Conf. on Image Processing, Melbourne, Australia, Sep. 15-18, pp. 1855-1859, 2013.
E.-H. Yang and L. Wang, "Joint optimization of run-length coding, huffman coding, and quantization table with aomplete baseline JPEG decoder compatibility", IEEE Trans. on Image Processing, vol. 18, No. 1, pp. 63-74, Jan. 2009.
E.-H. Yang and X. Yu, "Rate distortion optimization for H.264 inter-frame video coding: A general framework and algorithms", IEEE Trans. on Image Processing, vol. 16, No. 7, pp. 1774-1784, Jul. 2007.
T. Acharya and A. K Ray, Image Processing—Principles and Applications, Wiley InterScience, 2006.
Non-Final Office Action for U.S. Appl. No. 14/221,948, dated Jul. 23, 2015.
Final Office Action for U.S. Appl. No. 141221,948, dated Jan. 12, 2016.
Advisory Office Action for U.S. Appl. No. 14/221,948, dated Apr. 29, 2016.

\* cited by examiner

Reference 124200.jpg $d_{1,1} = 141.9$ 124202.jpg $d_{1,2} = 150.9$ 124201.jpg $d_{1,3} = 200.3$ 124100.jpg $d_{1,4} = 262.8$ 123601.jpg Original image Reconstructed from 124202.jpg Reconstructed from 124201.jpg Reconstructed from 124100.jpg Reconstructed from 123601.jpg

METHODS AND SYSTEMS FOR DETERMINING A PERCEPTUAL SIMILARITY BETWEEN IMAGES

CROSS-REFERENCE TO RELATED APPLICATION

This application is a continuation of U.S. patent application Ser. No. 14/221,948 filed Mar. 21, 2014 the entire contents of which are hereby incorporated by reference.

FIELD

Embodiments of the present invention relate generally to image processing, and more specifically to systems and methods for determining a measure of perceptual similarity between at least two images.

BACKGROUND

Image perceptual similarity is a fundamental issue in image processing, image retrieval, image management, and image understanding in general (see T. Acharya and A. K. Ray, Image Processing—Principles and Applications, Wiley InterScience, 2006, hereinafter referred to as [1]; E. Chalom, E. Asa, and E. Biton, "Measuring image similarity: An overview of some useful application", IEEE Instrumentation and Measurement Magazine, Vol. 16, No. 1, pp. 24-28, February 2013, hereinafter referred to as [2]; R. Datta, D. Joshi, J. Li, and J. Wang, "Image retrieval: Ideas, influences, and trends of the new age", ACM Computing Surveys, Vol. 40, No. 2, Article 5, pp. 1-60, April 2008, hereinafter referred to as [3]; Z. Wang, A. C. Bovik, H. R. Sheikh and E. P. Simoncelli, "Image quality assessment: From error visibility to structural similarity," IEEE Trans. on Image Processing, vol. 13, no. 4, pp. 600-612, April 2004, hereinafter referred to as [16]). In image processing such as image compression, image denoising, and image reconstruction, one can use a similarity metric or function to measure the perceptual similarity between the original image A and a processed image Â and evaluate the performance of the corresponding image processing system. In image retrieval and image management, one can use a proper similarity metric or function to measure the perceptual similarity between any two independent images A and B. Once such a similarity metric or function is defined for any two independent images, it could be used to retrieve images in a database which are perceptually similar to a query image according to the similarity metric or function in image retrieval, and to organize images into different groups according to their mutual similarity in image management.

SUMMARY

Perceptual similarity between any two independent images may be addressed with a set mapping perspective by first expanding each image A into a set $\phi(A)$ of images, and then defining the similarity between any two images A and B as the smallest average distortion per pixel between any pair of images, one from $\phi(A)$ and the other from $\phi(B)$, where the average distortion per pixel between any pair of images is calculated according to a given pixel-level distortion measure d. The resulting similarity metric is dubbed the set mapping induced similarity distance (SMID) between A and B and denoted by $d_\phi(A,B)$. This perspective is fundamentally different from conventional approaches where images A and B are first summarized into their signatures and the similarity between A and B is then defined through the notion of distance between their respective signatures, which is in general disconnected from pixel-level distortion. Several examples of the set mapping $\phi$ are illustrated; each of them gives a set $\phi(A)$ of images, which may contain images perceptually similar to A to a certain degree. It can be shown that under some mild conditions on $\phi$ and d, $d_\phi(A,B)$ is indeed a pseudo distance over the set of all images. Analytic formulas for and lower bounds to $d_\phi(A,B)$ are also developed for some set mappings $\phi$ and are each expressed as the infimum of average distortion per pixel over a set of pixel block distributions. By linking the computation of the SMID $d_\phi(A,B)$ to the weighted bipartite matching problem, two algorithms called two-stage algorithms are developed to approximate the SMID from above. When compared with other similarity metrics such as those based on histogram-based methods, SIFT, autocorrelogram, etc., the SMID shows better discriminating power on image similarity. Experimental results also show that the SMID is well aligned with human perception for image similarity.

In accordance with a first embodiment described herein, there is provided a method for determining a measure of perceptual similarity between a first digitized image having a first arrangement of pixels, each pixel in the first arrangement of pixels having a first pixel value, and a second digitized image having a second arrangement of pixels, each pixel in the second arrangement of pixels having a second pixel value, using a similarity distance determined by a computer module having a memory and a processor module comprising one or more processors. The method comprises operating the processor module to determine a first image array having M pixels by N pixels corresponding to the first arrangement of pixels, where M and N are positive integers; operating the processor module to determine a second image array having M pixels by N pixels corresponding to the second arrangement of pixels; operating the processor module to generate a first pixel group set comprising a first plurality of pixel group arrays based on the first image array wherein each pixel group array in the first plurality of pixel group arrays comprises at least two pixels; operating the processor module to generate a second pixel group set comprising a second plurality of pixel group arrays based on the second image array wherein each pixel group array in the second plurality of pixel group arrays comprises at least two pixels; operating the processor module to generate a plurality of pixel group pairs, each pixel group pair comprising a first comparison pixel group array from the first plurality of pixel group arrays in the first pixel group set and a second comparison pixel group array from the second plurality of pixel group arrays in the second pixel group set; operating the processor module to associate each pixel group pair with a pixel group pair distortion in a plurality of pixel group pair distortions, the pixel group pair distortion being a distortion measure between the first comparison pixel group array and the second comparison pixel group array in that pixel group pair; and operating the processor module to determine the similarity distance between the first digitized image and the second digitized image based on the plurality of pixel group pair distortions.

In some embodiments, the method further comprises operating the processor module to identify a first plurality of pixel arrays based on the first image array, each pixel array having a first number of pixels; operating the processor module to generate a first pattern image array having the first number of pixels; and operating the processor module to generate the first plurality of pixel group arrays by, for each pixel array in the first plurality of pixel arrays, superimposing the first pattern image array onto that pixel array such that the first plurality of pixel group arrays comprises a corresponding pixel group array for each pixel array in the first plurality of pixel arrays, wherein superimposing the first pattern image array onto that pixel array comprises a matrix addition of each array element in that pixel array with a corresponding array element in the first pattern image array.

In some embodiments, the first pattern image array is generated by operating the processor module to identify a first plurality of pixel block arrays in the first image array with each pixel block array having k pixels by l pixels, where k is a positive integer divisor of M with no remainder and l is a positive integer divisor of N with no remainder; operating the processor module to determine a first average pixel block array having k pixels by l pixels based on the first plurality of pixel block arrays, wherein each average pixel block array element in the first average pixel block array is determined based on an average value of an array element from each pixel block array of the first plurality of pixel block arrays having an array location corresponding to that average pixel block array element; and operating the processor module to generate the first pattern image array based on the first average pixel block array.

In some embodiments, the first pattern image array is k pixels by l pixels and corresponds to the first average pixel block array.

In some embodiments, the first pattern image array comprises a plurality of pattern pixel block arrays, where each pattern pixel block array is k pixels by l pixels and each pattern pixel block corresponds to the first average pixel block array.

In some embodiments, the method further comprises operating the processor module to identify a first plurality of pixel block arrays in the first image array, with each pixel block array having k pixels by l pixels, where k is a positive integer divisor of M with no remainder and l is a positive integer divisor of N with no remainder; operating the processor module to identify a second plurality of pixel block arrays in the second image array, with each pixel block array having k pixels by l pixels; configuring the processor module to generate a set of related image arrays from an original image array using a set mapping, the set mapping comprising a plurality of pixel block array permutations, such that, for each pixel block array permutation there is a corresponding image array in the set of related image arrays, this corresponding image array being obtained by applying that pixel block array permutation to the original image array, and each related image array in the set of related image arrays has at least as many pixels as the original image array; operating the processor module to generate the first pixel group set using the set mapping, such that the first pixel group set is a first set of related digitized images having a first plurality of related digitized image arrays, each related digitized image array being generated by applying one of the pixel block array permutations to the first plurality of pixel block arrays such that each of the related digitized image arrays comprises an arrangement of the pixel block arrays in the first plurality of pixel block arrays and each of the related digitized image arrays has at least as many pixels as the first image array; and operating the processor module to generate the second pixel group set using the set mapping, such that the second pixel group set is a second set of related digitized images having a second plurality of related digitized image arrays, each related digitized image array being generated by applying one of the pixel block array permutations to the second plurality of pixel block arrays such that each of the related digitized image arrays comprises an arrangement of the pixel block arrays in the second plurality of pixel block arrays and each of the related digitized image arrays has at least as many pixels as the second image array.

In some embodiments, the method further comprises operating the processor module to determine the plurality of pixel group pairs such that i) for each pixel group pair in the plurality of pixel group pairs, the first comparison pixel group array in that pixel group pair corresponds to one of the related digitized image arrays in the first plurality of related digitized image arrays and the second comparison pixel group array in that pixel group pair corresponds to one of the related digitized image arrays in the second plurality of related digitized image arrays, and ii) each of the related digitized image arrays in the first plurality of related digitized image arrays corresponds to the first comparison pixel group array in a pixel group pair in the plurality of pixel group pairs, and each of the related digitized image arrays in the second plurality of related digitized image arrays corresponds to the second comparison pixel group array in a pixel group pair in the plurality of pixel group pairs; operating the processor module to associate each pixel group pair with a pixel group pair distortion in the plurality of pixel group pair distortions, the pixel group pair distortion being a distortion measure between the first comparison pixel group array and the second comparison pixel group array in that pixel group pair; operating the processor module to identify a lowest pixel group pair distortion based on the plurality of pixel group pair distortions; and operating the processor module to determine the similarity distance between the first digitized image and the second digitized image based on the lowest pixel group pair distortion.

In some embodiments, the lowest pixel group pair distortion is determined by operating the processor module to generate a bipartite graph G, where G has a plurality of first vertices, each of the first vertices corresponding to one of the pixel block arrays in the first plurality of pixel block arrays, and a corresponding plurality of second vertices, each of the second vertices corresponding to one of the pixel block arrays in the second plurality of pixel block arrays; operating the processor module to determine a plurality of matchings, where each matching is determined such that each of the first vertices is matched with a distinct corresponding one of the second vertices, and wherein each matching corresponds to one of the pixel group pairs; operating the processor module to associate each matching with a matching weight, the matching weight being determined based on a sum of a plurality of vertex distortions, each vertex distortion in the plurality of vertex distortions corresponding to the distortion measure between one of the first vertices in the plurality of first vertices and the corresponding one of the second vertices in the plurality of second vertices; and operating the processor module to identify a matching with a lowest matching weight and set the lowest matching weight as the lowest pixel group pair distortion in the plurality of pixel group pair distortions.

In some embodiments, the matching with the lowest matching weight is identified by the processor module using a Blossom-V algorithm.

In some embodiments, the method further comprises operating the processor module to generate the first plurality of pixel group arrays by identifying a first plurality of pixel block arrays in the first image array, with each pixel block array having k pixels by l pixels, where k is a positive integer divisor of M with no remainder and l is a positive integer divisor of N with no remainder; and operating the processor module to generate the second plurality of pixel group arrays by identifying a second plurality of pixel block arrays in the second image array, with each pixel block array having k pixels by l pixels.

In some embodiments, the method further comprises operating the processor module to determine the plurality of pixel group pairs such that i) for each pixel group pair in the plurality of pixel group pairs, the first comparison pixel group array in that pixel group pair corresponds to one of the pixel block arrays in the first plurality of pixel block arrays and the second comparison pixel group array in that pixel group pair corresponds to one of the pixel block arrays in the second plurality of pixel block arrays; ii) each of the pixel block arrays in the first plurality of pixel block arrays corresponds to the first comparison pixel group array in a pixel group pair in the plurality of pixel group pairs, and each of the pixel block arrays in the second plurality of pixel block arrays corresponds to the second comparison pixel group array in a pixel group pair in the plurality of pixel group pairs; operating the processor module to associate each pixel group pair with a pixel group pair distortion in the plurality of pixel group pair distortions, the pixel group pair distortion being a distortion measure between the first comparison pixel group array and the second comparison pixel group array in that pixel group pairs; operating the processor module to determine an average pixel group pair distortion based on the plurality of pixel group pair distortions; and operating the processor module to determine the similarity distance between the first digitized image and the second digitized image based on the average pixel group pair distortion.

In some embodiments, the average pixel group pair distortion is determined by operating the processor module to determine at least one first distinct arrangement of pixels, wherein the at least one first distinct arrangement of pixels defines a first arrangement of pixels in one or more pixel block arrays in the first plurality of pixel block arrays; operating the processor module to determine a first set of distinct pixel block arrays wherein the first set of distinct pixel block arrays comprises a first distinct pixel block array for each first distinct arrangement of pixels in the at least one first distinct arrangement of pixels; operating the processor module to assign to each distinct pixel block array in the first set of distinct pixel block arrays a first distribution weight, the first distribution weight corresponding to a number of pixel block arrays in the first plurality of pixel block arrays having the first distinct arrangement of pixels corresponding to that distinct pixel block arrays; operating the processor module to generate the first pixel group set based on the first set of distinct pixel block arrays; operating the processor module to determine at least one second distinct arrangement of pixels, wherein the at least one second distinct arrangement of pixels defines a second arrangement of pixels in one or more pixel block arrays in the second plurality of pixel block arrays; operating the processor module to determine a second set of distinct pixel block arrays, wherein the second set of distinct pixel block arrays comprises a second distinct pixel block array for each second distinct arrangement of pixels in the at least one second distinct arrangement of pixels; operating the processor module to assign to each distinct pixel block array in the second set of distinct pixel block arrays a second distribution weight, the second distribution weight corresponding to a number of pixel block arrays in the second plurality of pixel block arrays having the second distinct arrangement of pixels corresponding to that distinct pixel block arrays; operating the processor module to generate the second pixel group set based on the second set of distinct pixel block arrays; operating the processor module to determine the plurality of pixel group pairs such that i) for each pixel group pair in the plurality of pixel group pairs, the first comparison pixel group array in that pixel group pair corresponds to one of the first distinct pixel block arrays and the second comparison pixel group array in that pixel group pair corresponds to one of the second distinct pixel block arrays; and ii) each of the first distinct pixel block arrays corresponds to the first comparison pixel group array in a pixel group pair in the plurality of pixel group pairs, and each of the second distinct pixel block arrays corresponds to the second comparison pixel group array in a pixel group pair in the plurality of pixel group pairs; operating the processor module to associate each pixel group pair with its distortion measure; operating the processor module to determine a joint distribution weight for each pixel group pair, where the joint distribution weight is determined based on the first distribution weight corresponding to the first comparison pixel group array and the second distribution weight corresponding to the second comparison pixel group array; and operating the processor module to determine the average pixel group pair distortion based on the distortion measure and joint distribution weight for each pixel group pair.

In accordance with a another example embodiment described herein, there is provided a system for determining a measure of perceptual similarity between a first digitized image having a first arrangement of pixels, each pixel in the first arrangement of pixels having a first pixel value, and a second digitized image having a second arrangement of pixels, each pixel in the second arrangement of pixels having a second pixel value, using a similarity distance. The system comprises a data storage module configured to store one of the first arrangement of pixels and the second arrangement of pixels; and a processor module comprising one or more processors. The processor module is configured to determine a first image array having M pixels by N pixels corresponding to the first arrangement of pixels, where M and N are positive integers; determine a second image array having M pixels by N pixels corresponding to the second arrangement of pixels; generate a first pixel group set comprising a first plurality of pixel group arrays based on the first image array wherein each pixel group array in the first plurality of pixel group arrays comprises at least two pixels; generate a second pixel group set comprising a second plurality of pixel group arrays based on the second image array wherein each pixel group array in the second plurality of pixel group arrays comprises at least two pixels; generate a plurality of pixel group pairs, each pixel group pair comprising a first comparison pixel group array from the first plurality of pixel group arrays in the first pixel group set and a second comparison pixel group array from the second plurality of pixel group arrays in the second pixel group set; associate each pixel group pair with a pixel group pair distortion, the pixel group pair distortion being a distortion measure between the first comparison pixel group array and the second comparison pixel group array in that pixel group pair; and determine the similarity distance between the first digitized image and the second digitized image based on the plurality of pixel group pair distortions.

In some embodiments, the processor module is configured to identify a first plurality of pixel arrays based on the first image array, each pixel array having a first number of pixels; generate a first pattern image array having the first number of pixels; and generate the first plurality of pixel group arrays by, for each pixel array in the first plurality of pixel arrays, superimposing the first pattern image array onto that pixel array such that the first plurality of pixel group arrays comprises a corresponding pixel group array for each pixel array in the first plurality of pixel arrays, wherein superimposing the first pattern image array onto that pixel array comprises a matrix addition of each array element in that pixel array with a corresponding array element in the first pattern image array.

In some embodiments, the processor module is configured to identify a first plurality of pixel block arrays in the first image array with each pixel block array having k pixels by l pixels, where k is a positive integer divisor of M with no remainder and l is a positive integer divisor of N with no remainder; determine a first average pixel block array having k pixels by l pixels based on the first plurality of pixel block arrays, wherein each average pixel block array element in the first average pixel block array is determined based on an average value of an array element from each pixel block array of the first plurality of pixel block arrays having an array location corresponding to that average pixel block array element; and generate the first pattern image array based on the first average pixel block array.

In some embodiments, the first pattern image array is k pixels by l pixels and corresponds to the first average pixel block array.

In some embodiments, the first pattern image array comprises a plurality of pattern pixel block arrays, where each pattern pixel block array is k pixels by l pixels and each pattern pixel block corresponds to the first average pixel block array.

In some embodiments, the processor module is configured to identify a first plurality of pixel block arrays in the first image array, with each pixel block array having k pixels by l pixels, where k is a positive integer divisor of M with no remainder and l is a positive integer divisor of N with no remainder; identify a second plurality of pixel block arrays in the second image array, with each pixel block array having k pixels by l pixels; generate a set of related image arrays from an original image array using a set mapping, the set mapping comprising a plurality of pixel block array permutations, such that, for each pixel block array permutation there is a corresponding image array in the set of related image arrays, this corresponding image array being obtained by applying that pixel block array permutation to the original image array, and each related image array in the set of related image arrays has at least as many pixels as the original image array; generate the first pixel group set using the set mapping, such that the first pixel group set is a first set of related digitized images having a first plurality of related digitized image arrays, each related digitized image array being generated by applying one of the pixel block array permutations to the first plurality of pixel block arrays such that each of the related digitized image arrays comprises an arrangement of the pixel block arrays in the first plurality of pixel block arrays and each of the related digitized image arrays has at least as many pixels as the first image array; and generate the second pixel group set using the set mapping, such that the second pixel group set is a second set of related digitized images having a second plurality of related digitized image arrays, each related digitized image array being generated by applying one of the pixel block array permutations to the second plurality of pixel block arrays such that each of the related digitized image arrays comprises an arrangement of the pixel block arrays in the second plurality of pixel block arrays and each of the related digitized image arrays has at least as many pixels as the second image array.

In some embodiments, the processor module is configured to determine the plurality of pixel group pairs such that i) for each pixel group pair in the plurality of pixel group pairs, the first comparison pixel group array in that pixel group pair corresponds to one of the related digitized image arrays in the first plurality of related digitized image arrays and the second comparison pixel group array in that pixel group pair corresponds to one of the related digitized image arrays in the second plurality of related digitized image arrays, and ii) each of the related digitized image arrays in the first plurality of related digitized image arrays corresponds to the first comparison pixel group array in a pixel group pair in the plurality of pixel group pairs, and each of the related digitized image arrays in the second plurality of related digitized image arrays corresponds to the second comparison pixel group array in a pixel group pair in the plurality of pixel group pairs; associate each pixel group pair with a pixel group pair distortion, the pixel group pair distortion being a distortion measure between the first comparison pixel group array and the second comparison pixel group array in that pixel group pair; identify a lowest pixel group pair distortion based on the plurality of pixel group pair distortions; and determine the similarity distance between the first digitized image and the second digitized image based on the lowest pixel group pair distortion.

In some embodiments, the processor module is configured to generate a bipartite graph G, where G has a plurality of first vertices, each of the first vertices corresponding to one of the pixel block arrays in the first plurality of pixel block arrays, and a corresponding plurality of second vertices, each of the second vertices corresponding to one of the pixel block arrays in the second plurality of pixel block arrays; determine a plurality of matchings, where each matching is determined such that each of the first vertices is matched with a distinct corresponding one of the second vertices, and wherein each matching corresponds to one of the pixel group pairs; associate each matching with a matching weight, the matching weight being determined based on a sum of a plurality of vertex distortions, each vertex distortion in the plurality of vertex distortions corresponding to the distortion measure between one of the first vertices in the plurality of first vertices and the corresponding one of the second vertices in the plurality of second vertices; and identify a matching with a lowest matching weight and set the lowest matching weight as the lowest pixel group pair distortion in the plurality of pixel group pair distortions.

In some embodiments, the processor module is configured to identify the matching with the lowest matching weight using a Blossom-V algorithm.

In some embodiments, the processor module is configured to generate the first plurality of pixel group arrays by identifying a first plurality of pixel block arrays in the first image array, with each pixel block array having k pixels by l pixels, where k is a positive integer divisor of M with no remainder and l is a positive integer divisor of N with no remainder; and generate the second plurality of pixel group arrays by identifying a second plurality of pixel block arrays in the second image array, with each pixel block array having k pixels by l pixels.

In some embodiments, the processor module is configured to determine the plurality of pixel group pairs such that i) for each pixel group pair in the plurality of pixel group pairs, the first comparison pixel group array in that pixel group pair corresponds to one of the pixel block arrays in the first plurality of pixel block arrays and the second comparison pixel group array in that pixel group pair corresponds to one of the pixel block arrays in the second plurality of pixel block arrays; ii) each of the pixel block arrays in the first plurality of pixel block arrays corresponds to the first comparison pixel group array in a pixel group pair in the plurality of pixel group pairs, and each of the pixel block arrays in the second plurality of pixel block arrays corresponds to the second comparison pixel group array in a pixel group pair in the plurality of pixel group pairs; associate each pixel group pair with a pixel group pair distortion, the pixel group pair distortion being a distortion measure between the first comparison pixel group array and the second comparison pixel group array in that pixel group pair; determine an average pixel group pair distortion based on the plurality of pixel group pair distortions; and determine the similarity distance between the first digitized image and the second digitized image based on the average pixel group pair distortion.

In some embodiments, the processor module is configured to determine at least one first distinct arrangement of pixels, wherein the at least one first distinct arrangement of pixels defines a first arrangement of pixels in one or more pixel block arrays in the first plurality of pixel block arrays; determine a first set of distinct pixel block arrays wherein the first set of distinct pixel block arrays comprises a first distinct pixel block array for each first distinct arrangement of pixels in the at least one first distinct arrangement of pixels; assign to each distinct pixel block array in the first set of distinct pixel block arrays a first distribution weight, the first distribution weight corresponding to a number of pixel block arrays in the first plurality of pixel block arrays having the first distinct arrangement of pixels corresponding to that distinct pixel block arrays; generate the first pixel group set based on the first set of distinct pixel block arrays; determine at least one second distinct arrangement of pixels, wherein the at least one second distinct arrangement of pixels defines a second arrangement of pixels in one or more pixel block arrays in the second plurality of pixel block arrays; determine a second set of distinct pixel block arrays, wherein the second set of distinct pixel block arrays comprises a second distinct pixel block array for each second distinct arrangement of pixels in the at least one second distinct arrangement of pixels; assign to each distinct pixel block array in the second set of distinct pixel block arrays a second distribution weight, the second distribution weight corresponding to a number of pixel block arrays in the second plurality of pixel block arrays having the second distinct arrangement of pixels corresponding to that distinct pixel block arrays; generate the second pixel group set based on the second set of distinct pixel block arrays; determine the plurality of pixel group pairs such that i) for each pixel group pair in the plurality of pixel group pairs, the first comparison pixel group array in that pixel group pair corresponds to one of the first distinct pixel block arrays and the second comparison pixel group array in that pixel group pair corresponds to one of the second distinct pixel block arrays; and ii) each of the first distinct pixel block arrays corresponds to the first comparison pixel group array in a pixel group pair in the plurality of pixel group pairs, and each of the second distinct pixel block arrays corresponds to the second comparison pixel group array in a pixel group pair in the plurality of pixel group pairs; associate each pixel group pair with its distortion measure; determine a joint distribution weight for each pixel group pair, where the joint distribution weight is determined based on the first distribution weight corresponding to the first comparison pixel group array and the second distribution weight corresponding to the second comparison pixel group array; and determine the average pixel group pair distortion based on the distortion measure and joint distribution weight for each pixel group pair.

In accordance with a further example embodiment described herein, there is provided a computer program product for use on a processor module with one or more processors to determine a measure of perceptual similarity between a first digitized image having a first arrangement of pixels, each pixel in the first arrangement of pixels having a first pixel value, and a second digitized image having a second arrangement of pixels, each pixel in the second arrangement of pixels having a second pixel value, using a similarity distance. The computer program product comprises a non-transitory recording medium; and instructions recorded on the recording medium, the instructions for configuring the processor module to determine a first image array having M pixels by N pixels corresponding to the first arrangement of pixels, where M and N are positive integers; determine a second image array having M pixels by N pixels corresponding to the second arrangement of pixels; generate a first pixel group set comprising a first plurality of pixel group arrays based on the first image array wherein each pixel group array in the first plurality of pixel group arrays comprises at least two pixels; generate a second pixel group set comprising a second plurality of pixel group arrays based on the second image array wherein each pixel group array in the second plurality of pixel group arrays comprises at least two pixels; generate a plurality of pixel group pairs, each pixel group pair comprising a first comparison pixel group array from the first plurality of pixel group arrays in the first pixel group set and a second comparison pixel group array from the second plurality of pixel group arrays in the second pixel group set; associate each pixel group pair with a pixel group pair distortion, the pixel group pair distortion being a distortion measure between the first comparison pixel group array and the second comparison pixel group array in that pixel group pair; and determine the similarity distance between the first digitized image and the second digitized image based on the plurality of pixel group pair distortions.

BRIEF DESCRIPTION OF DRAWINGS

For a better understanding of the described embodiments and to show more clearly how they may be carried into effect, reference will now be made, by way of example, to the accompanying drawings in which.

DETAILED DESCRIPTION

Section 1

Figure 1:
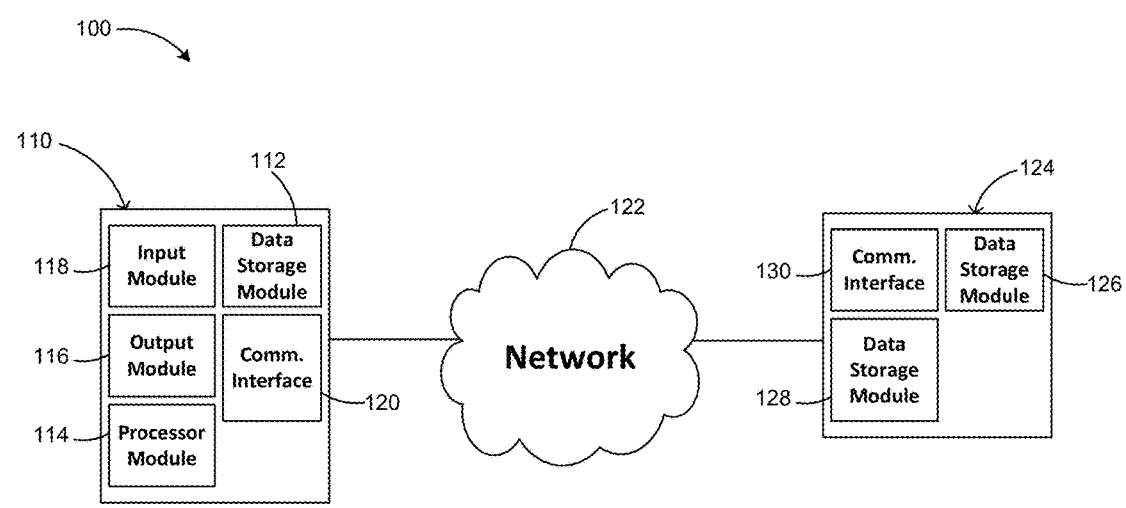
FIG. 1 shows a block diagram of a system that can be used to determine a perceptual similarity between images in accordance with an embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion. For example, the input data may be an input image. In some embodiments, the input image may be compared with one or more stored images to determine the perceptual similarity between the input image and the one or more stored images using the various systems and methods described herein. In some embodiments, the one or more stored images determined to be perceptually similar to the input image may be displayed to a user on a display device of a programmable computer as part of a content based image retrieval search program.

In some embodiments, one or more input images may be stored or indexed in a particular manner or in a particular storage location based on the determined similarity. In some embodiments, a plurality of input images may be grouped based on the level of perceptual similarity amongst the plurality of input images as determined by the various systems and methods described herein. In some embodiments, storing and indexing perceptually similar images in a prescribed manner may facilitate the retrieval of images deemed to be perceptually similar to one or more input images.

Each program may be implemented in a high level procedural or object oriented programming or scripting language, or both, to communicate with a computer system. Alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

Furthermore, the systems and methods of the described embodiments may be implemented on one or more server computers, desktop computers, notebook computers, tablets, PDAs, smartphones, or other programmable computers. The programmable computers may include a connection with a network such as a wired or wireless connection to the Internet. In some cases, the network may include other types of computer or telecommunication networks.

In some embodiments, the programmable computers may include an input device for entering information into the device. For example, the input device may be a keyboard, key pad, cursor-control device, touch-screen, camera, scanner or microphone. In some embodiments, input information may be received through the communication interface from other programmable computers over a network. In some embodiments, the computing devices may include a display device for presenting visual information. For example, display device may be a computer monitor, a flat-screen display, a projector or a display panel. In some embodiments, the display device display one or more images to the user based on the perceptual similarity systems and methods described herein. In some embodiments, the one or more images displayed to the user may be stored locally on the programmable computer, or they may be retrieved by the programmable computer from a remote computer or storage location using the systems and methods described herein. In some embodiments, output devices such as a printer may be connected to the programmable computer and may be configured to output one or more images to the user based on outputs of the perceptual similarity systems and methods described herein.

It will be appreciated that numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The described embodiments provide methods, systems and computer program products that generally relate to a computer-implemented system and method for determining a similarity distance between two digitized images.

Figure 5:
FIG. 5 shows a process flow diagram illustrating an image processing method.

Referring to FIG. 5, there is illustrated in a process flow diagram, an image processing method. With reference to FIG. 5, in image processing, one often defines the similarity between the original image $A=(a(i,j))$ and processed image $\hat{A}=(\hat{a}(i,j))$, where $a(i,j)$ and $\hat{a}(i,j)$, $1 \le i \le m$, $1 \le j \le n$, are both real numbers, as the average distortion per pixel:

$$d(A, \hat{A}) \triangleq \frac{1}{mn} \sum_{i=1}^{m} \sum_{j=1}^{n} d(a(i, j), \hat{a}(i, j)) \quad (1)$$

where $d(a(i,j),\hat{a}(i,j)) \in [0,+\infty)$ represents the distortion between pixel values $a(i,j)$ and $\hat{a}(i,j)$. For example, the similarity function as defined in (1) along with the squared error distortion $d(a(i,j), \hat{a}(i,j))=(a(i,j)-\hat{a}(i,j))^2$ is predominantly used in image and video compression (see E.-H. Yang and X. Yu, "Rate distortion optimization for H.264 interframe video coding: A general framework and algorithms", IEEE Trans. on Image Processing, Vol. 16, No. 7, pp. 1774-1784, July 2007, hereinafter referred to as [34]; E.-H. Yang and X. Yu, "Soft decision quantization for H.264 with main profile compatibility", IEEE Trans. Circ. Syst. for Video Tech., Vol. 19, No. 1, pp. 122-127, January 2009, hereinafter referred to as [35], E.-H. Yang and L. Wang, "Joint optimization of run-length coding, huffman coding, and quantization table with complete baseline JPEG decoder compatibility", IEEE Trans. on Image Processing, Vol. 18, No. 1, pp. 63-74, January 2009, hereinafter referred to as [33], E.-H. Yang, C. Sun, and J. Meng, "Quantization table design revisited for image/video coding," Proc. of the 2013 IEEE Int. Conf. on Image Processing, Melbourne, Australia, September 15-18, pp. 1855-1859, 2013, hereinafter referred to as [32]; T. Wiegand, G. J. Sullivan, and A. Luthra. "Draft itu-t rec. h.264/iso/iec 14496-10 avc". Joint Video Team of ISO/IEC MPEG and ITU-T VCEG, 2003, hereinafter referred to as [14]; G. J. Sullivan; J.-R. Ohm; W.-J. Han; T. Wiegand, "Overview of the high efficiency video coding (HEVC) standard", IEEE Trans. on Circ. Syst. for Video Tech., Vol. 22, no. 12, pp. 1649-1668, December 2012, hereinafter referred to as [15]). Except for the case where the quality of Â is really poor, the similarity function as defined in (1) along with the squared error distortion $d(a(i,j),\hat{a}(i,j))=(a(i,j)-\hat{a}(i,j))^2$ is more or less consistent with human perception in the context of image processing (see [16]). This, together with its simplicity in its computation and rate distortion optimization (see [34], [35], [33], [32]) has contributed to the great success of image and video compression, as evidenced by the evolution of the MPEG-series and H-series video compression standards from MPEG 1/H.261 to the current H.265/HEVC (the newest video coding standard) (see [14], [15]) and by the wide adoption of image and video compression technology in our daily life.

Figure 6:
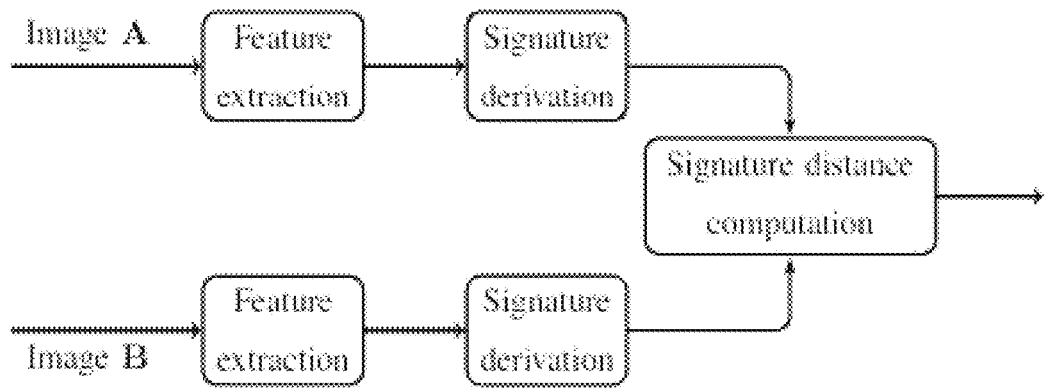
FIG. 6 shows a process flow diagram illustrating a method for determining similarity between images using signatures.

In contrast, there is no universally accepted similarity function for measuring the perceptual similarity between any two independent images in image retrieval and image management yet (see [3]; M. Lew, N. Sebe, C. Djeraba, and R. Jain, "Content-based multimedia information retrieval: State of the art and challenges", ACM Trans. on Multimedia Computing, Communications, and Applications, Vol. 2, No. 1, pp. 1-19, February 2006, hereinafter referred to as [31], [2]). Referring now to FIG. 6, there is illustrated in a process flow diagram, an example of a method for determining the similarity between images using signatures extracted from those images. As shown in FIG. 6, a typical approach in image retrieval is to first extract features from an image, then derive a signature of the image from the extracted features, and finally determine the similarity between a pair of images based on their respective signatures. Most, if not all, content based image retrieval (CBIR) systems follow more or less these steps; their differences lie in what types of features would be extracted, how a signature would be derived from extracted features, and how distances (i.e., dissimilarity measures) between signatures are defined and calculated (see [3]; L. Kang, C. Hsu, H. Chen, C. Lu, C. Lin, and S. Pei, "Feature-based sparse representation for image similarity assessment" IEEE Trans. on Multimedia, Vol. 13, No. 5, pp. 1019-1030, October 2011, hereinafter referred to as [9]; [2]). Depending on the mathematical expression of signatures, the Euclidean distance, Hausdorff distance, weighted sum of vector distances, and Kullback-Leibler (KL) divergence (or relative entropy) between signatures have been used (see [3]). However, no matter how the three steps shown in FIG. 6 are executed, one thing is certain: as one moves along the three step chain shown in FIG. 6, not only would each step introduce expensive computation, but more importantly the notion of distance between signatures also becomes less intuitive and is increasingly disconnected from the original pair of images.

Figure 7:
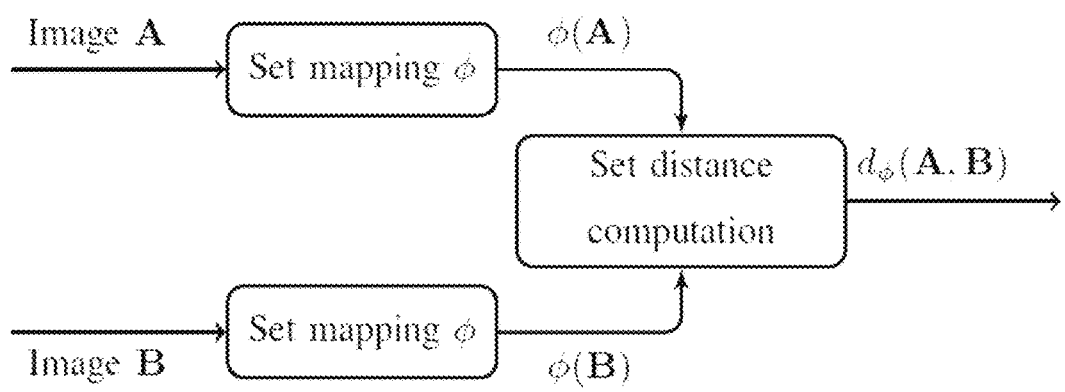
FIG. 7 shows a process flow diagram illustrating a process for determining perceptual similarity between images using a set mapping induced similarity distance.

Embodiments of the approach described herein take a philosophically different approach to addressing the similarity between any pair of images A and B. Referring now to FIG. 7, illustrated therein in a process flow diagram is a process for determining a perceptual similarity between images using a set mapping induced similarity distance in accordance with an embodiment. Contrary to FIG. 6 where images A and B are first "compressed" into their signatures and the similarity between A and B is then defined through the notion of distance between their respective signatures, in some embodiments we instead first expand each image A (B, resp.) into a set $\phi(A)$ ($\phi(B)$, resp.) of images, which may contain images perceptually similar to A (B, resp.), and then define the similarity between A and B as the smallest average distortion per pixel between any pair of images, one from $\phi(A)$ and the other from $\phi(B)$, through the simple distortion formula defined in (1). The resulting similarity value (denoted by $d_\phi(A,B)$) will be referred to as the set mapping induced similarity distance (SMID) between A and B. No feature extraction and no signature derivation are involved. This is illustrated by the example set mapping induced similarity distance process shown in FIG. 7. With a proper choice of the image set mapping $\phi$, what remains is to find an efficient way to compute $d_\phi(A,B)$. As we shall see later, $d_\phi(A,B)$ is indeed a pseudo distance over the set of all possible images when the image set mapping $\phi$ and pixel level distortion function $d(\cdot,\cdot)$ satisfy some symmetry condition.

Referring now to FIG. 1, shown therein is an example embodiment of a system 100 that may be used to determine a measure of perceptual similarity between a first digitized image and a second digitized image. System 100 includes a first computer module 110 coupled to a second computer module 124 over a network 122. The first computer module 110 includes a data storage module 112, a processor module 114, an output module 116, an input module 118 and a communication interface 120.

In some cases, network 122 may be a wired or wireless connection to the Internet. In some cases, network 122 may include other types of computer or telecommunication networks.

The second computer module 124 includes a processor module 126, a data storage module 128, and a communication interface 130 coupled to the network 122. In some cases, the second computer module 124 may be one or more server computers in communication with the first computer module 110 over the network 122. In various embodiments, each of the first computer module 110 and the second computer module 124 may be operable to perform the various methods for determining perceptual similarity between two images described herein alone or in combination.

In some embodiments, one or both of the first computer module 110 and the second computer module 124 may comprise a series of distributed processor modules and data storage modules that are connected through the network 122 or through other internal or external networks. As a result, in some embodiments, the various methods described herein can be performed in a distributed manner with different steps performed by different processor modules accessing both local and remote memory modules that are components of distributed data storage modules.

In some embodiments, a computer module having a memory and a processor module with one or more processors may be provided that is operable to receive a first digitized image. The first digitized image may be received through an input module such as input module 118 using an input device such as a camera or a scanner, or the first digitized image may be received through a communication interface such as communication interfaces 120 or 130 from another programmable computer module connected to the computer module over a network such as network 122. In some embodiments, the first digitized image may be selected by a user using any suitable input device such as a mouse or a touch-screen, for example. In some embodiments, the computer module may also receive a second digitized image. The first digitized image has a first arrangement of pixels and the second digitized has a second arrangement of pixels, with each pixel having a pixel location and a pixel value.

In some embodiments, the computer module may store the first arrangement of pixels or the second arrangement of pixels in a local data storage module such as data storage modules 112 or 126. In some cases, the first arrangement of pixels or the second arrangement of pixels may be stored in a remote data storage module provided by a second computer module in communication with the computer module over a network. In some embodiments the computer module may not receive the first digitized image or the second digitized image if they have been previously stored.

In some embodiments, the first arrangement of pixels and/or the second arrangement of pixels may not be stored directly. In some embodiments, the first arrangement of pixels or the second arrangement of pixels may be stored in terms of pixel block statistics or some model parameters that can be used to describe an image. Pixel block statistics or image model parameters can be used to represent both the first digitized image and the second digitized image.

Figure 2:
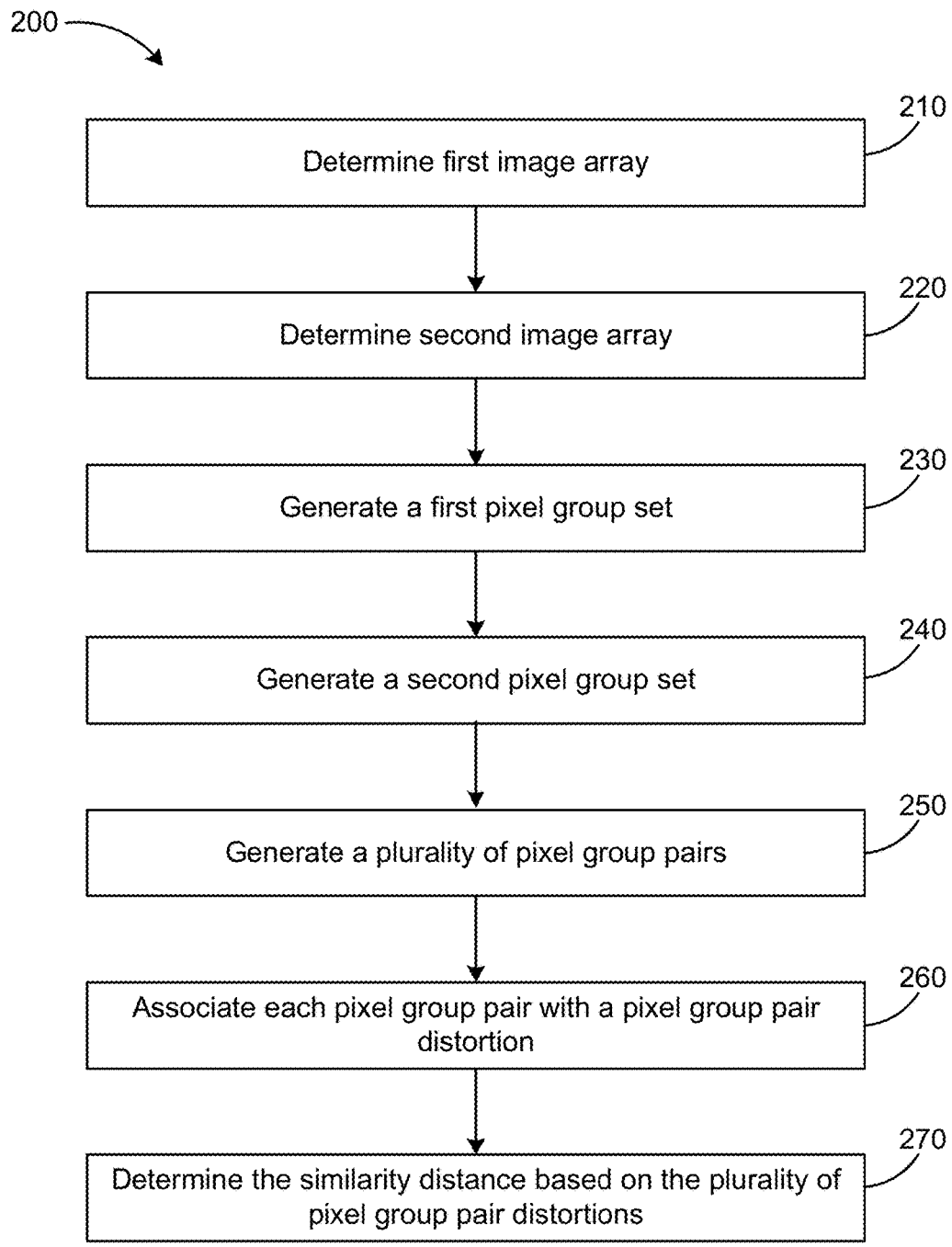
FIG. 2 shows a flowchart of an example embodiment of a method for determining perceptual similarity.

Referring now to FIG. 2, shown therein is an example embodiment of a method 200 for determining a measure of perceptual similarity between a first image having a first arrangement of pixels and a second image having a second arrangement of pixels using a similarity distance. At 210, a processor module is operated to determine a first image array having M pixels by N pixels corresponding to the first arrangement of pixels. Similarly, at 220 the processor module determines a second image array corresponding to the second arrangement of pixels.

At 230, a first pixel group set is generated by the processor module. The first pixel group set generally comprises a first plurality of pixel group arrays that are generated based on the first image array. Similarly, at 240 a second pixel group set having a second plurality of pixel group arrays is generated by the processor module. In some embodiments, each of the pixel group arrays in the first plurality of pixel group arrays and the second plurality of pixel group arrays will comprise at least two pixels.

At 250, the processor module is operated to generate a plurality of pixel group pairs. Each pixel group pairs comprises a first comparison pixel group array and a second comparison pixel group array. The first comparison pixel group array may be a pixel group array from the first plurality of pixel group arrays and the second comparison pixel group array may be a pixel group array from the second plurality of pixel group arrays.

At 260, the processor module can be operated to associate each pixel group pair with a pixel group pair distortion. In some embodiments, associating a pixel group pair with a pixel group pair distortion may comprise determining for that pixel group pair a distortion measure between the first comparison pixel group array and the second comparison pixel group array. In some embodiments, it may not be necessary to determine the pixel group pair distortion for every pixel group pair.

At 270, the processor module is operated to determine the similarity distance between the first image and the second image based on the plurality of pixel group distortions associated with the pixel group pairs in step 260. In some cases, the similarity distance may be determined based on a lowest pixel group pair distortion. In some cases, the lowest pixel group pair distortion can be determined in some cases using a bipartite graph to identify a matching with a lowest matching weight as described below with reference to FIG. 3. In other cases, the similarity distance may be determined based on an average or expected value of the pixel group pair distortions. In some cases, the average or expected value of the pixel group pair distortions may be determined using distribution weights assigned to distinct pixel block arrays as described below with reference to FIG. 4.

Figure 3:
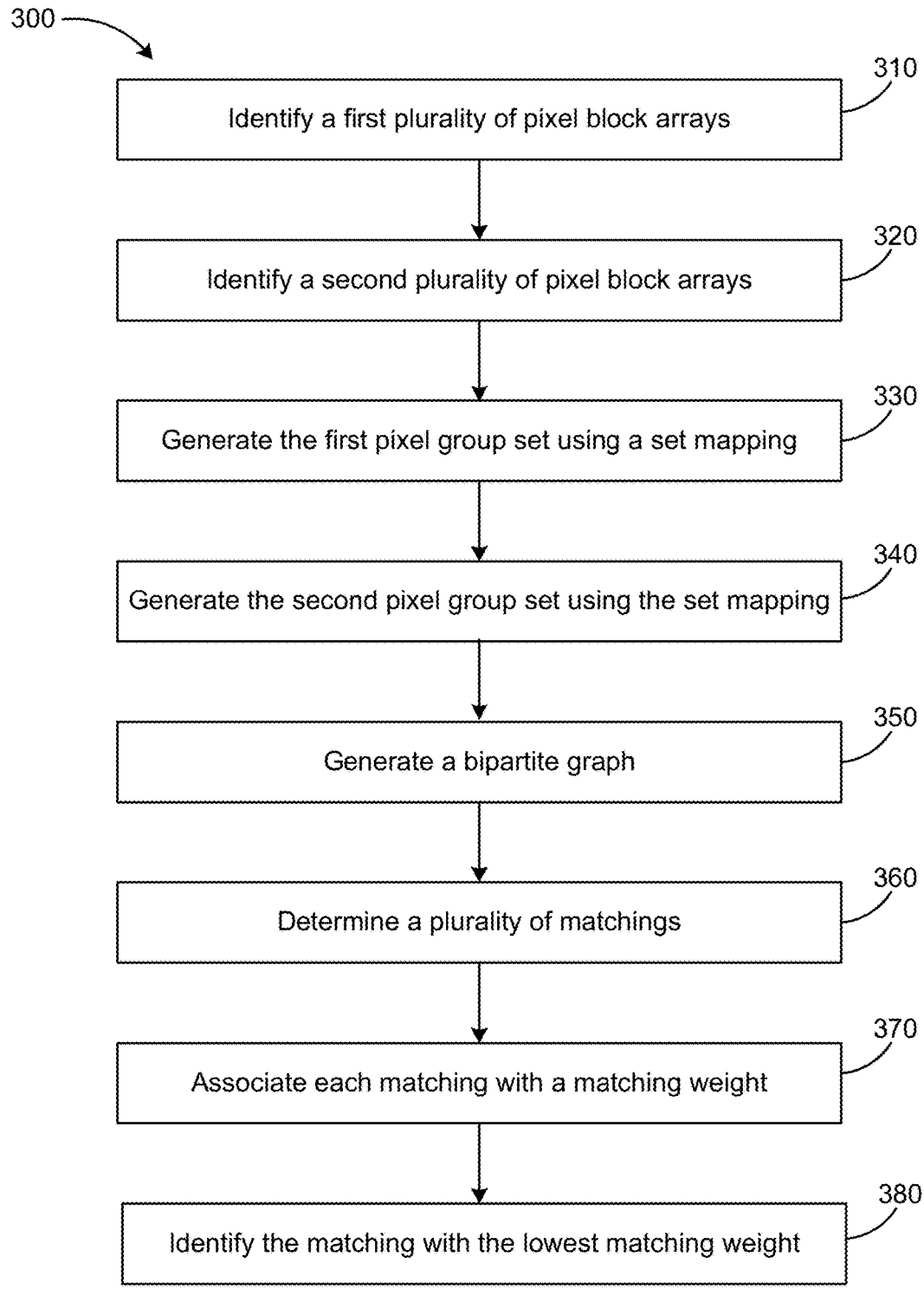
FIG. 3 shows a flowchart of another example embodiment of a method for determining perceptual similarity.

Referring now to FIG. 3, shown therein is another example embodiment of a method 300 for determining a measure of perceptual similarity between a first image having a first arrangement of pixels and a second image having a second arrangement of pixels using a similarity distance. In some embodiments, the method 200 can be used to determine the similarity distance between a first image and a second image by performing the steps of the method 300 to identify a lowest pixel group pair distortion. At 310, a processor module is operated to identify a first plurality of pixel block arrays from the first arrangement of pixels. Similarly, at 320 the processor module can be operated to identify a second plurality of pixel block arrays from the second arrangement of pixels.

In some cases, the processor module can be configured to generate a set of related image arrays from an original image array using a set mapping. A set mapping may include a plurality of pixel block array permutations, such that, for each pixel block array permutation there is a corresponding image array in the set of related image arrays, this corresponding image array being obtained by applying that pixel block array permutation to the original image array, and each related image array in the set of related image arrays has at least as many pixels as the original image array. Various examples of set mappings are described herein in detail in Section 2.

At 330, the processor module is operated to generate the first pixel group set using a set mapping. The first pixel group set is a first set of related digitized images having a first plurality of related digitized image arrays, each related digitized image array being generated by applying one of the pixel block array permutations in the set mapping to the first plurality of pixel block arrays such that each of the related digitized image arrays comprises an arrangement of the pixel block arrays in the first plurality of pixel block arrays and each of the related digitized image arrays has at least as many pixels as the first image array. In some cases, each of the related digitized image arrays may have the same number of pixels as the first image array while in other cases each of the related digitized image arrays may have a greater number of pixels than the first image array.

At 340, the processor module is operated to generate the second pixel group set using the set mapping. The second pixel group set is generated by applying the set mapping to the second plurality of pixel block arrays in the same manner as described with respect to the first plurality of pixel block arrays at step 330.

At 350, the processor module is operated to generate a bipartite graph G. The bipartite graph G has a plurality of first vertices, each of the first vertices corresponding to one of the pixel block arrays in the first plurality of pixel block arrays, and a corresponding plurality of second vertices, each of the second vertices corresponding to one of the pixel block arrays in the second plurality of pixel block arrays.

The processor module is then operated to determine a plurality of matchings at 360. Each matching is determined by the processor module such that each of the first vertices is matched with a distinct corresponding one of the second vertices. Furthermore, each matching corresponds to one of the pixel group pairs. Each matching may correspond to a pixel group pair where the first comparison pixel group array comprises one of the related digitized image arrays in the first set of related digitized images and the second comparison pixel group array comprises one of the related digitized image arrays in the second set of related digitized images.

At 370, the processor module is operated to associate each matching with a matching weight. Each matching weight is determined based on a sum of a plurality of vertex distortions, where each vertex distortion corresponds to the distortion measure between one of the first vertices and the corresponding one of the second vertices. The vertex distortion may be determined using a distortion measure between the pixel block array in the first plurality of pixel block arrays corresponding to the first vertex and the pixel block array in the second plurality of pixel block arrays corresponding to the second vertex.

At 380, the processor module is operated to identify the matching with the lowest matching weight. In some embodiments, the lowest matching weight may be identified by the processor module using a Blossom-V algorithm. As a skilled reader will appreciate, depending on the approach taken to identifying the matching with the lowest matching weight, it may not be necessary to determine the distortion for each pixel group pair, i.e. each matching weight. The processor module can be further operated to set the lowest matching weight as the lowest pixel group pair distortion in the plurality of pixel group pair distortions. In some embodiments, the similarity distance between the first image and the second image can be determined based on the lowest pixel group pair distortion.

Figure 4:
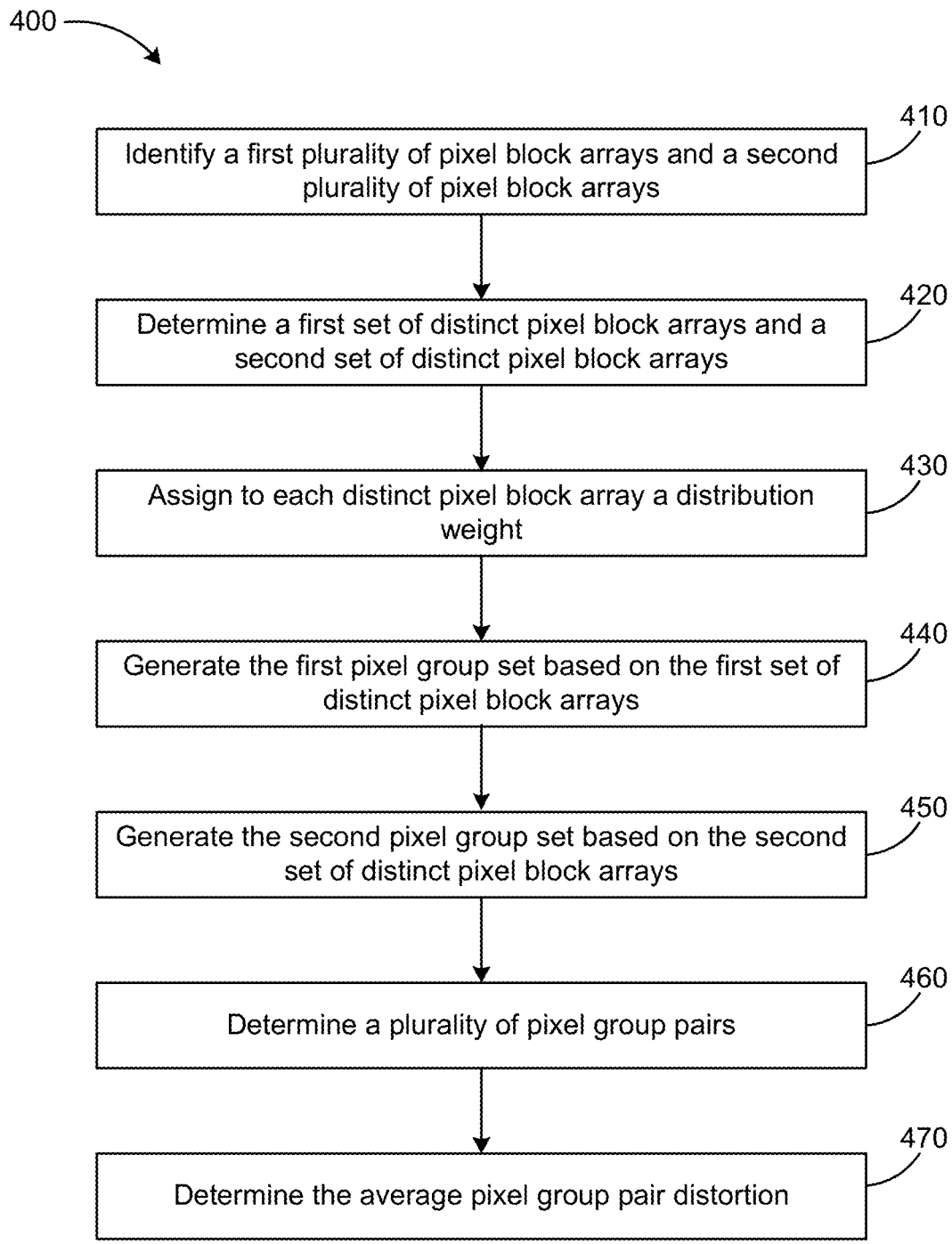
FIG. 4 shows a flowchart of a further example embodiment of a method for determining perceptual similarity.

Referring now the FIG. 4, shown therein is another example embodiment of a method 400 for determining a measure of perceptual similarity between a first image having a first arrangement of pixels and a second image having a second arrangement of pixels using a similarity distance. In some embodiments, the method 200 can be used to determine the similarity distance between a first image and a second image by performing the steps of the method 400 to identify an average pixel group pair distortion. At 410, the processor module is operated to determine a first plurality of pixel block arrays from the first arrangement of pixels and a second plurality of pixel block arrays from the second arrangement of pixels.

At 420, the processor module is operated to determine a first set of distinct pixel block arrays and a second set of distinct pixel block arrays. The first set of distinct pixel block arrays can be determined by operating the processor module to determine at least one first distinct arrangement of pixels in one or more pixel block arrays in the first plurality of pixel block arrays. The first set of distinct pixel block arrays comprises a first distinct pixel block array for each distinct arrangement of pixels in the at least one first distinct arrangement of pixels. Similarly, the second set of distinct pixel block arrays can be determined by determining at least one second distinct arrangement of pixels in one or more pixel block arrays in the second plurality of pixel block arrays.

At 430, the processor module is operated to assign a distribution weight to each distinct pixel block array in the first set of distinct pixel block arrays and each distinct pixel block in the second set of distinct pixel block arrays. The distribution weight for each distinct pixel block array in the first set of distinct pixel block arrays corresponds to the number of pixel block arrays in the first plurality of pixel block arrays having the first distinct arrangement of pixels corresponding to that distinct pixel block array. Similarly, the distribution weight for each distinct pixel block array in the second set of distinct pixel block arrays corresponds to the number of pixel block arrays in the second plurality of pixel block arrays having the second distinct arrangement of pixels corresponding to that distinct pixel block array. First distribution weights may represent the empirical distribution of each distinct pixel block array in the first plurality of pixel block arrays while second distribution weights may represent the empirical distribution of each distinct pixel block array in the second plurality of pixel block arrays.

At 440, the processor module is operated to generate the first pixel group set based on the first set of distinct pixel block arrays. At 450, the processor module is operated to generate the second pixel group set based on the second set of distinct pixel block arrays.

At 460, the processor module is operated to determine a plurality of pixel group pairs. The plurality of pixel group pairs are determined such that for each pixel group pair in the plurality of pixel group pairs, the first comparison pixel group array in that pixel group pair corresponds to one of the distinct pixel block arrays in the first set of distinct pixel block arrays and the second comparison pixel group array in that pixel group pair corresponds to one of the distinct pixel block arrays in the second set of distinct pixel block arrays. As well, each of the distinct pixel block arrays in the first set of distinct pixel block arrays corresponds to the first comparison pixel group array in a pixel group pair and each of the distinct pixel block arrays in the second set of distinct pixel block arrays corresponds to the second comparison pixel group array in a pixel group pair.

The processor module can be further operated to associate each pixel group pair with its distortion measure. The distortion measure associated with each pixel group pair may correspond to the distortion between the first comparison pixel group array and the second comparison pixel group array in that pixel group pair. The processor module can also determine a joint distribution weight for each pixel group pair based on the first distribution weight corresponding to the first comparison pixel group array and the second distribution weight corresponding to the second comparison pixel group array.

At 470, the processor module is operated to determine the average pixel group pair distortion for the plurality of pixel group pairs. The average pixel group pair distortion may represent the expected value of the distortion measure for a pixel group pair that is determined based on the distortion measure and joint distribution weight for each pixel group pair. In some embodiments, the similarity distance between the first image and the second image can be determined based on the average pixel group pair distortion.

In some embodiments, the first pixel group set and the second pixel group set may be a first set of related images and a second set of related images respectively. The computer module may be operable to generate a first set of related images $\phi(A)$ by transforming the first digitized image A using a suitable set mapping $\phi$. The computer module may generate the first set of related images $\phi(A)$ using various set mappings described herein such as, for example, the set mappings described in equations (5) and (7), or any other suitable set mappings. In some embodiments, the first set of related images $\phi(A)$ may comprise a set of digitized images that are perceptually similar to the first digitized image A. In some embodiments, the first set of related images $\phi(A)$ may comprise at least one digitized image that is not perceptually similar to the first digitized image A. Some examples of suitable set mappings are discussed in greater detail in Section 2.

Set mappings may include a plurality of pixel block permutations that can be applied to an original digitized image to generate a set of related images, such that, for each pixel block permutation there is a corresponding digitized image in the set of related images obtained by applying that pixel block permutation to the original image. In some embodiments, the computer module may generate a first set of related images $\phi(A)$ by partitioning the first digitized image A into a plurality of non-overlapping blocks and permuting, or re-arranging, the non-overlapping blocks in the first digitized image A to generate the digitized images in the first set of related images $\phi(A)$.

In some embodiments, the computer module may also generate one or more digitized pattern images having a pattern block size corresponding to the size of the non-overlapping blocks into which A was partitioned. In some embodiments, the first set of related images $\phi(A)$ may be generated by partitioning the first digitized image A into a plurality of non-overlapping blocks and superimposing a pattern block to each of the non-overlapping blocks, where the pattern block corresponds to the repeating pattern block of the digitized pattern image using a matrix addition, as well as permuting, or re-arranging, the blocks to generate the digitized images in the first set of related images $\phi(A)$. In some embodiments, the first set of related images $\phi(A)$ may be generated by repeating this process for a plurality of digitized pattern images. Some set mappings that may be used in various embodiments are described in examples 2-6 in Section 2.

The computer module may then generate a second set of related images $\phi(B)$ based on the second digitized image B using the same set mapping $\phi$. The computer module may compare the first set of related images $\phi(A)$ and the second set of related images $\phi(B)$ to determine a similarity distance between the first digitized image A and the second digitized image B.

In embodiments of the systems and methods described herein, the computer module may determine a similarity distance between a first digitized image A and a second digitized image B using various approaches, examples of which are discussed in greater detail in Sections 3 and 4.

As is discussed in more detail in Section 2, these approaches may similarly be applied to sketched or extended versions of the first digitized image A and the second digitized image B. In some embodiments, a first digitized image A may correspond to a sketched version of an original digitized image obtained using a transparent composite model. The approaches described herein may also be applied in instances where the original images being compared are different sizes or images having a plurality of component images, such as color images. In some embodiments, the first digitized image A may correspond to a first original image with a first plurality of dummy pixels inserted into the boundaries of the first original image, and the second digitized image B may correspond to a second original image with a second plurality of dummy pixels inserted into the boundaries of the second original image. In some cases, this may be used to determine a similarity distance between two original images having different initial sizes, as discussed in Remark 2. In some embodiments, dummy pixels may be inserted into only one of the first original image and the second original image. In some embodiments, the distortion function or distortion measure may be modified such that the distortion between a dummy pixel and a corresponding pixel is zero. In some embodiments, a similarity distance between a first digitized image A and a second digitized image B may be determined based on a weighted sum of the similarity difference between image components of the first digitized image A and a second digitized image B respectively. For example, a similarity distance between two color images may be a weighted sum of the similarity difference between their respective color components, as described in Section 2.2 and example 7.

In some embodiments, the computer module may determine a plurality of image pairs, each of the image pairs comprising a first comparison image X from the first set of related images $\phi(A)$ and a second comparison image Y from the second set of related images φ(B). In some cases, each of the digitized images in the first set of related images φ(A) corresponds to a first comparison image X in one of the image pairs and each of the digitized images in the second set of related images φ(B) corresponds to a second comparison image Y in one of the image pairs. Each of the pixel group pairs can be associated with a pixel group pair distortion that represents the distortion between the first comparison image X and the second comparison image Y in that image pair determined according to a suitable distortion measure d. In some embodiments, the distortion measure between a first comparison image X and a second comparison image Y may be determined by computing an average distortion between corresponding pixels in the first comparison image X and the second comparison image Y according to the distortion measure d. In some embodiments, the computer module may identify a lowest image pair distortion corresponding to the image pair having the lowest determined distortion measure and the computer module may determine the similarity distance between the first digitized image A and the second digitized image B based on the lowest image pair distortion.

In some embodiments, the computer module may determine a similarity distance using equations (2) and (19) directly. As discussed in Section 4, the computer module may use a weighted bipartite graph approach to determine the similarity distance using equations (2) and (19). In some embodiments, where the first digitized image A comprises an arrangement of M pixels by N pixels, the computer module may identify within the first digitized image A a plurality of non-overlapping blocks of k pixels by l pixels, wherein k is a factor that divides into M with no remainder and l is a factor that divides into N with no remainder. In some cases, this may be referred to as partitioning the first digitized image A into a plurality of non-overlapping blocks. The computer module may similarly identify within the second digitized image B a plurality of non-overlapping blocks of k pixels by l pixels. In some embodiments, the computer module may then associate a weighted bipartite graph G with the first digitized image A and the second digitized image B and determine a minimum weight of perfect matchings using known algorithms for weighted bipartite matching. The computer module may determine the similarity distance between the first digitized image A and the second digitized image B based on the matching having the lowest determined weight. In some embodiments, each block in the first digitized image A may correspond a vertex of one side of the bipartite graph and each block in the second digitized image B may correspond a vertex of the other side of the bipartite graph. An example of converting the calculation of equations (2) and (19) into a minimum weight bipartite matching problem is discussed in greater detail in Section 4.2 with regard to a first image A expressed as an M×N matrix comprised of matrix elements of non-overlapping blocks k×l blocks (see, for example equation 33). As described in Section 4.2 this approach may similarly be used for extended versions of images such as those developed in Example 6.

In some cases, the computer module may determine an average block of k pixels by l pixels for the first digitized image A and the second digitized image B respectively and generate two pattern images, one pattern image for A and one pattern image for B, each pattern image having a repeating pattern block with a pattern block size of k pixels by l pixels corresponding to the determined average block for A and B respectively. In some cases, the first digitized image A may have its corresponding pattern image superimposed thereon prior to having the weighted bipartite graph G associated therewith. Similarly, the second digitized image B may have its corresponding pattern image superimposed thereon prior to having the weighted bipartite graph G associated therewith.

In some embodiments, the computer module may use various methods to prune the weighted bipartite graph G prior to identifying the matching with the lowest matching weight. In some embodiments, the computer module may first determine the minimum weight of perfect matchings for a weighted bipartite graph $G_K$ where the first digitized image A and the second digitized image B have been partitioned using larger blocks of K pixels by L pixels, where k is a factor of K and l is a factor of L, and identify edges of that perfect matching. In some embodiments, the computer module may then construct a weighted bipartite graph $G_k$ for the partitioning of the first digitized image A and the second digitized image B using blocks of k pixels by l pixels and reduce the number of edges in $G_k$ that will be examined by pruning the edges from $G_k$ whose two vertices are not joined by an edge identified in the perfect matching determined for $G_K$. In some embodiments, the computer module may construct the weighted bipartite graph $G_k$ and reduce the number of edges of $G_k$ that will be examined by pruning all edges that are not within a T neighborhood of an edge in $G_k$ whose two vertices were joined by an edge identified in the perfect matching determined for $G_K$. In some embodiments, a T neighborhood of a first block corresponds to all other blocks within T blocks of that first block, where T is a non-negative integer. For example, where T=1, the blocks in the T neighborhood of a first block may consist of all blocks horizontally or vertically adjacent to the first block. Examples of these embodiments are described in greater detail in Section 4, in particular with regard to Algorithms 1 and 2. In some embodiments, the same approach may be used where the computer module partitions the first digitized image A and the second digitized image B into a plurality of sliding window blocks of k pixels by l pixels.

In some embodiments, the computer module may determine a similarity distance between a first digitized image A and a second digitized image B by first determining pixel block distributions $P_A$ and $P_B$ corresponding to A and B respectively. In some embodiments, the computer module may then determine a translation invariant distance $T_d$ between $P_A$ and $P_B$ using equation (26). In some embodiments, the computer module may determine close lower bounds to the translation invariant distance $T_d$ between $P_A$ and $P_B$. In some embodiments, the computer module may determine the similarity distance between the first digitized image A and the second digitized image B based on the determined translation invariant distance $T_d$ or the determined close lower bounds to the translation invariant distance $T_d$.

In some embodiments, the first plurality of pixel group arrays and the second plurality of pixel group arrays may be a first plurality of pixel block arrays and a second plurality of pixel block arrays respectively. In some embodiments, the first digitized image A may comprise a first image array of M pixels by N pixels, where M and N are positive integers. In some embodiments, each pixel block array in the first plurality of pixel block arrays may be an array of k pixels by l pixels, where k is a factor divisible into M with no remainder and l is a factor divisible into N with no remainder. In some embodiments, the first plurality of pixel block arrays may comprise a plurality of non-overlapping pixel block arrays from the first image array. In some embodiments, the first plurality of pixel block arrays may comprise all non-overlapping pixel block arrays of k pixels by l pixels from the first image array such that a total number of pixel block arrays in the first plurality of pixel block arrays is equal to (M×N)/(k×l). In some embodiments, each pixel from the first image array may be present in exactly one pixel block array in the first plurality of pixel block arrays. In some embodiments, the first plurality of pixel block arrays may comprise all the pixel block arrays in the first image array having top left positions at (i×k+1, j×l+1), where i is an integer from 0 to (m/k) inclusively and j is an integer from 0 to (n/l) inclusively.

In some embodiments, the first plurality of pixel block arrays may comprise a plurality of sliding window pixel block arrays from the first image array. In some embodiments, the first plurality of pixel block arrays may comprise all sliding window pixel block arrays of k pixels by l pixels from the first image array such that the total number of pixel block arrays in the first plurality of pixel block arrays is equal to (M×N). In some embodiments, each pixel from the first image array may be present in (k×l) pixel block arrays in the first plurality of pixel block arrays. In some embodiments, the first plurality of pixel block arrays may comprise all pixel block arrays of k pixels by l pixels having top left positions at (i,j) in the first image array, where i is an integer from 1 to M and j is an integer from 1 to N, and wherein at least one of horizontal cyclic shifts and vertical cyclic shifts are invoked for pixel block arrays crossing the boundaries of the first image array.

The computer module may also generate the second plurality of pixels block arrays corresponding to the second digitized image B, and its corresponding second image array, in the same manner. Examples of pixel blocks corresponding to images are also discussed in Section 3.

In some embodiments, the computer module may receive or determine a first pixel block array distribution $P_A$, corresponding to a distribution of pixel block arrays in the first image array and a second pixel block array distribution $P_B$, corresponding to a distribution of pixel block arrays in the second image array. The first pixel block array distribution $P_A$ may represent an empirical distribution of the pixel block arrays in the first set of pixel block arrays in the first image array corresponding to the first digitized image A. The second pixel block array distribution $P_B$ may represent empirical distribution of all pixel block arrays in the second set of pixel block arrays in the second image array corresponding to the second digitized image B. In some embodiments, the computer module may also determine a joint pixel block array distribution $P_{AB}$ corresponding to a joint distribution of the pixel block arrays in the first set of pixel block arrays and the pixel block arrays in the second set of pixel block arrays. A joint pixel block array distribution $P_{AB}$ may be an empirical distribution of all pixel block array pairs having one pixel block array in the first set of pixel block arrays and one pixel block array in the second set of pixel block arrays.

In some embodiments, a plurality of distinct pixel block arrays having distinct arrangements of pixels may be identified in the first image array. The first pixel block array distribution $P_A$ may comprise a plurality of first distribution weights, wherein each first distribution weight corresponds to the number of instances in which a distinct pixel block array is present in the first image array. Similarly, the second pixel block array distribution $P_B$ may comprise a plurality of second distribution weights, wherein each second distribution weight corresponds to the number of instances in which a distinct pixel block array is present in the second image array. In embodiments where the total number of pixel block arrays in the first plurality of pixel block arrays is equal to (M×N)/(k×l), the first pixel block array distribution $P_A$ may comprise a first distribution weight that is an integer multiple of (k×l)/(M×N) for each distinct pixel block array in the first plurality of pixel block arrays. In embodiments where the total number of pixel block arrays in the first plurality of pixel block arrays is equal to (M×N) the first pixel block array distribution $P_A$ may comprise a first distribution weight that is an integer multiple of 1/(M×N) for each distinct pixel block array in the first plurality of pixel block arrays. The second pixel block array distribution $P_B$ and the corresponding second distribution weights may be determined in the same manner. Some examples of pixel block array distributions are also described in Section 3, as well as Appendices B and C.

In some embodiments, the computer module may determine a similarity distance between a first digitized image A and a second digitized image B based on an expected distortion value between the first plurality of pixel block arrays and the second plurality of pixels block arrays. A plurality of pixel group pairs may be determined by the computer module based on the first plurality of pixel block arrays and the second plurality of pixels block arrays, and each pixel group pair may be associated with its distortion measure. In some embodiments, the computer module may determine the expected distortion value by determining a distortion measure between a plurality of pixel block array pairs according to a suitable distortion measure d, wherein each pixel block array pair comprises a first comparison pixel block array from the first plurality of pixel block arrays and a second comparison pixel block array from the second plurality of pixel block arrays. In some embodiments, the distortion between a pixel block array pair may be determined by determining the distortion between corresponding pixels in the first comparison pixel block array and the second comparison pixel block array. In some embodiments, the distortion between a pixel block array pair may be determined as an average pixel distortion between each corresponding pixel in the first comparison pixel block array and the second comparison pixel block array.

In some embodiments, the expected value or average pixel group pair distortion may be determined based on an average pixel block array distortion between the plurality of pixel block array pairs. In some embodiments, the average pixel block array distortion may be determined based on the distortion determined for each pixel block array pair in the plurality of pixel block pairs and a distribution weight assigned to each pixel block array pair, wherein the distribution weight is determined based on the first pixel block distribution $P_A$ and the second pixel block distribution $P_B$. In some embodiments, a distribution weight assigned to each pixel block array pair may be determined based on the joint pixel block array distribution $P_{AB}$. In some embodiments, pixel block array pairs may also be grouped into distinct pixel block array pairs and a distortion between pixel block array pairs for each distinct pixel block array pair may only be determined once.

In some embodiments, the computer module may also generate a first pattern image and a second pattern image. In some embodiments, the first pattern image may comprise a first pattern image array of M pixels by N pixels, wherein the first pattern image array comprises a plurality of non-overlapping first pattern block arrays of k pixels by l pixels. In some embodiments, each of the first pattern block arrays in the first pattern image array may comprise the same arrangement of pixels. In some embodiments, the first pattern block array may be determined as an average pixel block array of all pixel block arrays in the first plurality of pixel block arrays. The computer module may generate a second pattern image in the same manner as the first pattern image.

In some embodiments, a first comparison pixel block array may be generated by superimposing the pixels from one of the pixel block arrays in the first plurality of pixel block arrays and the pixels of a first pattern block array. Similarly, a second comparison pixel block array may be generated by superimposing the pixels from one of the pixel block arrays from the second plurality of pixel block arrays and the pixels of a second pattern array. In some embodiments, pixels may be superimposed using matrix addition. In some embodiments, a similarity distance may be determined by determining a greatest lower bound, for any first pattern block array and any second pattern block array, of an expected value of a distortion measure between a first comparison pixel block array and a second comparison pixel block array, where an expected value of the distortion measure may be determined in various manners as described herein.

Examples of various approaches to determining similarity distances based on an expected value of a distortion measure are described in further detail in Section 3, in particular with regard to equations (22) to (26). Further examples of this approach where the distortion function $d(x,y)=|x-y|^2$ is used, are discussed in Corollary 3, in particular with regard to equations (29) to (32). Further details regarding the determination of similarity distances based on expected values of distortion are also provided in Appendix C.

In some embodiments, the computer module may receive a plurality of digitized comparator images. The computer module may generate a plurality of pixel group arrays in any of the manners described herein, where each pixel group array corresponds to one of the digitized comparator images. The computer module may determine a similarity distance between the first digitized image A and each of the digitized comparator images by comparing the first pixel group array with each pixel group array corresponding to each of the digitized comparator images according to the various methods described herein. The computer module may determine a most similar digitized comparator image by identifying a smallest similarity distance between the first digitized image A and the plurality of digitized comparator images.

In some embodiments, the computer module may display the most similar digitized comparator image to a user on a display device or output the most similar digitized comparator image using a suitable output device such as a printer. In some embodiments, the computer module may output or display the plurality of digitized comparator images arranged according to the determined similarity distances between each of the digitized comparator images and the first digitized image A, an example of which can be seen in FIGS. 15A to 15E.

In some embodiments, the computer module may use a determined similarity distances between a plurality of images to group the images for storage and retrieval purposes. In some embodiments, the computer module may arrange a plurality of images for storage in a data storage system according to the similarity distances determined amongst the plurality of images.

The rest of the specification is organized as follows. Section 2 formally defines the SMID $d_\phi(A,B)$, analyzes its distance property, and also presents some examples of $\phi$. Section 3 establishes analytic formulas for and lower bounds to $d_\phi(A,B)$ for some set mappings $\phi$. In Section 4, the computation of $d_\phi(A,B)$ according to its definition given in Section 2 is linked to the weighted bipartite matching problem for some $\phi$, and two example algorithms called two-stage algorithms are presented to find an approximation for $d_\phi(A,B)$ from above. In Section 5, the SMID $d_\phi(A,B)$ is computed with various block sizes, and are compared against popular signature based similarity functions, which demonstrates the superiority of the SMID $d_\phi(A,B)$ over popular signature based similarity functions in terms of their consistency with human perceptual similarity.

2 SMID Definition and its Distance Properties

In this section, we will formally introduce the notion of SMID and analyze its distance properties. We begin with gray-scale images.

2.1 Gray-Scale Images

Let $$\Omega=\{A: A=(a(i,j)), -\infty<a(i,j)<+\infty, 1\leq i\leq m, 1\leq j\leq n\}$$

denote the set of all gray-scale images of size n×m. To facilitate our subsequent discussion, here each pixel is allowed to take any real value in the real line $\mathbb{R}$. Let $\phi$ be a mapping which maps each image $A\in\Omega$ to a non-empty set of images $\phi(A)\subset\Omega$. Hereafter, such a mapping $\phi$ will be referred to as an image set mapping or simply a set mapping.

Definition 1 Given a set mapping $\phi$ and pixel value distortion function d: $\mathbb{R}\times\mathbb{R}\to[0,+d]$, the SMID between any two images A=(a(i,j)) and B=(b(i,j)), A,B$\in\Omega$ with respect to $\phi$ and d is defined as $$d_\phi(A,B) \stackrel{\Delta}{=} \inf_{X\in\phi(A), Y\in\phi(B)} d(X,Y) \quad (2)$$

where $$d(X,Y) \stackrel{\Delta}{=} \frac{1}{mn}\sum_{i=1}^{m}\sum_{j=1}^{n} d(x(i,j), y(i,j)) \quad (3)$$

for $X=(x(i,j))$ and $Y=(y(i,j))$.

In the case where the image set $\phi(A)$ for each image $A\in\Omega$ consists of all images in Ω which are perceptually similar to A, then $d_\phi(A,B)=0$ if and only if A and B are similar, under the assumption that the pixel value distortion d is a distance over $\mathbb{R}$, perceptual similarity is an equivalence relation over Ω (i.e., satisfying the reflexive, symmetric and transitive properties), and the infimum in (2) is achievable. In what follows, we will give several exemplary mappings $\phi$ which reflect some understandings on when humans would regard two images as similar.

Example 1

Let k and l be a factor of m and n, respectively. For each image A=(a(i,j)) in Ω, let $\phi_0^{k,l}(A)$ be the set of all images $X\in\Omega$ which are obtained from A by permuting a finite number of non-overlapping k×l-blocks of A. (Throughout the specification, a block of size k×l (i.e., having k rows and l columns) is referred to as a k×l-block.) For example, if $X=(x(i,j))$ satisfies $$x(i,j) = \begin{cases} a(i_2+i-1, & \text{if } (i,j) \in [1,k] \times [1,l] \\ \quad j_2+j-1) & \\ a(i-i_1+1, & \text{if } (i,j) \in [i_1, i_1+k-1] \times \\ \quad j-j_1+1) & \quad [j_1, j_1+l-1] \\ a(i-i_2+i_1, & \text{if } (i,j) \in [i_2, i_2+k-1] \times \\ \quad j-j_2+j_1) & \quad [j_2, j_2+l-1] \\ a(i,j) & \text{otherwise} \end{cases} \quad (4)$$

where $(i_1, j_1) \notin [1,k] \times [1,l]$, and $i_2 \geq i_1+k$ or $j_2 \geq j_1+k$, then $X \in \phi_0^{k,l}(A)$. The image X defined in (4) is obtained from A by permuting non-overlapping k×l-blocks of A with their top left positions at (1,1), $(i_1, j_1)$, $(i_2, j_2)$, respectively. Clearly, the motivation behind the definition of the set mapping $\phi_0^{k,l}(A)$ is to reflect the understanding that if one moves objects in A around, the resulting image will often look similar to A to humans.

Definition 2

Given a set mapping $\phi$, a binary relation ~ over $\Omega$ is said to be induced by $\phi$ if for any $A, B \in \Omega$, A~B if and only if $B \in \phi(A)$. Denote such a binary relation by $\sim_\phi$. A set mapping (I:1 is said to be transitive if its induced binary relation $\sim_\phi$ is an equivalence relation.

Theorem 1

A set mapping $\phi$ is transitive if and only if
(a) for any $A \in \Omega$, $A \in \phi(A)$; and
(b) for any $A, B \in \Omega$, $\phi(A)$ and $\phi(B)$ are either the same or disjoint. In particular, when $\phi$ is transitive, we have $\phi(B) = \phi(A)$ for any $B \in \phi(A)$.

Proof: Let us first prove that Conditions (a) and (b) are necessary. Suppose that $\phi$ is transitive. Then Condition (a) follows from the reflexivity of the binary relation $\sim_\phi$. To show Condition (b), assume that $\phi(A)$ and $\phi(B)$ are not disjoint with $C \in \phi(A) \cap \phi(B)$. Then $A \sim_\phi C$ and $B \sim_\phi C$. This, together with the symmetry and transitivity of $\sim_\phi$, implies that $A \sim_\phi B$. By the definition of $\sim_\phi$, we have $B \sim_\phi I$ for any $I \in \phi(B)$. Applying the transitivity of $\sim_\phi$ again, we get $A \sim_\phi I$ for any $I \in \phi(B)$. Thus $\phi(B) \subset \phi(A)$. By symmetry, we also have $\phi(A) \subset \phi(B)$. Therefore, $\phi(B) = \phi(A)$. This completes the proof of the necessary conditions.

We now demonstrate that Conditions (a) and (b) are also sufficient. Clearly, Condition (a) implies that $\sim_\phi$ be reflexive. If $A \sim_\phi B$, then by definition of $\sim_\phi$, $B \in \phi(A)$, which, together with Condition (a), implies that $\phi(A)$ and $\phi(B)$ overlap with each other. Thus it follows from Condition (b) that $\phi(A) = \phi(B)$ in this case. By Condition (a) again, we then have $A \in \phi(B)$, i.e., $B \sim_\phi A$, demonstrating the symmetry of $\sim_\phi$. Likewise, if $A \sim_\phi B$ and $B \sim_\phi C$, by a similar argument we have $\phi(A) = \phi(B) = \phi(C)$, which, together with Condition (a) again, implies $C \in \phi(A)$, i.e., $A \sim_\phi C$, demonstrating the transitivity of $\sim_\phi$. This completes the proof of the sufficient conditions and hence Theorem 1.

Theorem 1 implies that there be a one to one correspondence between transitive mappings $\phi$ and equivalence relations over $\Omega$. It is not hard to see that the set mapping $\phi_0^{k,l}$ is not transitive. In general, characterizing and computing $d_\phi(A, B)$ is harder for non-transitive mappings $\phi$ than transitive mappings $\phi$ since characterizing a non-transitive mapping $\phi$ itself is difficult in general. Below we present several transitive mappings $\phi$.

Example 2

Let k and l be a factor of m and n, respectively. For each image $A = (a(i,j))$ in $\Omega$, partition it into non-overlapping k×l-blocks; let $\phi_1^{k,l}(A)$ be the set of all images $X \in \Omega$ which are obtained from A by permuting only those partitioned blocks in A.

In comparison with $\phi_0^{k,l}(A)$, each X in $\phi_1^{k,l}(A)$ is obtained from A by permuting non-overlapping k×l-blocks with their top left positions at (ik+1, jl+1), i=0, 1, 2, ..., j=0, 1, 2, ... only. In view of Theorem 1, it is not hard to see that $\phi_1^{k,l}$ is transitive. When k and l are small in comparison with m and n, $\phi_1^{k,l}$ still reflects the understanding that if one moves objects in A around, the resulting image will often look similar to A to humans.

Example 3

Let k and l be a factor of m and n, respectively. An image $P \in \Omega$ is called a pattern image with pattern size k×l if its k×l-blocks with top left positions at (ik+1, jl+1), i=0, 1, 2, ..., j=0, 1, 2, ... are all the same. For each image $A = (a(i,j))$ in $\Omega$, let $$\phi_2^{k,l}(A) \triangleq U_P \phi_1^{k,l}(A+P) \quad (5)$$

where the union is taken over all pattern images P with pattern size k×l, and the addition is the matrix addition with A and P regarded as m×n matrices. The inclusion of P in the definition of $\phi_2^{k,l}(A)$ reflects the understanding that the superpositioned image A+P still looks similar to A to humans.

Theorem 2 $\phi_2^{k,l}$ is transitive.

Proof: Since $A \in \phi_2^{k,l}(A)$ for any $A \in \Omega$, it follows from Theorem 1 that it suffices to show that for any $A, B \in \Omega$, $\phi_2^{k,l}(A)$ and $\phi_2^{k,l}(B)$ are either the same or disjoint. Suppose that $\phi_2^{k,l}(A)$ and $\phi_2^{k,l}(B)$ are not disjoint with $C \in \phi_2^{k,l}(A) \Omega \phi_2^{k,l}(B)$. Let $\pi$ denote a generic permutation which permutes k×l-blocks with top left positions at (ik+1, jl+1), i=0, 1, 2, ..., j=0, 1, 2, .... Then there exist a permutation $\pi_1$ and a pattern image $P_1$ with pattern size k×l such that $$C = \pi_1(A+P_1).$$

It can be verified that $$\phi_2^{k,l}(C) = \bigcup_P \phi_1^{k,l}(C+P) = \bigcup_P \phi_1^{k,l}(\pi_1(A+P_1)+P) \stackrel{1)}{=} \quad (6)$$

$$\bigcup_P \phi_1^{k,l}(\pi_1(A+P_1+P)) \stackrel{2)}{=} \bigcup_P \phi_1^{k,l}(A+P_1+P) = \phi_2^{k,l}(A)$$

where the equality 1) is due to the fact that P is a pattern image with pattern size k×l, and the equality 2) follows from the fact that $\phi_1^{k,l}$ is transitive. By symmetry, we also have $\phi_2^{k,l}(C) = \phi_2^{k,l}(B)$. Thus, $\phi_2^{k,l}(A) = \phi_2^{k,l}(B)$. This completes the proof of Theorem 2.

Example 4

Let k and l be a factor of m and n, respectively. A pattern image $P \in \Omega$ with pattern size k×l is said to be binary if its pixel takes values over $\{1, -1\}$. For each image $A = (a(i,j))$ in $\Omega$, let $$\phi_3^{k,l}(A) \triangleq U_B \phi_2^{k,l}(A \odot B) \quad (7)$$

where the union is taken over all binary pattern images B with pattern size k×l, and $\odot$ denotes the element wise matrix multiplication with A and B regarded as m×n matrices. In view of Theorem 1, an argument similar to that of the proof of Theorem 2 can be used to show that $\phi_3^{k,l}$ is also transitive. The inclusion of binary pattern images B in the definition of $\phi_3^{k,l}(A)$ reflects the understanding that if one swaps black and white colors in A, the resulting image would still look similar to A to humans (see W. K. Pratt, Digital Image Processing (fourth edition). John Wiley & Sons, Inc., 2007, hereinafter referred to as [29]).

Definition 3

A set mapping $\phi$ and pixel value distortion function d are said to satisfy a symmetry condition if for any $A,B \in \Omega$, $$\inf_{Y \in \phi(B)} d(X_1, Y) = \inf_{Y \in \phi(B)} d(X_2, Y) \tag{8}$$

for any $X_1, X_2 \in \phi(A)$.

Theorem 3

Let $\phi$ and d be a set mapping and pixel value distortion function satisfying the symmetry condition (8). Suppose that there is a continuous, strictly increasing function h: $[0, +\text{set}0, +\text{pp}$ such that $h(d(X,Y))$ is a distance over $\Omega$, where $d(X,Y)$ is defined in (3). Then the following hold:

(a) $h(d_\phi(A,B))$ is a pseudo distance over $\Omega$.

(b) If $\phi$ is also transitive and the infimum in (2) is achievable for any $A,B \in \Omega$, then $$d_\phi(A,B)=0$$

if and only if $B \in \phi(A)$.

Proof: Recall that a function $f: \Omega \times \Omega \to [0, +\infty)$ is called a pseudo distance over $\Omega$ if it satisfies the following three conditions for any A,B, $C \in \Omega$:

$$f(A,A)=0; \tag{c1}$$

$$f(A,B)=f(B,A); \text{ and} \tag{c2}$$

$$f(A,B) \leq f(A,C)+f(C,B). \tag{c3}$$

Since h: $[0, +\infty) \to [0, +\infty)$ is continuous and strictly increasing, it follows from (2) that $$h(d_\phi(A, B)) = h\left(\inf_{X \in \phi(A), Y \in \phi(B)} d(X, Y)\right) \tag{9}$$

$$= \inf_{X \in \phi(A), Y \in \phi(B)} h(d(X, Y)).$$

Conditions (c1) and (c2) then follow immediately from the assumption that $h(d(X,Y))$ itself is a distance over $\Omega$. To prove Condition (c3), i.e., the triangle inequality, note that for any $\varepsilon>0$, $$h(d_\phi(A, C)) + h(d_\phi(C, B)) + \varepsilon = \tag{10}$$

$$\inf_{Z_1 \in \phi(C)} h(d(X, Z_1)) + h(d_\phi(C, B)) + \varepsilon \geq$$

$$h(d(X, Z)) + h(d_\phi(C, B)) + \frac{\varepsilon}{2}$$

$$= h(d(X, Z)) + \inf_{Y_1 \in \phi(B)} h(d(Z, Y_1)) + \frac{\varepsilon}{2} \geq h(d(X, Z)) + h(d(Z, Y)) \tag{11}$$

$$\geq h(d(X, Y)) \tag{12}$$

$$\geq h(d_\phi(A, B)) \tag{13}$$

for some $X \in \phi(A), Z \in \phi(C), Y \in \phi(B)$. In the above, (10) and (11) follow from the symmetry condition (8) and the fact that $h(\cdot)$ is continuous and strictly increasing, and (12) is due to the triangle inequality of $h(d(X,Y))$ as a distance itself.

Letting $\varepsilon \to 0$ in (10)-(13) then yields the triangle inequality of $h(d_\phi(A,B))$. This completes the proof of Part (a).

We next prove Part (b). Once again since $h(\cdot)$ is continuous and strictly increasing and $h(d(X,Y))$ is a distance itself, it is not hard to verify that $$d_\phi(A,B)=0 \text{ if and only if } h(d_\phi(A,B))=0. \tag{14}$$

This, together with Theorem 1 and (9), implies that if $B \in \phi(A)$, then $$d_\phi(A,B)=0.$$

On the other hand, if $d_\phi(A,B)=0$, then it follows from (14) that $$0 = h(d_\phi(A, B)) \tag{15}$$

$$= h\left(\inf_{X_1 \in \phi(A), Y_1 \in \phi(B)} d(X_1, Y_1)\right)$$

$$= h(d(X, Y))$$

for some $X \in \phi(A), Y \in \phi(B)$, where the last equality is due to the assumption that the infimum in (2) is achievable. This, together with the assumption that $h(d(X,Y))$ is a distance itself, implies $$X=Y \in \phi(A) \cap \phi(B).$$

In view of Theorem 1, we then have $$\phi(A)=\phi(B) \text{ and hence } B \in \phi(A).$$

This completes the proof of Part (b) and hence Theorem 3.

Examples of d and h such that $h(d(X,Y))$ is a distance itself include $$d(x,y)=|x-y|^r, x,y \in \mathbb{R}, \text{ and } h(d)=d^{1/r} \tag{16}$$

for some $r \geq 1$. Applying Theorem 3 to $\phi_i^{k,l}$, i=1, 2, 3, with d and h given in (16), we get the following corollary, which will be proved in Appendix A.

Corollary 1

Let $d(x,y)=|x-y|^r$, x, $y \in \mathbb{R}$, where $r \geq$. Then the following hold for i=1, 2, 3:

(a) $d_{\phi_i^{k,l}}^{1/r}(A,B)$ is a pseudo distance over $\Omega$.

(b) $d_{\phi_i^{k,l}}(A,B)=0$ if and only if $B \in \phi_i^{k,l}(A)$.

Discussion: Part (b) of Corollary 1 sheds some light on the discriminative power of $d_{\phi_i^{k,l}}(A,B)$. From Part (b) of Corollary 1, it is clear that the set $\phi_i^{k,l}(A)$ for each $A \in \Omega$ should be small enough so that $d_{\phi_i^{k,l}}(A,B)$ has enough discriminative power; on the other hand, $\phi_i^{k,l}(A)$ should be large enough so that it indeed includes images similar to A. In case of $\phi_1^{k,l}$, it is not hard to see that $$\phi_1^{k,l}(A) \subset \phi_1^{k_1,l_1}(A) \tag{17}$$

and hence $$d_{\phi_1^{k,l}}(A, B) \geq d_{\phi_1^{k_1,l_1}}(A, B) \tag{18}$$

for any $k_1 | k$ and $l_1 | l$. For in view of (5), the increase of k and/or l has double-edged impacts on $\phi_2^{k,l}(A)$: on one hand, it reduces $\phi_1^{k,l}(A+P)$ for each pattern image P with pattern size k×l; on the other hand, it includes more images as pattern images in the union in (5). Similar double-edged impacts on $\phi_3^{k,l}(A)$ also exist. Therefore, given an image size n×m, choosing a right block size k×l is quite influential, which will be further discussed in the experimental result section 5.

Although the SMID $$d_{\phi_i^{k,l}}(A, B)$$

is defined for any two images $A,B \in \Omega$, it does not have to be always applied directly to the original images A,B. To reflect humans' understanding on different types of image similarity, $$d_{\phi_i^{k,l}}$$

can also be applied to sketched or extended versions of A and B as well. For example, in some cases, when two images A and B are compared by humans for their similarity, the background of these two images may be ignored, especially when they contain visible objects. Thus, in some cases we may apply $d_{100\ j}^{k,l}$ to sketched versions of these images.

Example 5

Let k and l be a factor of m and n, respectively. In E.-H. Yang, X. Yu, J. Meng, and C. Sun, "Transparent composite model for DCT coefficients: Design and analysis", IEEE Trans. on Image Processing, vol. 23, no. 3, pp. 1303-1316, March 2014, hereinafter referred to as [20], and E.-H. Yang and X. Yu, "Transparent composite model for large scale image/video processing", Proc. of the 2013 IEEE conference on BigData, Santa Clara, Calif., October 6-9, pp. 38-44, 2013, hereinafter referred to as [21], a new theoretic model called a transparent composite model (TCM) was proposed for transformed image data. The TCM naturally allows us to obtain a sketched version of the original image called the outlier image which retains only some eye-catching objects in the original image while ignoring its background. For each image $A \in \Omega$, let $\theta(A)$ denote its outlier image or variant. Define for any $A,B \in \Omega$ $$d_{\phi_{i,\theta}^{k,l}}(A, B) \triangleq d_{\phi_i^{k,l}}(\theta(A), \theta(B)).$$

In view of Corollary 1, it is easy to see that when $$d(x, y) = |x - y|^r, d_{\phi_{i,\theta}^{k,l}}^{1/r}(A, B)$$

is a pseudo distance over $\Omega$ as well, and $$d_{\phi_{i,\theta}^{k,l}}(A, B) = 0$$

if and only if $B \in \theta^-(\phi_i^{k,l}(\theta(A)))$, where for any set S, $\theta^-(S) = \{C \in \Omega : \theta(C) \in S\}$.

The following example illustrates an application of $$d_{\phi_i^{k,l}}$$

to extended versions of original images.

Example 6

Let k and l be a factor of m and n, respectively. For each image $A=(a(i,j))$ in $\Omega$ and any $(v,h) \in [0,k-1] \times [0,l-1]$, let $\tau^{v,h}(A)=(x(i,j))$ be the image in $\Omega$ obtained by moving every pixel in A in the horizontal direction by $-i$ cyclically and in the vertical direction by $-c$ cyclically, i.e., $$x(i,j)=a(i \ominus v, j \ominus h)$$

for any $1 \leq i \leq m$, $1 \leq j \leq n$, where $i \ominus v$ denotes the modulo m subtraction, and $j \ominus h$ denotes the modulo n subtraction. Let $\tau(A)$ be the image of size $(n \times k \times l) \times m$ obtained by stitching all images $\tau^{v,h}(A)$, $(v,h) \in [0,k-1] \times [0,l-1]$, together in some order. Define for any $A,B \in \Omega$ $$d_{\phi_{i,\tau}^{k,l}}(A, B) \triangleq d_{\phi_i^{k,l}}(\tau(A), \tau(B)). \quad (19)$$

In view of Corollary 1, it is easy to see that when $$d(x, y) = |x - y|^r, d_{\phi_{i,\tau}^{k,l}}^{1/r}(A, B)$$

is a pseudo distance over $\Omega$ as well, and $$d_{\phi_{i,\tau}^{k,l}}(A, B) = 0$$

if and only if $B \in \tau^-(\phi_i^{k,l}(\tau(A)))$. By extending A to $\tau(A)$, we are able to handle not only non-overlapping block permutation in Example 1 with ease, but also arbitrary overlapping block permutation in A.

In parallel with (18), we have the following result, which will be proved in Appendix B.

Theorem 4

Let $d(x,y)=|x-y|^2$. Then for any $A,B \in \Omega$, $$d_{\phi_{2,\tau}^{k,l}}(A, B) \geq d_{\phi_{2,\tau}^{k_1,l_1}}(A, B)$$

whenever $k_1 | k$ and $l_1 | l$.

Remark 1

To reduce the complexity of computing $$d_{\phi_{i,\tau}^{k,l}}(A, B),$$

there is no need in practice to stitch all images $\tau^{v,h}(A)$, $(v,h) \in [0,k-1] \times [0,l-1]$, together to form $\tau(A)$; stitching some of them together would be good enough, especially when the resolution of A is large.

Remark 2

Although we have assumed that images all have the same size in the definition of $d_\phi(A,B)$, what we have discussed so far can also be extended to the case where A,B have different sizes. Suppose that the size of B is smaller than that of A. To handle this size disparity, we can first expand B by inserting dummy pixels in its boundary so that the expanded B has the same size as that of A. We then modify the pixel value distortion function d so that the distortion between a dummy pixel in the expanded B and any pixel in A is 0. This is essentially equivalent to comparing B with regions of A of the same size for their similarity.

2.2 Component Images

Suppose now that each of images A,B has or can be decomposed into M component images, say, $A = \{A_1, \ldots, A_M\}$, and $B = \{B_1, \ldots, B_M\}$. Without loss of generality, assume that all component images have the same size, say $A_i, B_i \in \Omega$, $i=1, 2, \ldots, M$. All discussions made in Subsection 2.1 can be carried out to component images. In particular, we have the following definition.

Definition 4

Given a set mapping $\phi$ and pixel value distortion function $d: \mathbb{R} \times \mathbb{R} \to [0, +\infty)$, the SMID between any two component images $A = \{A_1, \ldots, A_M\}$ and $B = \{B_1, \ldots, B_M\}$ with respect to $\phi$ and d is defined as $$d_\phi(A, B) \triangleq \sum_{i=1}^M w_i d_\phi(A_i, B_i) \qquad (20)$$

where $w_i \geq h$ is a weight assigned to the ith component.

Example 7

Consider color images. Typically, each color image contains three components, which are red, green, and blue if the RGB color space is used, and luminance, blue chrominance, and red chrominance if the YCbCr color space is used. Whatever color space is adopted, the SMID between two color images is equal to a weighted sum of the SMIDs between their respective color components.

Taking gray-scale images as an example, in remaining sections, we will focus on $$d_{\phi_1^{k,l}}(A, B) \text{ and } d_{\phi_{1,\tau}^{k,l}}(A, B)$$

for i=2 since black and white color swapping represented by binary pattern images in Example 4 rarely happens in consumer photos, and $\phi_1^{k,l}(A)$ is included in $\phi_2^{k,l}(A)$ as a subset. As will be apparent to one skilled in the art, the principles discussed in the remaining sections may equally be applied to color images or other component images which may be decomposed from A, or using other suitable set mappings.

3 Characterization and Lower Bounds

In this section, we will establish analytic formulas for and lower bounds to $$d_{\phi_2^{k,l}}(A, B) \text{ and } d_{\phi_{2,\tau}^{k,l}}(A, B)$$

for any $A, B \in \Omega$.

To facilitate our subsequent discussions, we identify, from now on, a vector $x^{k,l} = (x_1, x_2, \ldots, x_{kl}) \in \mathbb{R}^{kl}$ with a k×l-block or matrix and vice versa. Given a pixel value distortion function $d: \mathbb{R} \times \mathbb{R} \to [0, +\infty)$, define for any $x^{k,l} = (x_1, x_2, \ldots, x_{kl}) \in \mathbb{R}^{kl}$ and $y^{k,l} = (y_1, y_2, \ldots, y_{kl}) \in \mathbb{R}^{kl}$ $$d(x^{k,l}, y^{k,l}) \triangleq \frac{1}{kl} \sum_{i=1}^{kl} d(x_i, y_i) \qquad (21)$$

and $$|x^{k,l} - y^{k,l}|^r = \frac{1}{kl} \sum_{i=1}^{kl} |x_i - y_i|^r.$$

For each image $A \in \Omega$, let $P_A^{k,l}$ be the empirical distribution of all non-overlapping k×l-blocks of A with top left positions at $(ik+1, jl+1)$, $i=0, 1, 2, \ldots, m/k-1$, $j=0, 1, 2, \ldots, n/l-1$, and let $Q_A^{k,l}$ be the empirical distribution of all sliding-window k×l-blocks of A with top left positions at $(i,j), 1 \leq i \leq m, 1 \leq j \leq n$, where both vertical and horizontal cyclic shifts mentioned in Example 6 are invoked for k×l-blocks crossing the boundaries of A. Clearly, both $P_A^{k,l}$ and $Q_A^{k,l}$ are probability distributions over $\mathbb{R}^{kl}$. In addition, for any random variables X and Y each taking values over $\mathbb{R}^{kl}$, let $P_X$ denote the marginal distribution of X over $\mathbb{R}^{kl}$, and $P_{XY}$ the joint distribution of X and Y over $\mathbb{R}^{kl} \times \mathbb{R}^{kl}$ respectively.

Definition 5

A joint distribution $P_{XY}$ is said to be an N-type for some integer N>0 if both X and Y are discrete, and $P_{XY}(x^{k,l}, y^{k,l})$ is an integer multiple of 1/N for any $x^{k,l}, y^{k,l} \in \mathbb{R}^{kl}$.

We then have the following analytic formulas for $$d_{\phi_2^{k,l}}(A, B) \text{ and } d_{\phi_{2,\tau}^{k,l}}(A, B),$$

which will be proved in Appendix C.

Theorem 5

For any pixel value distortion function $d: \mathbb{R} \times \mathbb{R} \to [0, +\infty)$ and any $A, B \in \Omega$, $$d_{\phi_2^{k,l}}(A, B) = \inf_{a^{k,l}, b^{k,l}} \min\{E[d(X + a^{k,l}, Y + b^{k,l})] : \qquad (22)$$
$$P_X = P_A^{k,l}, P_Y = P_B^{k,l}, P_{XY} \text{ is an } \frac{mn}{kl} - \text{type}\}$$

and $$d_{\phi_{2,\tau}^{k,l}}(A, B) = \inf_{a^{k,l}, b^{k,l}} \min\{E[d(X + a^{k,l}, Y + b^{k,l})] : \qquad (23)$$
$$P_X = Q_A^{k,l}, P_Y = Q_B^{k,l}, P_{XY} \text{ is an } mn - \text{type}\}$$

where the outer infimum in both (22) and (23) is taken over all $a^{k,l}, b^{k,l} \in \mathbb{R}^{kl}$, the inner minimization in (22) and (23) is taken over all jointly distributed random variables X, Y each taking values in $\mathbb{R}^{kl}$ with their joint distribution satisfying the respective conditions in (22) and (23), and E[ ] stands for expectation. In particular, when $d(x,y) = |x-y|^r$, we have $$d_{\phi_2^{k,l}}(A, B) = \inf_{a^{k,l}} \min\{E[|X - Y - a^{k,l}|^r] : \qquad (24)$$
$$P_X = P_A^{k,l}, P_Y = P_B^{k,l}, P_{XY} \text{ is an } \frac{mn}{kl} - \text{type}\}$$

and

-continued $$d_{\phi_{2,\tau}^{k,l}}(A, B) = \inf_{a^{k,l}} \min\{E[|X - Y - a^{k,l}|^r]:$$

$$P_X = Q_A^{k,l}, P_Y = Q_B^{k,l}, P_{XY} \text{ is an } mn-\text{type}\}$$

(25)

where the outer infimum in both (24) and (25) is taken over all $a^{k,l} \in \mathbb{R}^{kl}$.

Remark 3

It is worthwhile to point out that $$d_{\phi_1^{k,l}}(A, B) \text{ and } d_{\phi_{1,\tau}^{k,l}}(A, B)$$

are equal to the inner minimum of (22) and (23), respectively, with $a^{k,l}=0$ and $b^{k,l}=0$.

In view of (22) and (23), $$d_{\phi_2^{k,l}}(A, B)$$

$$\left(d_{\phi_{2,\tau}^{k,l}}(A, B), \text{resp.}\right)$$

depends on A and B only through its pixel block distributions $P_A^{k,l}$ and $P_B^{k,l}$ ($Q_A^{k,l}$ and $Q_B^{k,l}$ and resp.). Relaxing the type constraints in the inner minimization of (22) and (23) and defining for any probability distributions μ and ν over $\mathbb{R}^{kl}$ $$T_d(\mu, \nu) \triangleq \inf_{a^{k,l},b^{k,l}} \inf\{E[d(X + a^{k,l}, Y + b^{k,l})]:$$

$$P_X = \mu, P_Y = \nu\}$$

(26)

where the outer infimum is taken over all $a^{k,l}, b^{k,l} \in \mathbb{R}^{kl}$, and the inner infimum is taken over all jointly distributed random variables X,Y each taking values in $\mathbb{R}^{kl}$ with their marginal distributions $P_X=\mu$ and $P_Y=\nu$, we then get the following lower bounds.

Corollary 2

For any pixel value distortion function $d: \mathbb{R} \times \mathbb{R} \rightarrow [0, +\infty)$ and any $A, B \in \Omega$, $$d_{\phi_2}^{k,l}(A,B) \geq T_d(P_A^{k,l}, P_B^{k,l})$$

(27)

and $$d_{\phi_{2,\tau}}^{k,l}(A,B) \geq T_d(Q_A^{k,l}, Q_B^{k,l})$$

(28)

Remark 4

The reader who is familiar with the Monge-Kantorovich (MK) distance (see C. Villani, Topics in Optimal Transportation. Am. Math. Soc., Providence (2003), hereinafter referred to as [30]) would recognize that the inner infimum in (26) is actually equal to the MK distance between a translated distribution μ with the origin translated to $a^{k,l}$ and a translated distribution ν (with the origin translated to $b^{k,l}$) with respect to the pixel block distortion defined in (21) through the pixel value distortion function d. However, with the outer infimum over all $a^{k,l}$ and $b^{k,l}$, the new quantity $T_d(\mu,\nu)$ defined in (26) is not equal to the MK distance between μ and ν (with respect to the pixel block distortion) any more in general. For this reason, we shall coin a new name for the quantity $T_d(\mu,\nu)$ and refer to it as the translation invariant MK distance between μ and ν with respect to the pixel block distortion. In addition, although the concept of MK distance has been explored in image retrieval under the name of earth mover's distance (EMD) (see [3]; Y. Rubner, C. Tomasi, L. J. Guibas, "A metric for distributions with applications to image databases", Proc. of the 1998 ICCV, Bombay, India, pp. 59-66, 1998, hereinafter referred to as [22]), it has been mainly applied to signatures of images, which are in turn summarizations of features such as colors, textures, shapes, and salient points extracted from images, with respect to some underlying distance between feature vectors (see [3]; [22]; D. G. Lowe, "Distinctive image features from scale-invariant keypoints" Int. Journal of Computer Vision, 60, 2, pp. 91-110, 2004, hereinafter referred to as [6]; Y. Rubner, C. Tomasi, and L. J. Guibas, "The eartch mover's distance as a metric for image retrieval", Int. Journal of Computer Vision, 40(2), pp. 99-121, 2000, hereinafter referred to as [23]; O. Pele, and M. Werman, "Fast and robust eartch mover's distances", Proc. of the 2009 ICCV, Kyoto, Japan, pp. 460-467, September 2009, hereinafter referred to as [24]). With reference to FIG. 6, as discussed in Section 1, once images are abstracted into and represented by their signatures, the notion of distance between feature vectors and hence the resulting MK distance between signatures become absurd and less meaningful to the original images. On the other hand, the inner infimum of $T_d(P_A^{k,l}, P_B^{k,l})$ and $T_d(Q_A^{k,l}, Q_B^{k,l})$ is related to the MK distance between the pixel block distributions of A and B with respect to the pixel block distortion defined in (21) through the pixel value distortion function d and reflects the distance between two sets of images through the pixel value distortion function d. No feature extraction and no signature derivation are involved.

In the special case where $d(x,y)=|x-y|^2$, the outer infimum in (24) to (26) can be solved analytically, as shown below in Corollary 3.

Corollary 3 When $d(x,y)=|x,y|^2$, we have for any images $A,B \in \Omega$ and distributions μ and ν

$$d_{\phi_2^{k,l}}(A, B) = \min\{E[|X - Y|^2] - |E[X] - E[Y]|^2:$$

$$P_X = P_A^{k,l}, P_Y = P_B^{k,l}, P_{XY} \text{ is an } \frac{mn}{kl}-\text{type}\}$$

(29)

$$d_{\phi_{2,\tau}^{k,l}}(A, B) = \min\{E[|X - Y|^2] - |E[X] - E[Y]|^2:$$

$$P_X = Q_A^{k,l}, P_Y = Q_B^{k,l}, P_{XY} \text{ is an } mn-\text{type}\}$$

(30)

and $$T_d(\mu, \nu) = \inf\{E[|X - Y|^2] - |E[X] - E[Y]|^2:$$

$$P_X = \mu, P_Y = \nu\}.$$

(31)

Proof: For any jointly distributed random variables X and Y each taking values over $\mathbb{R}^{kl}$ with $P_X=Q_A^{k,l}$ and $P_Y=Q_B^{k,l}$, it is not hard to see that $$E[|X - Y - a^{k,l}|^2] =$$

$$E[|X - Y - (E[X] - E[Y])|^2] + |(E[X] - E[Y]) - a^{k,l}|^2 =$$

$$E[|X - Y|^2] - |E[X] - E[Y]|^2 + |(E[X] - E[Y]) - a^{k,l}|^2$$

(32)

for any $a^{k,l} \in \mathbb{R}^{kl}$. Interchanging the infimum over $a^{k,l} \in \mathbb{R}^{kl}$ with the minimization over X and Y in (25) and applying (32), we then get (30). Equations (29) and (31) can be proved similarly. This completes the proof of Corollary 3.

Given k and l, it is instructive to see how large the gaps $$d_{\phi_2^{k,l}}(A,B) - T_d(P_A^{k,l}, P_B^{k,l}) \text{ and } d_{\phi_{2,\tau}^{k,l}}(A,B) - T_d(Q_A^{k,l}, Q_B^{k,l})$$

are. Suppose that each pixel in A and B takes values from a finite set, which is the case in all digital images. Then in view of (22) to (26), these gaps are in the order of $$O\left(\frac{kl}{mn}\right) \text{ and } O\left(\frac{1}{mn}\right),$$

respectively for most pixel value distortion functions d including $d(x,y)=|x-y|^r$. Therefore, one could use $T_d(P_A^{k,l}, P_B^{k,l})$ and $T_d(Q_A^{k,l}, Q_B^{k,l})$ or their respective close lower bounds to approximate $$d_{\phi_2^{k,l}}(A,B) \text{ and } d_{\phi_{2,\tau}^{k,l}}(A,B)$$

from below, respectively. In the next section, we will compute $$d_{\phi_2^{k,l}}(A,B) \text{ and } d_{\phi_{2,\tau}^{k,l}}(A,B)$$

directly through their original definitions (2) and (19) by establishing their links to weighted bipartite matching.

4 SMID Calculation and Weighted Bipartite Matching

In this section, we take the squared error distortion $d(x,y)=|x-y|^2$ as an example. We first link the calculation of $$d_{\phi_2^{k,l}}(A,B) \text{ and } d_{\phi_{2,\tau}^{k,l}}(A,B)$$

to weighted bipartite matching (see J. Schwartz, A. Steger, and A. Weibl, "Fast algorithms for weighted bipartite matching", Lecture Notes in Computer Science, Vol. 3503, pp 476-487, 2005, hereinafter referred to as [25]; Vladimir Kolmogorov, "Blossom V: A new implementation of a minimum cost perfect matching algorithm." Mathematical Programming Computation, 1(1):43-67, July 2009, hereinafter referred to as [26]), and then present two algorithms to compute $$d_{\phi_2^{k,l}}(A,B) \text{ and } d_{\phi_{2,\tau}^{k,l}}(A,B)$$

from above. As will be apparent to one skilled in the art, similar approaches may be taken to link the minimum weighted bipartite matching problem to the SMID when a different distortion measure is used. We begin with reviewing the weighted bipartite matching problem and its solutions in the literature.

4.1 Review of Weighted Bipartite Matching

Figure 8A:
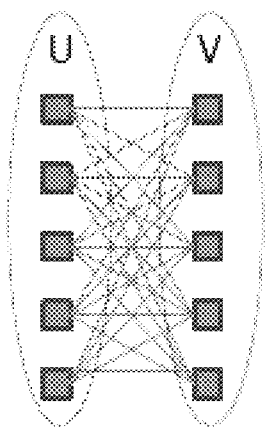
FIG. 8A illustrates an example embodiment of a complete bipartite graph.
Figure 8B:
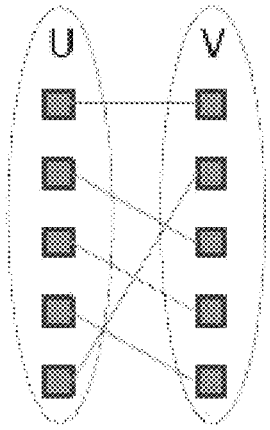
FIG. 8B illustrates an example embodiment of a partial bipartite graph with a perfect matching.

In graph theory, a weighted bipartite graph is a triple $G=(U\cup V,E,w)$, where U and V are two disjoint sets of vertices, E is a subset of U×V representing all edges, and w: $E\to[0,+\infty)$ is a weight function assigning to each edge $e\in E$ a weight w(e). A subset F of E is said to be a matching in G if no two edges in F are incident with a common vertex. A matching F is perfect if every vertex in G is incident to exactly one edge in F. A bipartite graph $G=(U\cup V,E,w)$ is complete if E=U×V. Referring now to FIGS. 8A and 8B, shown therein are example embodiments of bipartite graphs. FIG. 8A shows an example embodiment of a complete bipartite graph whereas FIG. 8B shows an example embodiment of a partial bipartite graph with a perfect matching. The weight w(F) of a matching F is defined as the sum of weights of its edges, i.e., $w(F)=\Sigma_{e\in F} w(e)$. Given a weighted bipartite graph G, the minimum weight bipartite matching problem is to find a perfect matching in G with minimum weight. Since only perfect matchings are compared, the existence of a perfect matching implies that |U|=|V|.

The minimum weight bipartite matching problem is also called the assignment problem in operations research, which has been well studied with solutions published starting from the 19th century by Carl Jacobi in Latin. A well-known solution, however, is the so-called Hungarian algorithm, which was invented in 1955 (see Harold W. Kuhn, "The Hungarian method for the assignment problem", Naval Research Logistics Quarterly, 2:83-97, 1955, hereinafter referred to as [17]). The original Hungarian algorithm has a time complexity $O(N^2M)$, where 2N is the total number of vertices in G and M is the number of edges in G. Later on, it was improved to achieve an O(NM) running time by Edmonds (see J. Edmonds. "Maximum matching and a polyhedron with 0-1 vertices", Journal of Research at the National Bureau of Standards, 69B:125-130, 1965, hereinafter referred to as [19]). A recent development on the Edmonds' algorithm, named Blossom-V, was published in 2009 by incorporating both a variable δ approach and the use of priority queues (see [26]). Though the new development does not improve the worst-case complexity, it reduces the average running time in practice by an order of magnitude when compared with earlier implementations (see [26]).

4.2 Conversion into Weighted Bipartite Matching

Fix k|m and l|n. Let us first demonstrate how to convert the calculation of $d_{\phi_2^{k,l}}(A,B)$ into the minimum weight bipartite matching problem for a weighted bipartite graph $G_{k,l}(A,B)$. Partition A into non-overlapping k×l-blocks, and write A as $$A = \begin{pmatrix} A_{11} & \cdots & A_{1\frac{n}{l}} \\ \vdots & \ddots & \vdots \\ A_{\frac{m}{k}1} & \cdots & A_{\frac{m}{k}\frac{n}{l}} \end{pmatrix} \quad (33)$$

where $A_{ij}$, $1\leq i\leq m/k$, $$1\leq j\leq \frac{n}{l},$$

is a k×l-block. The same notation applies to B as well. Let $a^{k,l}$ be the average block of $A_{ij}$, $1\leq i\leq m/k$, $$1\leq j\leq \frac{n}{l},$$

and $b^{k,l}$ the average block of $B_{ij}$, $1\leq i\leq m/k$, $$1 \le j \le \frac{n}{l}.$$

That is, $$a^{k,l} = \frac{kl}{mn} \sum_{i=1}^{m/k} \sum_{j=1}^{n/l} A_{ij}$$

and $$b^{k,l} = \frac{kl}{mn} \sum_{i=1}^{m/k} \sum_{j=1}^{n/l} B_{ij}.$$

Let $P^{(1)}$ and $P^{(2)}$ be two pattern images with pattern size k×l such that $$P^{(1)} = \begin{pmatrix} P^{(1)}_{11} & \cdots & P^{(1)}_{1\frac{n}{l}} \\ \vdots & \ddots & \vdots \\ P^{(1)}_{\frac{m}{k}1} & \cdots & P^{(1)}_{\frac{mn}{kl}} \end{pmatrix} \quad (34)$$

and $$P^{(2)} = \begin{pmatrix} P^{(2)}_{11} & \cdots & P^{(2)}_{1\frac{n}{l}} \\ \vdots & \ddots & \vdots \\ P^{(2)}_{\frac{m}{k}1} & \cdots & P^{(2)}_{\frac{mn}{kl}} \end{pmatrix}$$

where $P_{ij}^{(1)} = a^{k,l}$ and $P_{ij}^{(2)} = b^{k,l}$, $1 \le i \le m/k$, $$1 \le j \le \frac{n}{l}.$$

In other words, $P^{(1)}$ and $P^{(2)}$ are two pattern images with patterns $a^{k,l}$ and $b^{k,l}$, respectively. Define the weighted bipartite graph $G_{k,l}(A,B)$ associated with A and B as the complete bipartite graph $G_{k,l}(A,B)=(U \cup V, E, w)$ with $U=\{u_{ij}: 1 \le i \le m/k,$ $$1 \le j \le \frac{n}{l}\},$$

$V=\{v_{rs}: 1 \le r \le m/k,$ $$1 \le s \le \frac{n}{l}\},$$

$E=U \times V$, and w assigning to each edge $e=(u_{ij}, v_{r,s}) \in E$ a weight $$w(e) = d(A_{ij} - P_{ij}^{(1)}, B_{rs} - P_{rs}^{(2)}).$$

In view of Corollary 3 and Definition 1, one can then verify that $$\frac{mn}{kl} d_{\phi_2^{k,l}}(A, B)$$

is equal the minimum weight of perfect matchings in $G_{k,l}$(A,B). Therefore, calculating $$d_{\phi_2^{k,l}}(A, B)$$

is equivalent to solving the minimum weight perfect matching problem for $G_{k,l}$(A,B). In addition, it is easy to see that $G_{k,l}(A,B) = G_{k,l}(A-P^{(1)}, B-P^{(2)})$.

The above discussion applies to $$d_{\phi_{2,\tau}^{k,l}}(A, B)$$

as well. By replacing A and B by $\tau(A)$ and $\tau(B)$, respectively, it follows that $$mn d_{\phi_{2,\tau}^{k,l}}(A, B)$$

is equal to the minimum weight of perfect matchings in $G_{k,l}(\tau(A), \tau(B))$. Calculating $$d_{\phi_{2,\tau}^{k,l}}(A, B)$$

is the equivalent to solving the minimum weight perfect matching problem for $G_{k,l}(\tau(A), \tau(B))$.

4.3 Two-Stage Algorithms

By working with the weighted bipartite graph $G_{k,l}$(A,B) ($G_{k,l}(\tau(A), \tau(B))$, respectively), we can apply any suitable algorithm for weighted bipartite matching to compute or approximate $$d_{\phi_2^{k,l}}(A, B) \left( d_{\phi_{2,\tau}^{k,l}}(A, B), \right.$$

respectively). The computation complexity would depend highly on the number N of vertices in U, which in turn depends on the ratio between the size of k×l-block and the image size in the case of $G_{k,l}$(A,B). For example, let us look at $G_{k,l}$(A,B) with image size 256×256. When k=l=8, we have N=1024 and it takes a few seconds for the fast implementation of Blossom-V in C from [26] to compute $$d_{\phi_2^{k,l}}(A, B)$$

and find the optimal perfect matching on a computer with Intel i7 CPU@2.8 GHz. When k=l=4, we have N=4096 and the increased computational complexity increases the running time of the Blosson-V implementation. When k=l=2, we have N=16384 and the even greater computational complexity increases the running time of the Blossom-V implementation even further. On the other hand, as discussed after Corollary 1 and further shown in Section 5, in order for $$d_{\phi_2^{k,l}}(A, B)$$

to have good discriminating power for measuring image similarity, the block size k×l can not be too large relatively to the image size. Therefore, directly applying existing weighted bipartite matching algorithms to the weighted complete bipartite graph $G_{k,l}(A,B)$ with interesting block size k×l may result in increased computational complexity for large scale image processing/management systems.

The above mentioned problem is partly due to the fact that $G_{k,l}(A,B)$ is a complete bipartite graph and hence very dense (i.e., has too many edges). To alleviate this problem, we shall work instead with a weighted sparse, partial bipartite graph $\hat{G}_{k,l}(A,B)$ obtained by pruning edges from $G_{k,l}(A,B)$. This leads to a generic two-stage algorithm which first constructs the weighted sparse bipartite graph $\hat{G}_{k,l}(A,B)$ at its stage one and then applies weighted bipartite matching algorithms such as Blossom-V to $\hat{G}_{k,l}(A,B)$ at its stage two. The resulting minimum weight of perfect matching in $\hat{G}_{k,l}(A,B)$ is equal to $$d_{\phi_2^{k,l}}(A, B)$$

if all edges of the optimal perfect matching in $G_{k,l}(A,B)$ appear in $\hat{G}_{k,l}(A,B)$, and an upper bound to $$d_{\phi_2^{k,l}}(A, B)$$

otherwise.

There are several ways to construct the weighted sparse bipartite graph $\hat{G}_{k,l}(A,B)$. One way is to make use of a large block size. Select K and L such that K|m,L|n,k|K,l|L. With $P^{(1)}$ and $P^{(2)}$ defined in (34), consider the weighted complete bipartite graph $G_{K,L}(A-P^{(1)},B-P^{(2)})$. Apply any minimum weight perfect matching algorithm such as Blossom-V to $G_{K,L}(A-P^{(1)},B-P^{(2)})$ to get an optimal perfect matching with minimum weight in $G_{K,L}(A-P^{(1)},B-P^{(2)})$, which is less computationally complex when K an L are large. Note that each vertex in $G_{K,L}(A-P^{(1)},B-P^{(2)})$ is corresponding to a K×L-block in A or B, and each vertex in $G_{k,l}(A,B)=G_{k,l}(A-P^{(1)},B-P^{(2)})$ is corresponding to a k×l-block in A and B. A vertex in $G_{k,l}(A,B)$ is said to be contained in a vertex in $G_{K,L}(A-P^{(1)},B-P^{(2)})$ if the k×l-block corresponding to the former is contained in the K×L-block corresponding to the latter. An edge in $G_{k,l}(A,B)$ is said to be feasible if its two vertices are contained in two vertices of $G_{K,L}(A-P^{(1)},B-P^{(2)})$ which are joined by an edge in the optimal perfect matching with minimum weight in $G_{K,L}(A-P^{(1)}, B-P^{(2)})$. Then prune the bipartite graph $G_{k,l}(A,B)$ by deleting all of its infeasible edges. One can then take the resulting pruned bipartite graph as $\hat{G}_{k,l}(A,B)$. The two stage algorithm with such $\hat{G}_{k,l}(A,B)$ is summarized in Algorithm 1.

Algorithm 1:
A two-stage algorithm for approximating $$d_{\phi_2^{k,l}}(A, B)$$

from above:

Step 1. Partition each of images A and B into non-overlapping k×l-blocks. Compute their respective average blocks $a^{k,l}$ and $b^{k,l}$ and determine their respective pattern images $P^{(1)}$ and $P^{(2)}$ with patterns $a^{k,l}$ and $b^{k,l}$, respectively.

Step 2. Select large K and L such that K|m, L|n, k|K,l|L

Step 3. Build the weighted bipartite graph $G_{K,L}(A-P^{(1)}, B-P^{(2)})$.

Step 4. Apply any minimum weight perfect matching algorithm such as the Hungarian algorithm, Edmonds' algorithm, or their variants to find an optimal prefect matching with minimum weight in $G_{K,L}(A-P^{(1)},B-P^{(2)})$.

Step 5. Build the weighted sparse bipartite graph $\hat{G}_{k,l}(A,B)$ by pruning $G_{k,l}(A,B)$ through deleting all of its infeasible edges.

Step 6. Apply any minimum weight perfect matching algorithm to the sparse graph $\hat{G}_{k,l}(A,B)$ to find its optimal prefect matching with minimum weight. Then take the resulting normalized minimum weight as an approximation for $$d_{\phi_2^{k,l}}(A, B).$$

Example 8

Suppose m=n=256. Let k=l=2, and K=L=8 in Algorithm 1. Then the number of edges in $\hat{G}_{k,l}(A,B)$ in Algorithm 1 is $2^{18}$, whereas the number of edges in $G_{k,l}(A,B)$ is $2^{28}$. Therefore, in comparison with $G_{k,l}(A,B)$, the graph $\hat{G}_{k,l}(A,B)$ is indeed quite sparse.

Another way to construct the weighted sparse bipartite graph $\hat{G}_{k,l}(A,B)$ is to make use of neighbor blocks of a k×l-block in an image. Given any image A, write it as in (33); two k×l-blocks $A_{ij}$ and $A_{rs}$ in A are said to be neighbors at distance max{|i-r, |j-s|}. Let E be the set of all edges in $G_{k,l}(A,B)$. Given a subset E' ⊂ E and an integer T≥0, an edge e∈E is said to be within the T-neighbor of E' if there is an edge e'∈E' such that two k×l-blocks in A corresponding to two vertices of e and e' are neighbors at distance less than or equal T, and so are two k×l-blocks in B corresponding to the other two vertices of e and e'. Now take E' to be the set of all feasible edges in $G_{k,l}(A,B)$. Prune the bipartite graph $G_{k,l}(A,B)$ by deleting all of its edges which are not within the T-neighbor of the set of feasible edges. One can then take the resulting pruned bipartite graph as $\hat{G}_{k,l}(A,B)$. The two stage algorithm with such $\hat{G}_{k,l}(A,B)$ is summarized in Algorithm 2.

Algorithm 2:
Another two-stage algorithm for approximating $$d_{\phi_2^{k,l}}(A, B)$$

from above.

Step 1. Partition each of images A and B into non-overlapping k×l-blocks. Compute their respective average blocks $a^{k,l}$ and $b^{k,l}$ and determine their respective pattern images $P^{(1)}$ and $P^{(2)}$ with patterns $a^{k,l}$ and $b^{k,l}$, respectively.

Step 2. Select large K and L such that K|m,L|n,k|K,l|L.

Step 3. Build the weighted bipartite graph $G_{K,L}$, $(A-P^{(1)}, B-P^{(2)})$.

Step 4. Apply any minimum weight perfect matching algorithm such as the Hungarian algorithm, Edmonds' algorithm, or their variants to find an optimal prefect matching with minimum weight in $G_{K,L}(A-P^{(1)}, B-P^{(2)})$.

Step 5. Select $T \geq 0$.

Step 6. Build the weighted sparse bipartite graph $\hat{G}_{k,l}(A,B)$ by pruning $G_{k,l}(A,B)$ through deleting all of its edges which are not within the T-neighbor of the set of feasible edges.

Step 7. Apply any minimum weight perfect matching algorithm to the sparse graph $\hat{G}_{k,l}(A,B)$ to find its optimal prefect matching with minimum weight. Then take the resulting normalized minimum weight as an approximation for $$d_{\phi_2^{k,l}}(A,B).$$

Example 9

Suppose m=n=256. Let k=l=2, K=L=8, and T=1 in Algorithm 2. Then the number of edges in $\hat{G}_{k,l}(A,B)$ in Algorithm 2 is about $2^{20}$, whereas the number of edges in $G_{k,l}(A,B)$ is $2^{28}$. Therefore, in comparison with $G_{k,l}(A,B)$, the graph $\hat{G}_{k,l}(A,B)$ is still relatively sparse.

Remark 5

In Algorithm 2, the subset E' does not have to be the set of all feasible edges defined in Algorithm 1. In addition, all discussions related to two-stage algorithms can be applied to $$d_{\phi_{2,\tau}^{k,l}}(A,B)$$

as well.

5 Experimental Results

Experiments have been carried out to test the discriminating power of the proposed SMID for measuring image similarity and to illustrate the alignment between the proposed SMID and human perception for image similarity.

5.1 Experiment Settings 5.1.1 Testing Data Collection

As image similarity is mostly a subjective concept, it is critical to establish a testing set with human inputs. For that purpose, we set up an online voting system where 2668 pairs of images were posted and evaluated by users for labeling as being similar, dissimilar, or uncertain. Selected images come from two sources, including the INRIA Holidays dataset (see H. Jegou, M. Douze and C. Schmid "Hamming embedding and weak geometry consistency for large scale image search", Proc. of the 10th European conference on Computer vision, Marseille, France, October 12-18, pp. 304-317, 2008, hereinafter referred to as [28]) and a set of our own photo collections over the past few years. Since similarity is measured between a pair of images and there are a lot more dissimilar pairs than similar pairs, one strategy we used to ensure a reasonably-balanced data set is to apply a time-adjacent criterion, i.e., a pair of images will be included only when their creation time is within two-hours apart. Apparently, most similar images are taken within a short period of time. In other words, photos that are taken within a short period time are more likely to be similar to each other. This criterion helps to balance the number of similar pairs and the number of dissimilar pairs.

Nine people were invited to provide their input to the system. Among these nine people, there are three female adults and six male adults. On another perspective, there are six graduate students, two software engineers, and one professor.

To further avoid uncertainty in the collected human inputs on image similarity, we only select 1116 pairs to use, for which all nine people reach a consensus on whether they are similar or dissimilar. In other words, all pairs with ambiguity—either they are categorized as uncertain by at least one person or there is any discrepancy among the nine people—are excluded from the following experiment. As a result, there are 550 pairs of similar photos and 566 pairs of dissimilar photos. In addition, a resizing procedure is applied to each photo to normalize the image resolution. Specifically, for an image with resolution n×m, it is resized to the resolution of $256\sqrt{n/m} \times 256\sqrt{m/n}$.

5.1.2 Comparative Study Setting

We first want to assess the impact of block size k×l on the discriminating power of our proposed SMID for measuring image similarity by comparing the SMID metrics based on different block sizes k×l=1×1,2×2,4×4,8×8. We then select one block size k×l which offers a good trade-off between discriminating power and computational complexity relative to the image size $256\sqrt{n/m} \times 256\sqrt{m/n}$, and compare the resulting SMID with other image similarity metrics based on image signatures.

The comparison among the SMID metrics based on different block sizes k×l relates to three types of methods for computing the SMID: (1) a direct computation of weighted bipartite matching, (2) an approximation by Algorithm 1 and Algorithm 2, and (3) a closed-form calculation in the special case with k=l=1 as given by (31). Note that the graph $\hat{G}_{k,l}(A,B)$ in Algorithm 1 consists of $$\frac{m}{K} \cdot \frac{n}{L}$$

disconnected sub-graphs, each with $$2\frac{K}{k} \cdot \frac{L}{l}$$

nodes. Thus, the matching in Step 6 of Algorithm 1 can be dramatically sped up by solving each sub-graph independently. On the other hand, the $\hat{G}_{k,l}(A,B)$ graph in Algorithm 2 cannot be separated into disconnected subgraphs, and Algorithm 2 is more computationally complex than Algorithm 1. Our test also showed that similarity discriminating performance by Algorithm 2 is close to that by Algorithm 1. Thus, in the following, only results by Algorithm 1 are reported and compared with others.

Comparison between the SMID based on the selected block size k×l and other similarity metrics based on image signatures is carried out by studying four popular image similarity metrics: histogram intersection (HI) (see, A. Barla, F. Odone, and A. Verri, "Histogram intersection kernel for image classification", Proc. of the 2003 Int. Conf. on Image processing, Vol. 3, pp. 513-516, September 2003, hereinafter referred to as [5]; O. Chapelle, P. Haffner, and V. Vapnik, "Support vector machines for histogram-based image classification", IEEE Trans. on Neural Networks, Vol. 10, No. 5, pp. 1055-1064, September 1999, hereinafter referred to as [4]), the MK distance (see [30]; [22]), scale invariant feature transform (SIFT) (see [6]; T. Lindeberg, "Scale invariant feature transform", Scholarpedia, 7 (5): 10491, 2012, hereinafter referred to as [7]; A. Vedaldi, "An implementation of SIFT detector and descriptor", http://www.robots.ox.ac.uk/vedaldi/code/sift.html, hereinafter referred to as [8]), and autocorrelogram (see J. Huang, S. Kumar, M. Mitra, W. J. Zhu, and R. Zabih, "Spatial color indexing and applications", Int. Journal of Computer Vision, 35(3), pp. 245-268, 1999, hereinafter referred to as [12]).

HI has been well studied and applied for image similarity (see [5]; [4]). Specifically, the HI distance between two histograms $A=a_1, a_2, \ldots, a_m$ and $B=b_1, b_2, \ldots, b_m$ is defined as $$K(A,B)=\Sigma_i^m \min(a_i, b_i) \tag{35}$$

where m is the number of bins in the histograms. Essentially, it reflects the global color statistics of images, while overlooking the shape and texture of images.

Note that the HI distance depends only on two color distributions and has nothing to do with the underlying distance between colors. On the other hand, the MK distance, also referred to as EMD in computer science, involves both distributions and the underlying distance between colors or feature vectors by considering minimum cost mass transportation between two distributions with the underlying distance as a transportation cost. Consequently, it shows certain robustness against image blurring, dithering or other local deformations and is widely used in content-based image retrieval (see [23]).

The SIFT represents another type of similarity metrics that focus on local features/textures detection and characterization [6], [7]. It has been regarded as one of the most pervasive and robust image features [9] for image similarity assessment. For the purpose of comparison, here we adopt the SIFT implementation from [8]. For a given image, it first computes a set of descriptors based on local gradient. Then, the Euclidean distance is used to match descriptors between two images in a greedy manner. Specifically, a match is established by three steps. First, compute the distance between a descriptor in one set with all descriptors in the other set; second, find the minimum distance and the second minimum distance; third, a match is found between the two descriptors with the minimum distance when the second minimum distance is larger than 1.5 times of the minimum distance. Consequently, the similarity between two images may be assessed by the number of matched descriptors and the average distance between matched descriptors. The original SIFT assessment was further improved in H. Ling, K. Okada, "An efficient earth mover's distance algorithm for robust histogram comparison", IEEE Trans. on Pattern Analysis and Machine Intelligence, Vol. 29, No. 5, pp. 840-853, May 2007, hereinafter referred to as [10], by introducing the EMD for matching descriptors with the underlying $L_1$ ground distance. For completeness, we also include the EMD-based SIFT similarity assessment in our comparison.

Autocorrelogram is another popular technique for similarity measurement in content-based image retrieval applications (see [12]). In our implementation for comparison, the autocorrelogram metric is computed according to Eq. (3) in [12] by using a distance set $D=\{1,3,5,7\}$ with each pixel quantized into 64 values.

5.1.3 Testing Criterion

Since our testing data set is labeled without ambiguity, an effective way to demonstrate the power of a similarity metric to discriminate between pairs of similar images and pairs of dissimilar images is to plot the distributions of the similarity metric over the set of all pairs of similar images and the set of all pairs of dissimilar images, respectively. If the similarity metric is single-valued—the SMID, MK distance, HI metric, and autocorrelogram metric are all single-valued—these two distributions are one dimensional. In this case, if the two distributions do not overlap, it implies that the similarity metric can discriminate between pairs of similar images and pairs of dissimilar images perfectly without any error. Otherwise, the receiver operating characteristic (ROC) curve will be used to further illustrate the overlapping region. In determining the ROC curve, we consider a simple discriminator which would classify a pair of images as similar if and only if its similarity metric value is less than or equal to $\alpha$ in the case of the SMID, MK distance, or autocorrelogram metric, and greater than or equal to $\alpha$ in the case of the HI metric, where $\alpha$ is in the overlapping region. A false positive event happens whenever this discriminator classifies a pair of dissimilar images as similar.

If the similarity metric is not single-valued, then the distributions of the similarity metric over the set of all pairs of similar images and the set of all pairs of dissimilar images are multiple dimensional. Both the SIFT and EMD-based-SIFT are represented by two values: the number of matches (denoted by nm) and the average distance of all matches (denoted by dm in the case of the SIFT and by emd in the case of the EMD-based SIFT). Therefore, their corresponding distributions are two dimensional.

A single-valued similarity metric $\beta$ is said to be consistent with human perception for image similarity if for any images A, B, and C, one has $\beta(A,B) < \beta(A,C)$ whenever images A and B are deemed by human to be more similar to each other than images A and C. A good similarity metric not only possesses good power to discriminate between pairs of similar images and pairs of dissimilar images, but also should be consistent with human perception for image similarity. Therefore, when we compare the SMID with the MK distance, HI metric, autocorrelogram metric, SIFT, and EMD-based SIFT, it is also interesting to test their respective consistency with human perception for image similarity. For this purpose, a small set of photos was selected from [28], which contains five (5) photos with names '124200.jpg', '124201.jpg', '124202.jpg', '124100.jpg', and '123601.jpg'. The photo '124200.jpg' will be used as a reference, and the other four photos will be sorted according to their similarity distances from the photo '124200.jpg' calculated according to a given similarity metric when the similarity metric is tested for its consistency with human perception.

5.2 Experiment Results 5.2.1 SMID with Various Block Sizes

Figure 9A:
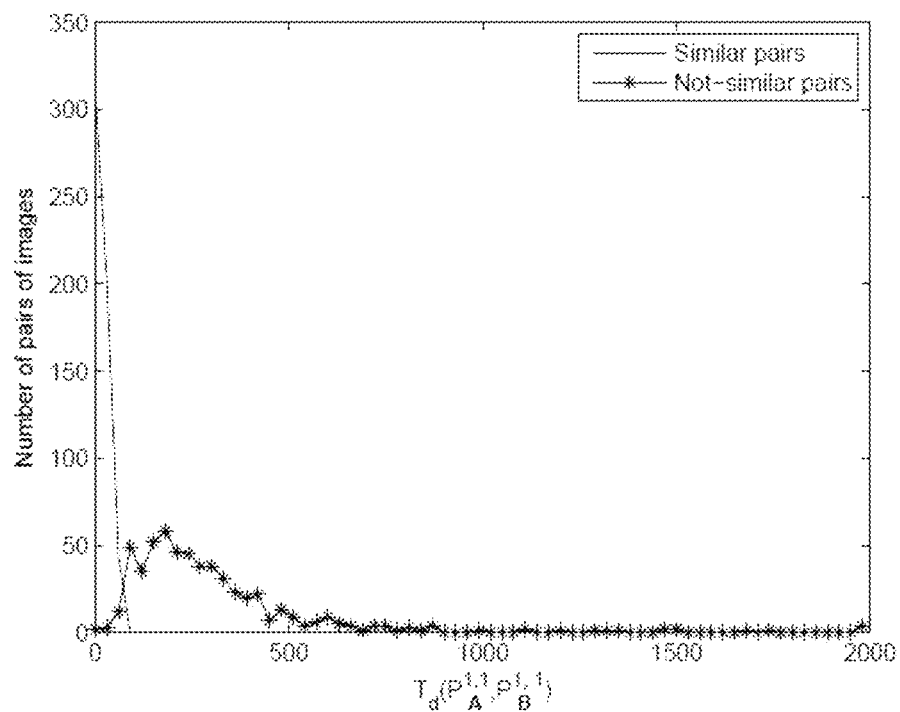
FIGS. 9A-9D show distribution plots of the results of an example embodiment of a method for determining perceptual similarity between images using a set mapping induced similarity distance applied to 550 pairs of similar images and 566 pairs of dissimilar images.
Figure 9B:
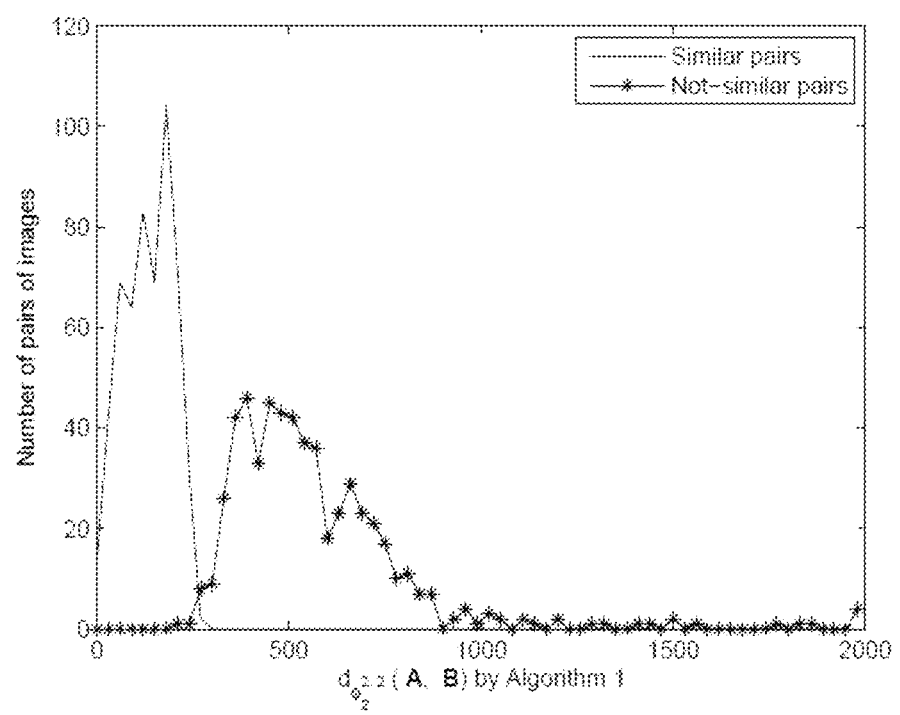
Figure 9C:
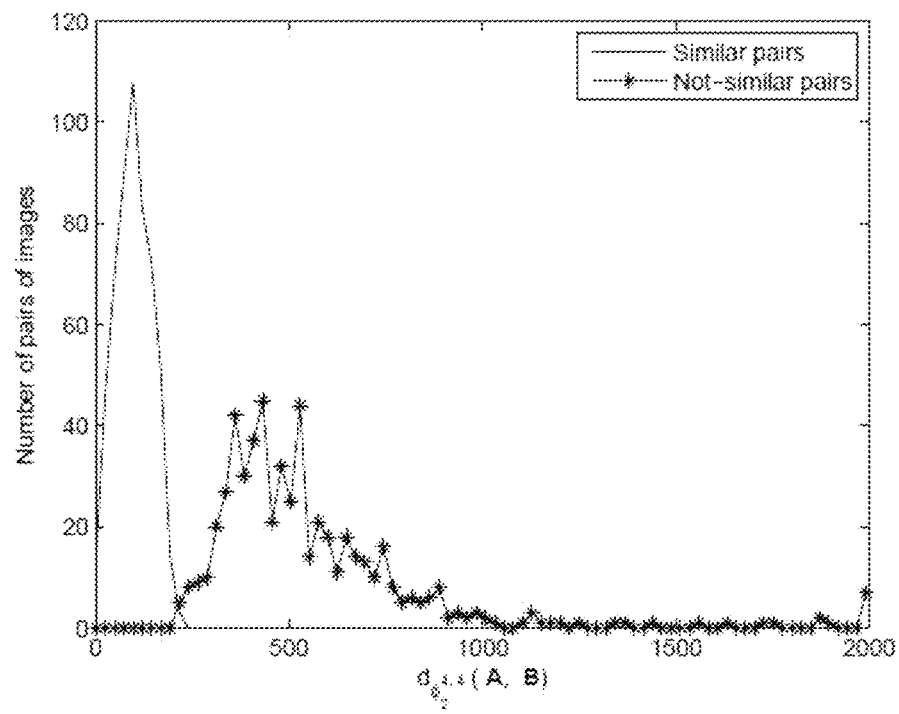
Figure 9D:
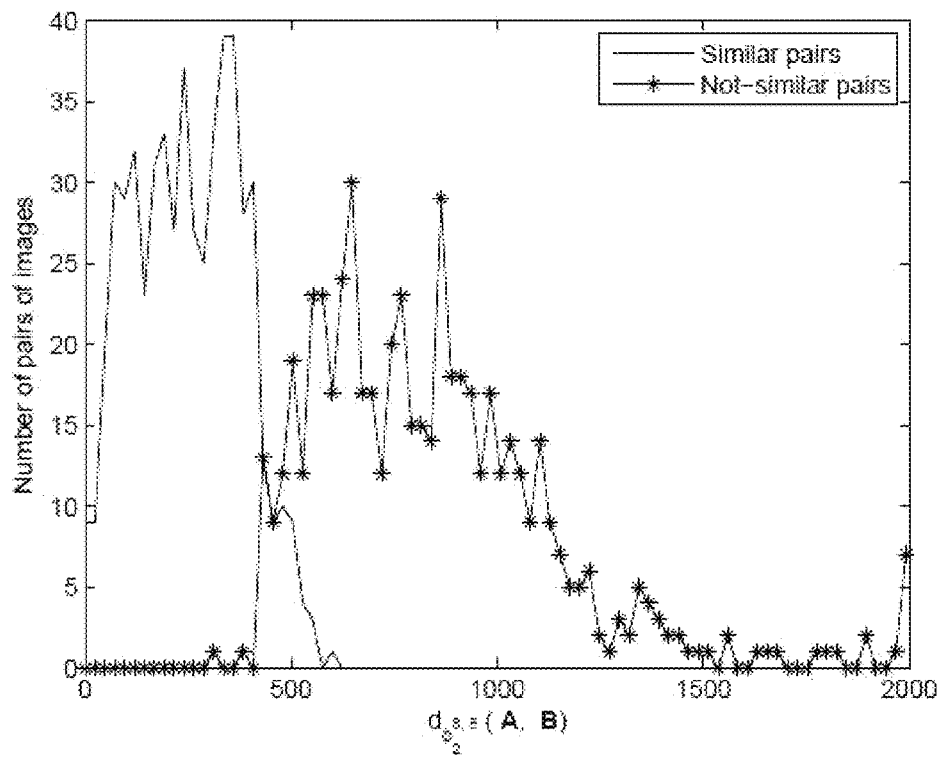

Since each original image of large size n×m was down sampled to the size $256\sqrt{n/m} \times 256\sqrt{m/n}$, four different block sizes were selected for testing: k×l=1 four different. Referring now to FIGS. 9A-9D, shown therein are distribution plots of the results of an example embodiment of a method for determining perceptual similarity between pairs of images using a set mapping induced similarity distance using four different block sizes. FIGS. 9A-9D show the distributions of their respective SMID metrics over the set of all pairs of similar images and the set of all pairs of dissimilar images. FIG. 9A shows the distribution of the SMID metric when $T_d(P_A^{1,1}, P_B^{1,1})$ is computed using (31). FIG. 9B shows the distribution of the SMID metric when $$d_{\phi_2^{2,2}}(A, B)$$

is computed using Algorithm 1. FIGS. 9C and 9D show the distribution of the SMID metrics when $$d_{\phi_2^4,4}(A,B) \text{ and } d_{\phi_2^8,8}(A,B)$$

respectively are computed directly as a weighted bipartite matching problem using a Hungarian/Edmond algorithm. From FIGS. 9A-9D, it follows that the discriminating power of the SMID degrades when the block size is either too small or too large relative to the downsampled image size 256√n/m×256√m/n—the overlapping area between the two distributions is larger in the case of k×l=1×1 or 8×8 than in the case of k×l=2ha or 4or.

Figure 10:
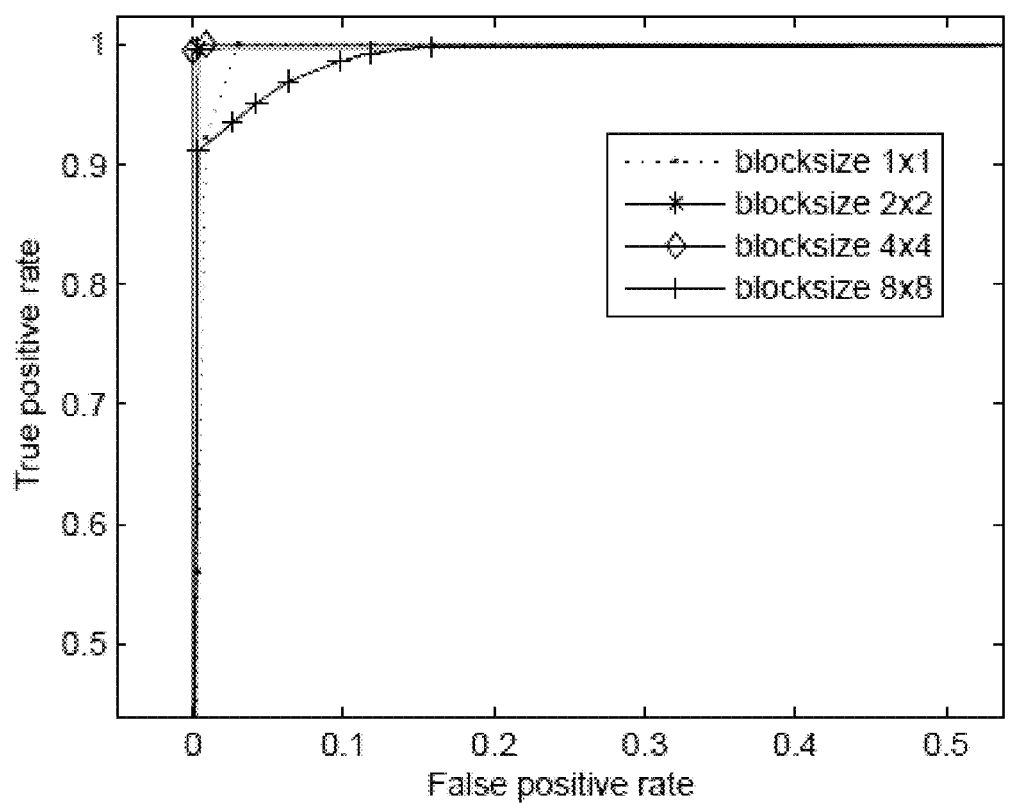
FIG. 10 shows a plot of the receiver operating characteristic (ROC) curves corresponding to the distribution plots shown in FIGS. 9A-9D.

Referring now to FIG. 10, shown therein is a plot of the receiver operating characteristic (ROC) curves corresponding to the distribution plots shown in FIGS. 9A-9D. The ROC curves in FIG. 10 further reinforce that the discriminating power of the SMID degrades when the block size is either too small or too large relative to the downsampled image size, clearly showing that the SMID with block size 2×2 or 4or significantly outperforms the SMID with block size 1si or 8or in terms of discriminating between pairs of similar images and pairs of dissimilar images. Furthermore, note that the 2×2 results $$d_{\phi_2^2,2}(A,B)$$

shown in FIG. 9B are obtained by Algorithm 1, which is less computationally complex than the computation of $$d_{\phi_2^4,4}(A,B)$$

the results of which are shown in FIG. 9C. Therefore, for image size 256√n/m×256√m/n, the block size k×l=2×2 with $$d_{\phi_2^2,2}(A,B)$$

computed by Algorithm 1 seems to offer a good trade-off between similarity discriminating power and computational complexity. In the following, $$d_{\phi_2^2,2}(A,B)$$

computed by Algorithm 1 will be used for comparing with other metrics based on signatures.

5.2.2 Discriminating Power Comparison Between SMID and Other Metrics

Referring now to FIGS. 11A-11D shown therein are distribution plots of various single valued similarity metrics applied to 550 pairs of similar images and 566 pairs of dissimilar images. FIGS. 11A-11D can be used to compare the SMID $$d_{\phi_2^2,2}(A,B)$$

Figure 11A:
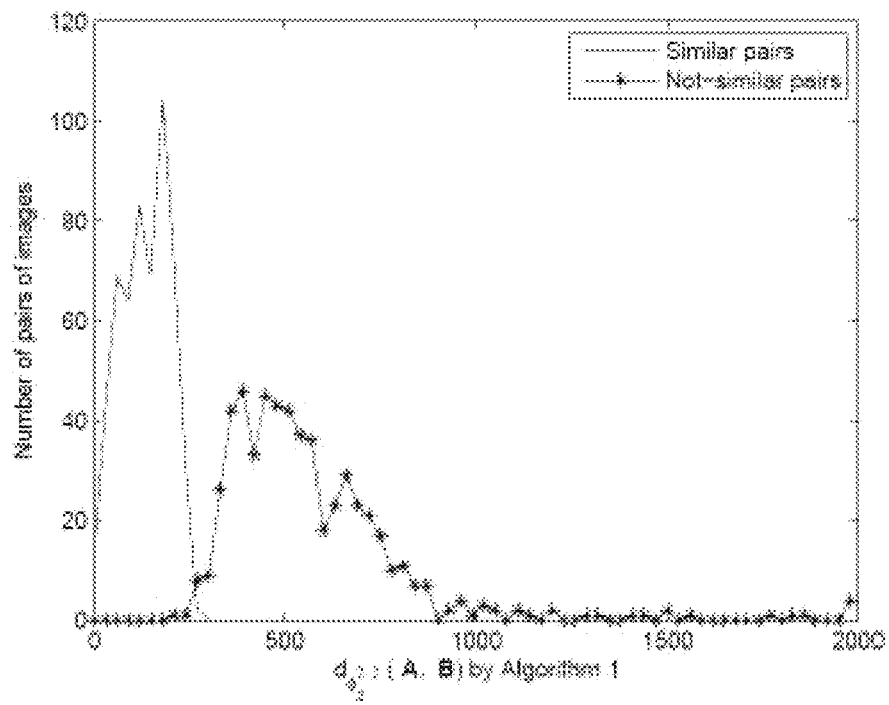
FIG. 11A shows a distribution plot of the results of an example embodiment of a method for determining perceptual similarity between images using a set mapping induced similarity distance corresponding to the distribution plot shown in FIG. 9B.
Figure 11B:
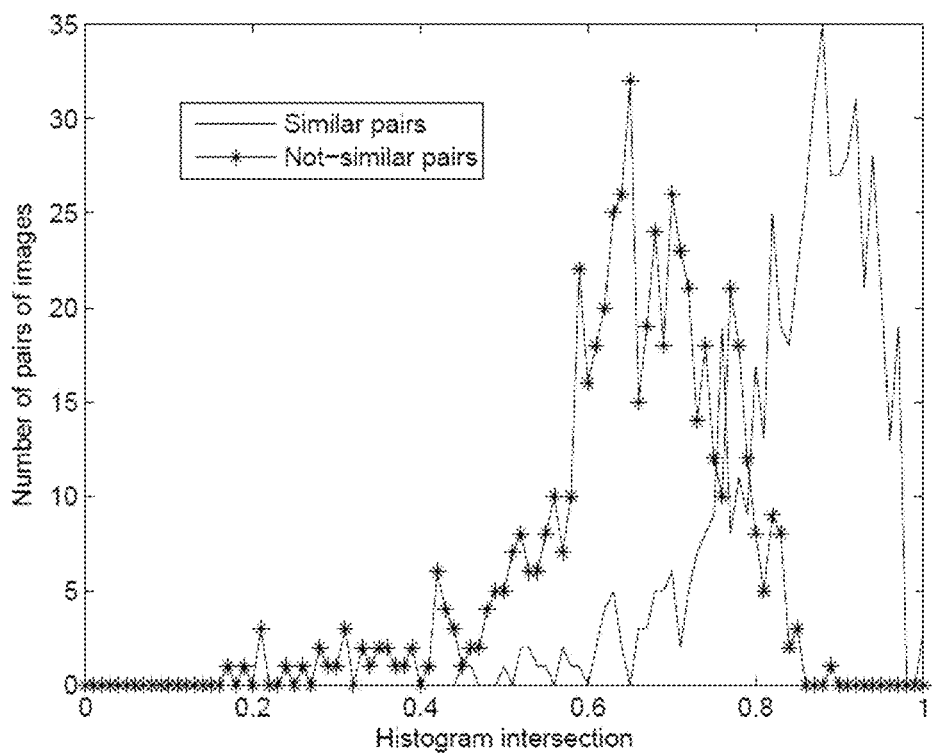
FIGS. 11B-D show distribution plots of various other single valued similarity metrics applied to 550 pairs of similar images and 566 pairs of dissimilar images.
Figure 11C:
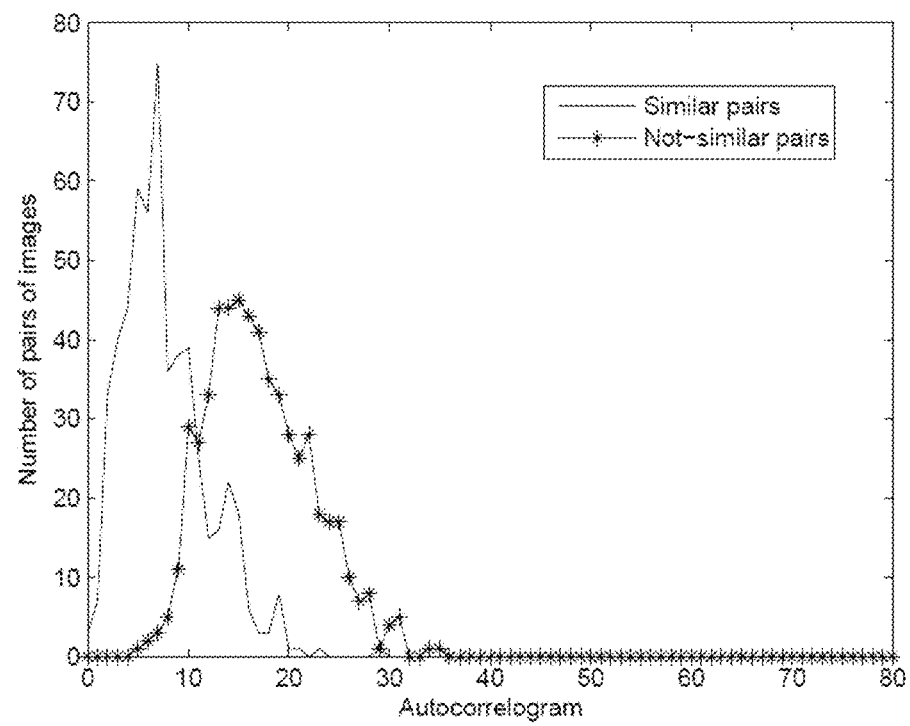
Figure 11D:
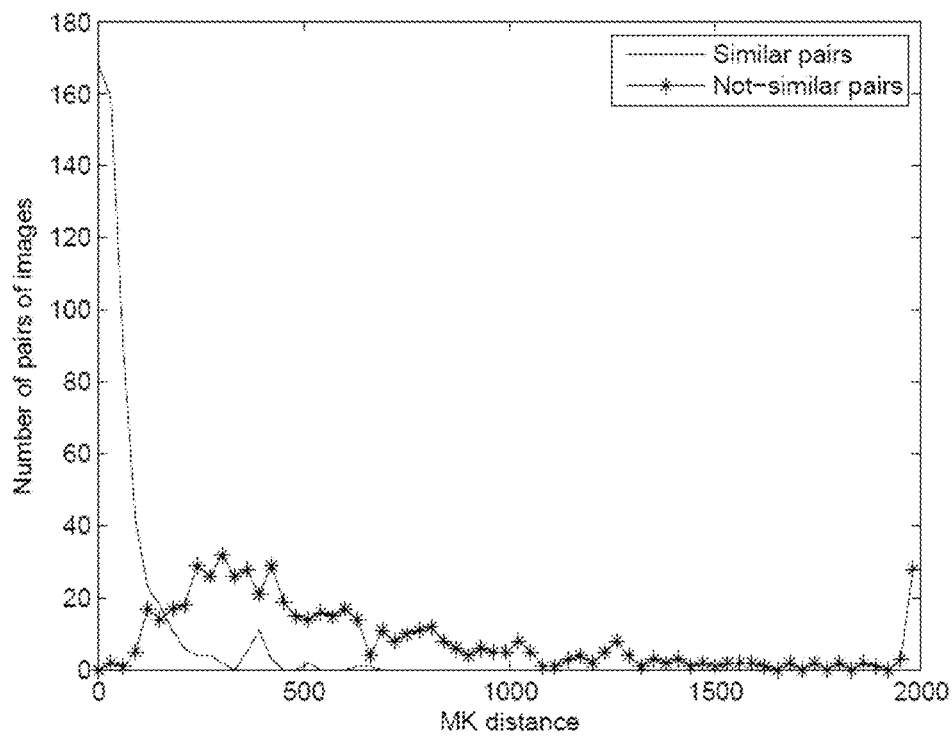
Figure 12:
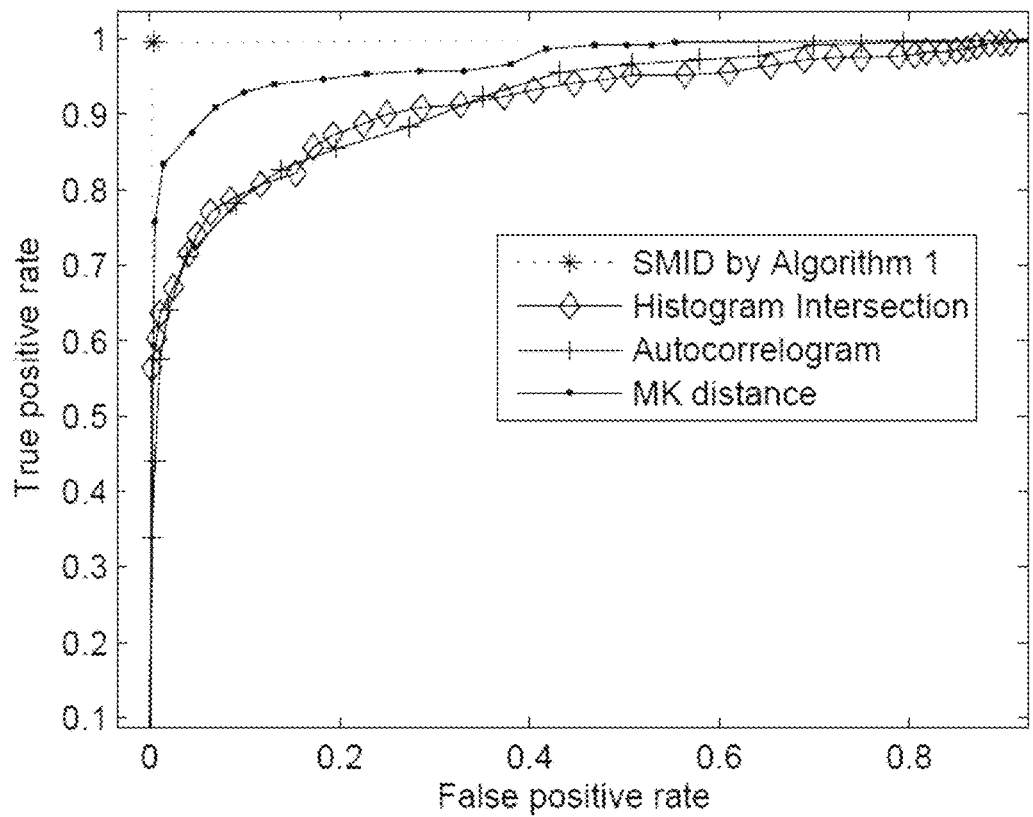
FIG. 12 shows a plot of the receiver operating characteristic (ROC) curves corresponding to the distribution plots shown in FIGS. 11A-11D.

(computed by Algorithm 1) shown in FIG. 11A with three other single-valued similarity metrics: the HI metric, autocorrelogram metric, and MK distance shown in FIGS. 11B, 11C and 11D respectively. Referring now to FIG. 12, shown therein is a plot of the received operating characteristic (ROC) curve corresponding to the four metrics shown FIGS. 11A-11D. It is clear to see that the SMID $$d_{\phi_2^2,2}(A,B)$$

(FIG. 11A) outperforms significantly the HI metric (FIG. 11B), autocorrelogram metric (FIG. 11C), and MK distance (FIG. 11D) in terms of discriminating between pairs of similar images and pairs of dissimilar images.

Figure 13A:
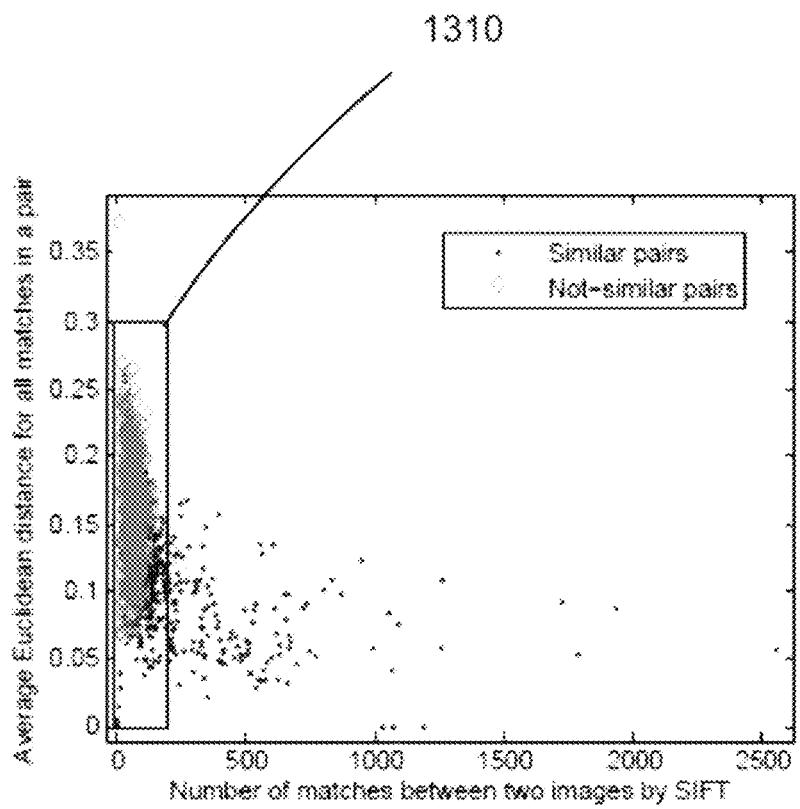
FIG. 13A shows a plot of the SIFT metric for determining similarity between two images applied to 550 pairs of similar images and 566 pairs of dissimilar images.
Figure 13B:
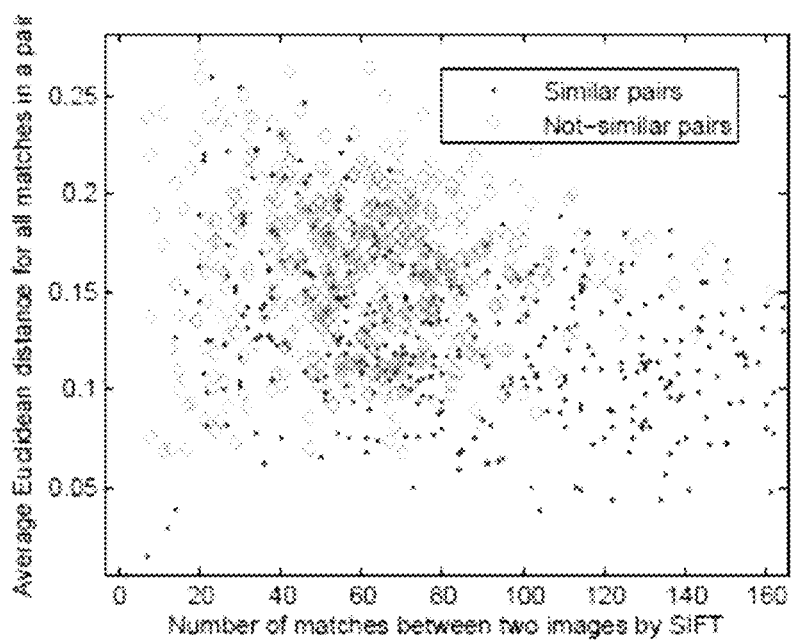
FIG. 13B shows an enlarged plot of the region 1310 indicated in FIG. 13A.

Reference will now be made to both FIGS. 13 and 14 which show the 2D distributions of the SIFT and EMD-based SIFT metrics respectively over the set of all pairs of similar images and the set of all pairs of dissimilar images, respectively. FIG. 13A shows a plot of the SIFT metric for determining similarity between two images as applied to the same set of 550 pairs of similar images and 566 pairs of dissimilar images. FIG. 13B is an enlarged view of the region of the plot shown by a rectangle 1310 in FIG. 13A.

Figure 14A:
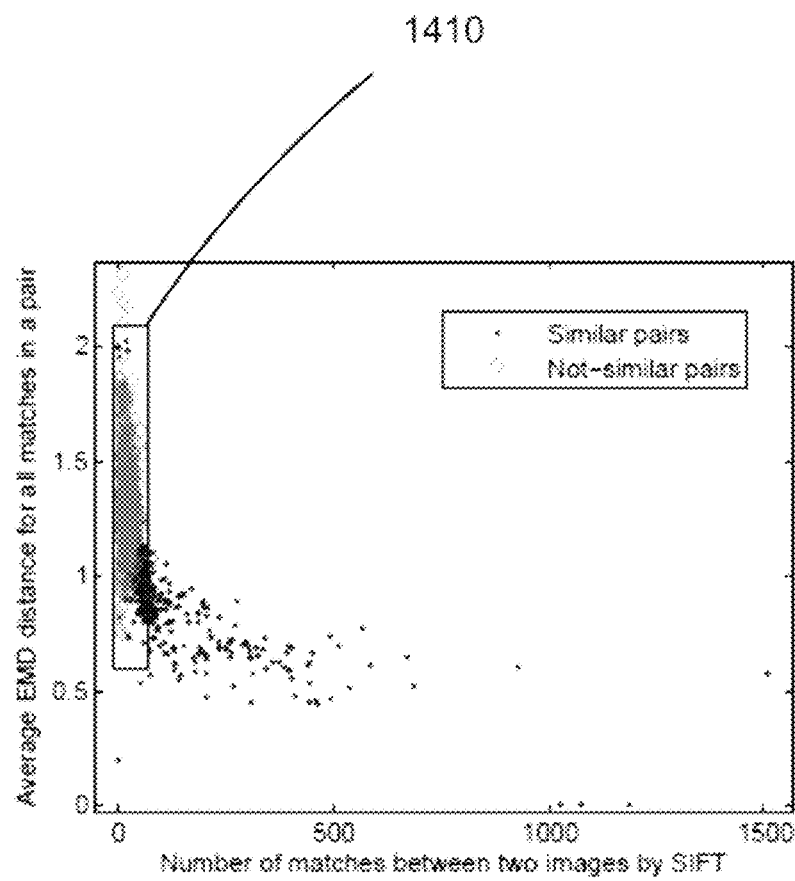
FIG. 14A shows a plot of the EMD-based SIFT metric for determining similarity between two images applied to 550 pairs of similar images and 566 pairs of dissimilar images.
Figure 14B:
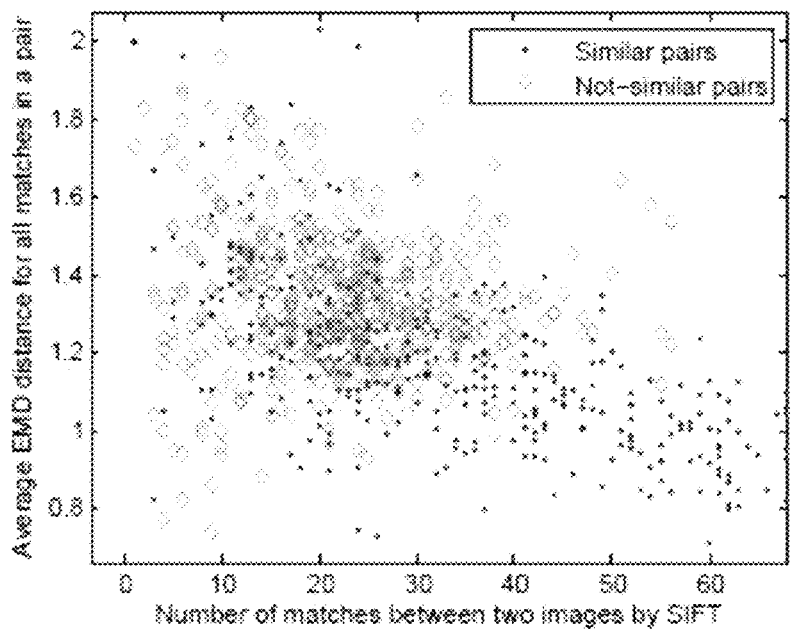
FIG. 14B shows an enlarged plot of the region 1410 indicated in FIG. 14A.

FIG. 14A shows a plot of the EMD-based SIFT metric applied to the set of 550 pairs of similar images and 566 pairs of dissimilar images. FIG. 14B is an enlarged view of the region of the plot shown by a rectangle 1410 in FIG. 14A.

Although FIGS. 13A and 14A respectively show that the SIFT and EMD-based SIFT can largely separate similar pairs from dissimilar pairs, FIGS. 13B and 14B clearly indicate that the ambiguity area is still very significant. In comparison with FIG. 11A, the SMID $$d_{\phi_2^2,2}(A,B)$$

still has better discriminating power than the SIFT and EMD-based SIFT.

5.3 Consistency Comparison

Figure 15A:
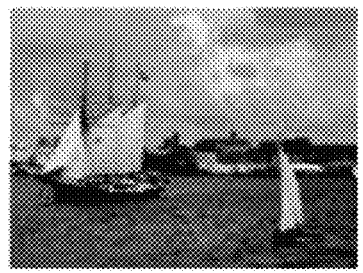
FIGS. 15A-15E illustrate the results of sorting FIGS. 15B-15E based on their similarity with FIG. 15A determined using an example embodiment of a method for determining perceptual similarity between images.
Figure 15B:
Figure 15C:
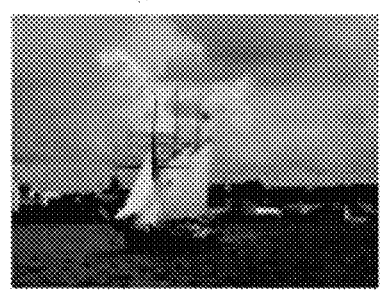

Referring now to FIGS. 15A-15E shown therein are the results of sorting four photos, '124201.jpg' (FIG. 15C), '124202.jpg' (FIG. 15B), '124100.jpg'(FIG. 15D), and '123601.jpg' (FIG. 15E), according to their SMID distances $$d_{\phi_2^2,2}(A,B)$$

from the reference '124200.jpg' (FIG. 15A). Examine the five photos all together. It is not hard to obtain a consensus that '124201.jpg' (FIG. 15C) and '124202.jpg' (FIG. 15B) are more similar to the reference '124200.jpg' (FIG. 15A) than '124100.jpg' (FIG. 15D) and '123601.jpg' (FIG. 15E) are, though it is arguable that between '124201.jpg' and '124202.jpg' or between '124100.jpg' and '123601.jpg' which one is closer to the reference. FIG. 15 clearly shows that '124201.jpg' and '124202.jpg' are more similar to '124200.jpg' than '124100.jpg' and '123601.jpg' are. More specifically, FIG. 15B shows '124202.jpg' is slightly more similar to the reference than '124201.jpg' shown in FIG. 15C is, which may be justified by zooming into the background behind the boats. The background behind the boat of '124202.jpg' in FIG. 15B appears to be closer to that in the reference than the background of '124201.jpg' in FIG. 15C is. Thus, the SMID $$d_{\phi_2^2}^{2,2}(A, B)$$

is consistent with human perception for image similarity.

Figure 15D:
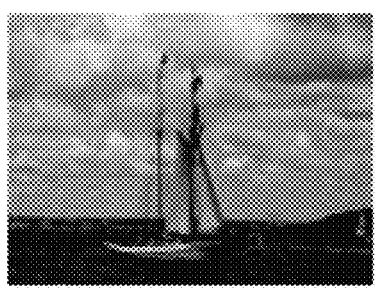
Figure 15E:

Table 1 lists the results of sorting the four photos (FIGS. 15B-15E) according to their similarity distances from the reference FIG. 15A '124200.jpg' based on five other similarity metrics: the HI metric, autocorrelogram metric, MK distance, SIFT metric, and EMD-based SIFT metric, respectively. In Table 1, underneath the name of each photo is its similarity value from the reference photo '124200.jpg' calculated according to the corresponding similarity metric, which is single valued in the case of the HI metric, autocorrelogram metric, and MK distance, and 2D vector valued in the case of SIFT and EMD-based SIFT. Photos are sorted in the increasing order of the similarity distance in the case of the autocorrelogram metric and MK distance, in the decreasing order of the similarity value in the case of HI, and in the decreasing order of nm/dm and nm/emd in the case of SIFT and EMD-based SIFT, respectively. For each row of Table 1 except for the first row, a photo with a lower rank value is believed, according to the corresponding similarity metric, to be more similar to the reference than a photo with a higher rank value is. With reference to FIGS. 15A to 15D, it is clear that none of these five similarity metrics is consistent with human perception for image similarity. Specifically, '124100.jpg' in FIG. 15D or '123601.jpg' in FIG. 15E is mistakenly believed by the HI to be more similar to the reference than '124201.jpg' in FIG. 15C is; both the autocorrelogram metric and MK distance mistakenly choose '124100.jpg' in FIG. 15D over '124201.jpg' in FIG. 15C as the one more similar to the reference; SIFT mistakenly chooses '124100.jpg' in FIG. 15D as the one most similar to the reference because it possesses the largest number of matches with the strongest average strength of the matches among the four photos; and finally, '124100.jpg' in FIG. 15D is mistakenly believed by EMD-based SIFT to be more similar to the reference than '124202.jpg' in FIG. 15B is, because the former has more and stronger matches with the reference than the latter does.

on perfect matchings determined using an example embodiment of a method for determining perceptual similarity between images.

Figure 16A:
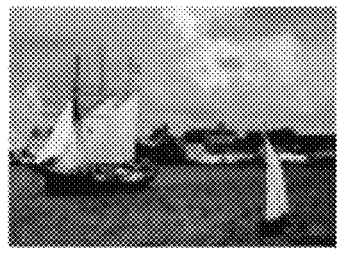
FIG. 16A shows an original image corresponding to FIG. 15A.
Figure 16B:
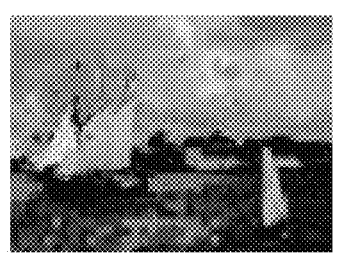
FIGS. 16B-16E show reconstructed images of the original image shown in FIG. 16A from FIGS. 15B-15E via perfect matchings determined using an example embodiment of a method for determining perceptual similarity between images.
Figure 16C:
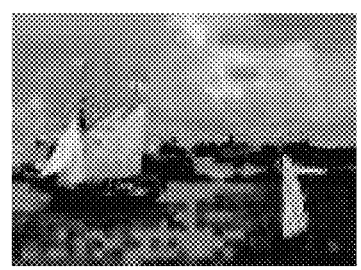
Figure 16D:
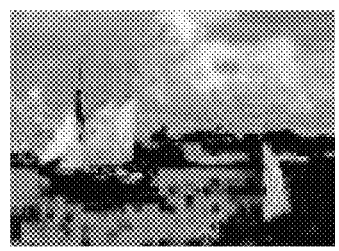
Figure 16E:
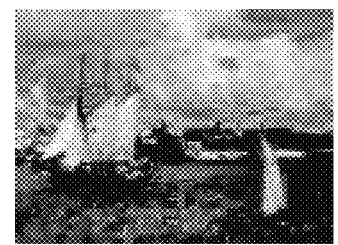

FIGS. 16A 16E provides a somewhat intuitive interpretation on the similarity measurement performance of the SMID $$d_{\phi_2^2}^{2,2}(A, B)$$

using Algorithm 1, by showing the reconstructed images of '124200.jpg' (FIG. 16A) based on minimum weighted matching between '124200.jpg' and other four images respectively. Specifically, consider images A and B and a perfect matching between all 2×2 blocks in A and all 2×2 blocks in B (The matching is obtained by Algorithm 4.3). The reconstruction of A is obtained by replacing each 2×2 block of A with its matched 2×2 block in B. The reconstruction of B can be done similarly. It is not hard to see that the Euclidean distance between A and its reconstruction from B equals to the Euclidean distance between B and its reconstruction from A. An interesting perspective to understand the SMID metric is to compare all the reconstructed images, as shown in FIG. 16. By our observation of the four reconstructed images in FIGS. 16B-16E, it appears to be convincing to us that '124202.jpg' and '124201.jpg' (see FIGS. 16B and 16C) are more similar to the reference '124200.jpg' than '124100.jpg' and '123601.jpg' (see FIGS. 16D and 16E) are, illustrating a good alignment between the SMID metric and human perception.

5.4 Discussion

From the above experimental results, it is fair to say that in comparison with other similarity metrics based on signatures, the SMID based on a properly chosen block size k×l has better power to discriminate between pairs of similar images and pairs of dissimilar images and is better aligned with human perception for image similarity. Applying the SMID to large scale image management system may result in increased computational complexity. An alternate process may be to approach the SMID from below, as mentioned in Section 3.

Figure 17:
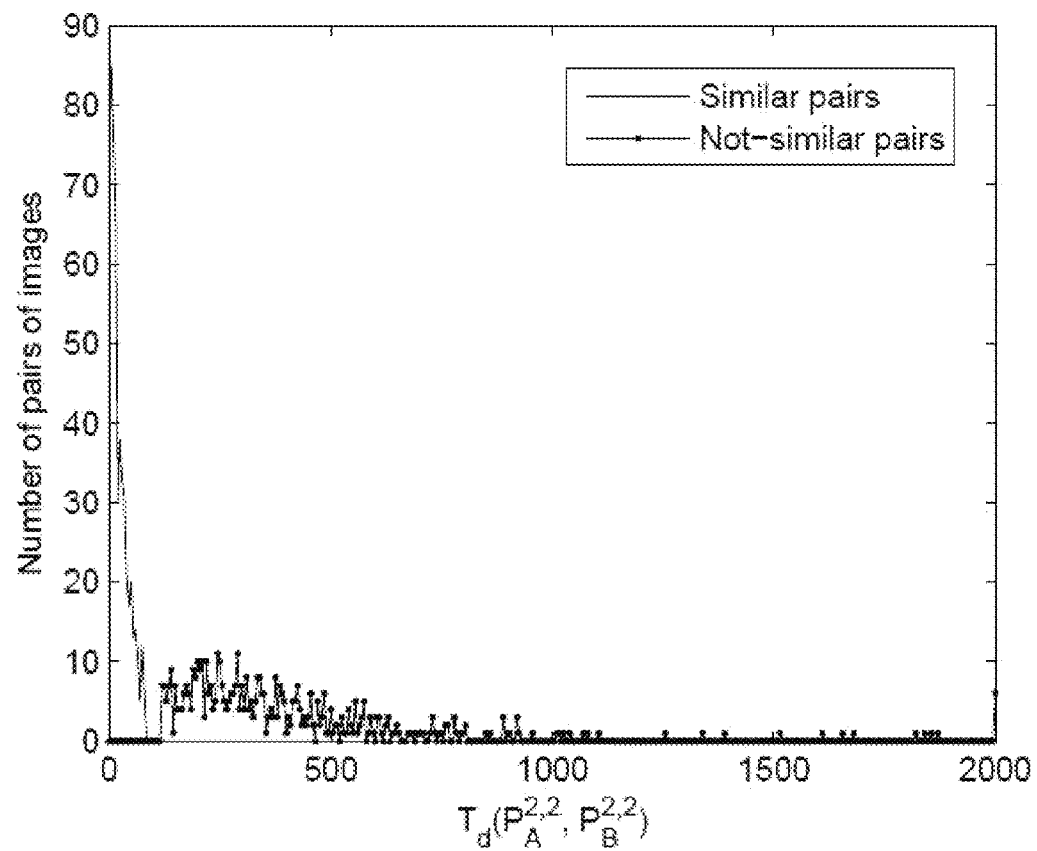
FIG. 17 shows a distribution plot of the results of another example embodiment of a method for determining perceptual similarity between images using lower bounds applied to 550 pairs of similar images and 566 pairs of dissimilar images.

Referring now to FIG. 17, shown therein is a distribution plot of the results of another example embodiment of a method for determining perceptual similarity between

TABLE 1

Photo similarity rankings for testing the consistency of the HI metric, autocorrelogram metric, MK distance, SIFT metric, and EMD-based SIFT metric

|  | Rank 1 | Rank 2 | Rank 3 | Rank 4 |
| --- | --- | --- | --- | --- |
| HI | 124202.jpg<br>0.717 | 123601.jpg<br>0.714 | 124100.jpg<br>0.673 | 124201.jpg<br>0.658 |
| autocorrelogram | 124202.jpg<br>10.9 | 124100.jpg<br>12.0 | 124201.jpg<br>14.2 | 123601.jpg<br>14.6 |
| MK distance | 124202.jpg<br>72.7 | 124100.jpg<br>77.8 | 124201.jpg<br>117.2 | 123601.jpg<br>121.2 |
| SIFT | 124100.jpg<br>nm = 58, dm = 0.155 | 123601.jpg<br>nm = 56, dm = 0.194 | 124201.jpg<br>nm = 48, dm = 0.184 | 124202.jpg<br>nm = 31, dm = 0.186 |
| EMD-based SIFT | 123601.jpg<br>nm = 25, emd = 1.559 | 124100.jpg<br>nm = 19, emd = 1.412 | 124201.jpg<br>nm = 14, emd = 1.323 | 124202.jpg<br>nm = 13, emd = 1.455 |

Reference will now be made to FIGS. 16A 16E. FIG. 16A shows an original image corresponding to the reference image shown in FIG. 15A. FIGS. 16B 16E show reconstructed images of the original image shown in FIG. 16A from the sorted images FIGS. 15B-15E respectively based images using lower bounds as applied to the set of 550 pairs of similar images and 566 pairs of dissimilar images. FIG. 17 shows the results obtained for the distributions of a lower bound of equation (31) with k=l=2. As shown in FIG. 17, the two distributions of such a lower bound do not even overlap, indicating the excellent discrimination power the lower bound possesses for image similarity. Such a lower bound to the SMID can also be efficiently calculated.

APPENDIX A

In this Appendix, we prove Corollary 1. Since $\phi_i^{k,l}$, $i=1, 2, 3$, are all transitive, in view of Theorem 3, it suffices to show that $\phi_i^{k,l}$ and $d(x,y)=|x-y|^r$ satisfy the symmetry condition (8) and the corresponding infimum in (2) is achievable for any $A,B \in \Omega$. For $\phi_1^{k,l}$, the infimum in (2) is achievable since both $\phi_1^{k,l}(A)$ and $\phi_1^{k,l}(B)$ are finite. To show the symmetry condition in the case of $\phi_1^{k,l}$, pick any $X \in \phi_1(A)$. With reference to the proof of Theorem 2, let $\pi_1$ be the block permutation such that $X=\pi_1(A)$. It is not hard to verify that $$\min_{Y \in \phi_1^{k,l}(B)} d(X, Y) = \min_\pi d(X, \pi(B)) \tag{36}$$

$$= \min_\pi d(\pi_1(A), \pi(B))$$

$$= \min_\pi d(A, \pi_1^-(\pi(B)))$$

$$= \min_\pi d(A, \pi(B)) \tag{37}$$

$$= \min_{Y \in \phi_1^{k,l}(B)} d(A, Y) \tag{38}$$

where (36) is due to the fact that $\phi_i^{k,l}(B)=\{\pi(B): \pi$ is a block permutation$\}$, $\pi_1^-$ denotes the inverse permutation of $\pi_1$, and (37) is attributable to the fact that when $\pi$ ranges over all block permutations, so does $\pi_1^-\pi$. From (38), the symmetry condition in the case of $\phi_1^{k,l}$ then follows immediately.

Next we verify the symmetry condition in the case of $\phi_2^{k,l}$ and $d(x,y)=|x-y|^r$. Pick any $X \in \phi_2^{k,l}(A)$. With reference to the proof of Theorem 2, there exist a block permutation $\pi_1$ and a pattern image $P_1$ with pattern size k×l such that $$X = \pi_1(A+P_1).$$

In parallel with (38), one can verify that $$\inf_{Y \in \phi_2^{k,l}(B)} d(X, Y) = \inf_{Y \in \phi_2^{k,l}(B)} d(X-Y) \tag{39}$$

$$= \inf_{P,\pi} d(X - \pi(B+P)) = \tag{40}$$

$$\inf_{P,\pi} d(\pi_1(A+P_1) - \pi(B+P)) = \inf_{P,\pi} d(A + P_1 - (\pi_1^-(B+P)))$$

$$= \inf_{P,\pi} d(A + P_1 - \pi(B + P)) \tag{41}$$

$$= \inf_{P,\pi} d(A - \pi(B + P - P_1)) \tag{42}$$

$$= \inf_{Y \in \phi_2^{k,l}(B)} d(A, Y) \tag{43}$$

where (39) is due to the fact that $d(X,Y)$ depends only on $X-Y$ in the case of $d(x,y)=|x-y|^r$, (40) follows from the following equality $$\phi_2^{k,l}(B)=\{\pi(B+P):$$

$\pi$ is a block permutation and P is a pattern image with pattern size k×l$\}$ and (42) is attributable to the fact that a block permutation does not change a pattern image. Therefore, the symmetry condition is satisfied by $\phi_2^{k,l}$ and $d(x,y)=|x-y|^r$.

Since the number of block permutations is finite, there exist a block permutation $\pi^*$ and a sequence $\{P_i\}_{i=1}^\infty$ of pattern images with pattern size k×l such that $$d(A - \pi^*(B + P_i)) \to \inf_{Y \in \phi_2^{k,l}(B)} d(A, Y) \tag{44}$$

as $i \to \infty$. From (44), it follows that the sequence $\{P_i\}_{i=1}^\infty$ is bounded and hence contains a convergent subsequence $\{P_{i_j}\}_{j=1}^\infty$ with $P_{i_j} \to P^*$ as $j \to \infty$. This, together with (44), implies $$d(A - \pi^*(B + P^*)) = \inf_{Y \in \phi_2^{k,l}(B)} d(A, Y).$$

Thus the infimum in (2) is achievable for any $A,B \in \Omega$ in the case of $\phi_2^{k,l}$ and $d(x,y)=|x-y|^r$.

Finally, a similar argument can also be used to show that the symmetry condition is satisfied and the infimum in (2) is achievable as well in the case of $\phi_3^{k,l}$ and $d(x,y)=|x-y|^r$. This completes the proof of Corollary 1.

APPENDIX B

In this appendix, we prove Theorem 4. In view of Corollary 3, we have $$d_{\phi_2,r}^{k,l}(A,B) = \min\{E[|X^{k,l}-Y^{k,l}|^2] - |E[X^{k,l}] - E[Y^{k,l}]|^2 : P_{X^{k,l}} = Q_A^{k,l}, P_{Y^{k,l}} = Q_B^{k,l}, P_{X^{k,l}Y^{k,l}} \text{ is an } mn\text{-type}\} \tag{45}$$

and $$d_{\phi_2,r}^{k_1,l_1}(A,B) = \min\{E[|X^{k_1,l_1}-Y^{k_1,l_1}|^2] - E[Y^{k_1,l_1}]|^2 : P_{X^{k_1,l_1}} = Q_A^{k_1,l_1}, P_{Y^{k_1,l_1}} = Q_B^{k_1,l_1}, P_{X^{k_1,l_1}Y^{k_1,l_1}} \text{ is an } mn\text{-type}\}. \tag{46}$$

Pick any jointly distributed random variables $X^{k,l}$ and $Y^{k,l}$ each taking values over $\mathbb{R}^{kl}$ with $P_{X^{k,l}} = Q_A^{k,l}$ and $P_{Y^{k,l}} = Q_B^{k,l}$ such that $P_{X^{k,l}Y^{k,l}}$ is an mn-type. Think of $X^{k,l}$ as a random k×l-block. Further partition it into non-overlapping $k_1 \times l_1$-blocks such that $$X^{k,l} = \begin{pmatrix} X_{11} & \cdots & X_{1\frac{l}{l_1}} \\ \vdots & \ddots & \vdots \\ X_{\frac{k}{k_1}1} & \cdots & X_{\frac{kl}{k_1 l_1}} \end{pmatrix}$$

where $X_{ij}$, $$1 \le i \le \frac{k}{k_1}, 1 \le j \le \frac{l}{l_1},$$

is a random $k_1 \times l_1$-block. The same notation applies to $Y^{k,l}$ as well. Since both vertical and horizontal cyclic shifts mentioned in Example 6 are invoked for k×l-blocks crossing the boundaries of A, it follows from the definition of $Q_A^{k,l}$ that all random $k_1 \times l_1$ blocks $X_{ij}$, $$1 \le i \le \frac{k}{k_1}, 1 \le j \le \frac{l}{l_1},$$

have the same distribution, and in particular $$P_{X_{ij}} = Q_A^{k_1, l_1}. \qquad (47)$$

So are random $k_1 \times l_1$ blocks $Y_{ij}$, $$1 \le i \le \frac{k}{k_1}, 1 \le j \le \frac{l}{l_1},$$

and $$P_{Y_{ij}} = Q_B^{k_1, l_1}. \qquad (48)$$

Since $P_{X^{k,l} Y^{k,l}}$ is an mn-type, it follows that distributions $P_{X_{ij} Y_{ij}}$, $$1 \le i \le \frac{k}{k_1}, 1 \le j \le \frac{l}{l_1},$$

are an mn-type as well. Therefore, $$E[|X^{k,l} - Y^{k,l}|^2] - |E[X^{k,l}] - E[Y^{k,l}]|^2 = \qquad (49)$$

$$\frac{k_1 l_1}{kl} \sum_{i=1}^{k/k_1} \sum_{j=1}^{l/l_1} (E[|X_{i,j} - Y_{i,j}|^2] - |E[X_{i,j}] - E[Y_{i,j}]|^2) \overset{1)}{\ge}$$

$$\frac{k_1 l_1}{kl} \sum_{i=1}^{k/k_1} \sum_{j=1}^{l/l_1} d_{\phi_{2,\tau}^{k_1,l_1}}(A, B) = d_{\phi_{2,\tau}^{k_1,l_1}}(A, B)$$

where the inequality 1) follows from (46) to (48) and the fact that $P_{X_{ij} Y_{ij}}$ is an mn-type. Minimizing both sides of (49) over all random variables $X^{k,l}$ and $Y^{k,l}$ satisfying the constraints in the minimization of (45) yields $$d_{\phi_{2,\tau}^{k,l}}(A, B) \ge d_{\phi_{2,\tau}^{k_1,l_1}}(A, B).$$

This completes the proof of Theorem 4.

APPENDIX C

In this appendix, we prove Theorem 5. It suffices to prove (23) since (22) can be proved similarly and (24) and (25) follow from (22) and (23), respectively. For each $A \in \Omega$, partition $\tau(A)$ into non-overlapping $k \times l$-blocks, and write $\tau(A)$ as $$\tau(A) = \begin{pmatrix} \tau(A)_{11} & \cdots & \tau(A)_{1(nk)} \\ \vdots & \ddots & \vdots \\ \tau(A)_{\frac{m}{k}1} & \cdots & \tau(A)_{\frac{m}{k}(nk)} \end{pmatrix}$$

where $\tau(A)_{ij}$, $1 \le i \le m/k$, $1 \le j \le nk$, is a $k \times l$-block. In view of Example 6 and the definition of $Q_A^{k,l}$, it follows that $Q_A^{k,l}$ is also the empirical distribution of $k \times l$-blocks $\tau(A)_{ij}$, $1 \le i \le m/k$, $1 \le j \le nk$. The same notation and observation apply to $\tau(B)$ as well. Recall from (19) and (2) that $$d_{\phi_{2,\tau}^{k_1,l_1}}(A, B) = d_{\phi_2^{k,l}}(\tau(A), \tau(B)) \qquad (50)$$

$$= \inf_{X \in \phi_2^{k,l}(\tau(A)), Y \in \phi_2^{k,l}(\tau(B))} d(X, Y).$$

To show that $$d_{\phi_{2,\tau}^{k,l}}(A, B) \ge \text{the right side of } (23),$$

pick any $X \in \phi_2^{k,l}(\tau(A))$ and $Y \in \phi_2^{k,l}(\tau(B))$. The definition of $\phi_2^{k,l}$ implies that there exist two $k \times l$-block permutations $\pi_1$ and $\pi_2$, and two pattern images $P_1$ and $P_2$ with pattern size $k \times l$ such that $$X - P_1 = \begin{pmatrix} X_{11} & \cdots & X_{1(nk)} \\ \vdots & \ddots & \vdots \\ X_{\frac{m}{k}1} & \cdots & X_{\frac{m}{k}(nk)} \end{pmatrix} \qquad (51)$$

$$= \begin{pmatrix} \tau(A)_{\pi_1(11)} & \cdots & \tau(A)_{\pi_1(1(nk))} \\ \vdots & \ddots & \vdots \\ \tau(A)_{\pi_1(\frac{m}{k}1)} & \cdots & \tau(A)_{\pi_1(\frac{m}{k}(nk))} \end{pmatrix}$$

and $$Y - P_2 = \begin{pmatrix} Y_{11} & \cdots & Y_{1(nk)} \\ \vdots & \ddots & \vdots \\ Y_{\frac{m}{k}1} & \cdots & Y_{\frac{m}{k}(nk)} \end{pmatrix} \qquad (52)$$

$$= \begin{pmatrix} \tau(B)_{\pi_2(11)} & \cdots & \tau(B)_{\pi_2(1(nk))} \\ \vdots & \ddots & \vdots \\ \tau(B)_{\pi_2(\frac{m}{k}1)} & \cdots & \tau(B)_{\pi_2(\frac{m}{k}(nk))} \end{pmatrix}.$$

Consider now jointly distributed random variables $X$ and $Y$ each taking values over $\mathbb{R}^{kl}$ with joint distribution $P_{XY}$ being the empirical distribution of pairs $(X_{ij}, Y_{ij})$, $1 \le i \le m/k$, $1 \le j \le nk$. Clearly, $P_{XY}$ is an mn-type, and (51) and (52) further imply that $$P_X = Q_A^{k,l} \text{ and } P_Y = Q_B^{k,l}. \qquad (53)$$

Then it can be verified that $$d(X, Y) = \frac{1}{mn} \sum_{i=1}^{m/k} \sum_{j=1}^{nk} d(X_{ij} + a^{k,l}, Y_{ij} + b^{k,l}) = \qquad (54)$$

$$E[d(X + a^{k,l}, Y + b^{k,l})] \ge \text{the right side of } (23)$$

where $a^{k,l}$ and $b^{k,l}$ are the common patterns in $P_1$ and $P_2$, respectively, and the last inequality is due to (53) and the fact that $P_{XY}$ is an mn-type. Note that (54) is valid for any $X \in \phi_2^{k,l}(\tau(A))$ and $Y \in \phi_2^{k,l}(\tau(B))$. This, together with (50), implies $$d_{\phi_{2,\tau}^{k,l}}(A, B) \ge \text{the right side of } (23). \qquad (55)$$

To show the opposite of (55), pick up any $a^{k,l}, b^{k,l} \in \mathbb{R}^{kl}$ and any jointly distributed random variables $X$ and $Y$ each taking values over $\mathbb{R}^{kl}$ with $$P_X = Q_A^{k,l} \text{ and } P_Y = Q_B^{k,l} \qquad (56)$$

and $P_{XY}$ being an mn-type. Consider the set of all pairs of k×l-blocks (U,V) such that $P_{XY}(U,V)>0$. Since $P_{XY}$ is an mn-type, the set is finite. For each pair of k×l-blocks (U,V) in the set, list it $mnP_{XY}(U,V)$ times. Putting all listed pairs of k×l-blocks together, we get a list containing mn pairs of k×l-blocks:

$$(U_{ij}, V_{ij}), 1 \leq i \leq m/k, 1 \leq j \leq nk$$

where for convenience, we use double indices i,j to index the listed pairs of k×l-blocks. Let $$W = \begin{pmatrix} U_{11} & \cdots & U_{1(nk)} \\ \vdots & \ddots & \vdots \\ U_{\frac{m}{k}1} & \cdots & U_{\frac{m}{k}(nk)} \end{pmatrix} + P_1$$

and $$Z = \begin{pmatrix} V_{11} & \cdots & V_{1(nk)} \\ \vdots & \ddots & \vdots \\ V_{\frac{m}{k}1} & \cdots & V_{\frac{m}{k}(nk)} \end{pmatrix} + P_2$$

where $P_1$ and $P_2$ are two pattern images with common patterns given by $a^{k,l}$ and $b^{k,l}$, respectively. Then it follows from (56) that $W - P_1 \in \phi_1^{k,l}(A))$, and $Z - P_2 \in \phi_1^{k,l}(\tau(B))$, which in turn implies that $W \in \phi_2^{k,l}(\tau(A))$ and $Z \in \phi_2^{k,l}(\tau(B))$. To continue, one can then verify that $$E\left[d(X + a^{k,l}, Y + b^{k,l}) = \right.$$ (57)

$$\frac{1}{mn} \sum_{i=1}^{m/k} \sum_{j=1}^{nk} d(U_{ij} + a^{k,l}, V_{ij} + b^{k,l}) = d(W, Z) \geq d_{\phi_{2,\tau}^{k,l}}(A, B)$$

where the last inequality is due to (50). Minimizing both sides of (57) over all $a^{k,l}, b^{k,l} \in \mathbb{R}^{kl}$ and all jointly distributed random variables X and Y satisfying the constraints in the minimization of the right side of (23), we have $$d_{\phi_{2,\tau}^{k,l}}(A, B) \leq \text{the right side of (23).}$$

This completes the proof of Theorem 5.

A number of example embodiments have been described herein. However, it will be understood by persons skilled in the art that other variations and modifications may be made without departing from the scope of the embodiments as defined in the claims appended hereto.

The invention claimed is:

1. A method for determining a measure of perceptual similarity between a first digitized image having a first arrangement of pixels, each pixel in the first arrangement of pixels having a first pixel value, and a second digitized image having a second arrangement of pixels, each pixel in the second arrangement of pixels having a second pixel value, using a similarity distance determined by a computer module having a memory and a processor module comprising one or more processors, the method comprising:

operating the processor module to determine a first image array having M pixels by N pixels corresponding to the first arrangement of pixels, where M and N are positive integers;

operating the processor module to determine a second image array having M pixels by N pixels corresponding to the second arrangement of pixels;

operating the processor module to generate a first pixel group set comprising a first plurality of pixel group arrays based on the first image array wherein each pixel group array in the first plurality of pixel group arrays comprises at least two pixels;

operating the processor module to generate a second pixel group set comprising a second plurality of pixel group arrays based on the second image array wherein each pixel group array in the second plurality of pixel group arrays comprises at least two pixels;

operating the processor module to generate a plurality of pixel group pairs, each pixel group pair comprising a first comparison pixel group array from the first plurality of pixel group arrays in the first pixel group set and a second comparison pixel group array from the second plurality of pixel group arrays in the second pixel group set, wherein the plurality of pixel group pairs is generated by pairing each pixel group array in the first pixel group set with each and every pixel group array in the second pixel group set;

operating the processor module to associate each pixel group pair with a pixel group pair distortion, the pixel group pair distortion being a pixel-level distortion measure between the first comparison pixel group array and the second comparison pixel group array in that pixel group pair, wherein the pixel-level distortion measure is determined by determining, for each pixel in the first comparison pixel group array, a distortion measure based on that pixel and a corresponding pixel in the second comparison pixel group array, wherein each pixel in the first comparison pixel group array has one and only one corresponding pixel in the second comparison pixel group array and that corresponding pixel is different from the corresponding pixel of any other pixel in the first comparison pixel group array;

operating the processor module to determine the similarity distance between the first digitized image and the second digitized image based on the plurality of pixel group pair distortions;

operating the processor module to generate the first plurality of pixel group arrays by identifying a first plurality of pixel block arrays in the first image array, with each pixel block array having k pixels by l pixels, where k is a positive integer divisor of M with no remainder and l is a positive integer divisor of N with no remainder;

operating the processor module to generate the second plurality of pixel group arrays by identifying a second plurality of pixel block arrays in the second image array, with each pixel block array having k pixels by l pixels;

operating the processor module to determine the plurality of pixel group pairs such that i) for each pixel group pair in the plurality of pixel group pairs, the first comparison pixel group array in that pixel group pair corresponds to one of the pixel block arrays in the first plurality of pixel block arrays and the second comparison pixel group array in that pixel group pair corresponds to one of the pixel block arrays in the second plurality of pixel block arrays;

ii) each of the pixel block arrays in the first plurality of pixel block arrays corresponds to the first comparison pixel group array in a pixel group pair in the plurality of pixel group pairs, and each of the pixel block arrays in the second plurality of pixel block arrays corresponds to the second comparison pixel group array in a pixel group pair in the plurality of pixel group pairs;

operating the processor module to determine an average pixel group pair distortion based on the plurality of pixel group pair distortions; and operating the processor module to determine the similarity distance between the first digitized image and the second digitized image based on the average pixel group pair distortion;

wherein the average pixel group pair distortion is determined by operating the processor module to determine a plurality of first distinct arrangements of pixels, wherein each first distinct arrangement of pixels in the plurality of first distinct arrangements of pixels defines a first arrangement of pixels in one or more pixel block arrays in the first plurality of pixel block arrays;

operating the processor module to determine a first set of distinct pixel block arrays wherein the first set of distinct pixel block arrays comprises a first distinct pixel block array for each first distinct arrangement of pixels in the plurality of first distinct arrangements of pixels;

operating the processor module to assign to each distinct pixel block array in the first set of distinct pixel block arrays a first distribution weight, the first distribution weight corresponding to a number of pixel block arrays in the first plurality of pixel block arrays having the first distinct arrangement of pixels corresponding to that distinct pixel block arrays;

operating the processor module to generate the first pixel group set based on the first set of distinct pixel block arrays;

operating the processor module to determine a plurality of second distinct arrangements of pixels, wherein each second distinct arrangement of pixels in the plurality of second distinct arrangements of pixels defines a second arrangement of pixels in one or more pixel block arrays in the second plurality of pixel block arrays;

operating the processor module to determine a second set of distinct pixel block arrays, wherein the second set of distinct pixel block arrays comprises a second distinct pixel block array for each second distinct arrangement of pixels in the plurality of second distinct arrangements of pixels;

operating the processor module to assign to each distinct pixel block array in the second set of distinct pixel block arrays a second distribution weight, the second distribution weight corresponding to a number of pixel block arrays in the second plurality of pixel block arrays having the second distinct arrangement of pixels corresponding to that distinct pixel block arrays;

operating the processor module to generate the second pixel group set based on the second set of distinct pixel block arrays;

operating the processor module to determine the plurality of pixel group pairs such that
  i) for each pixel group pair in the plurality of pixel group pairs, the first comparison pixel group array in that pixel group pair corresponds to one of the first distinct pixel block arrays and the second comparison pixel group array in that pixel group pair corresponds to one of the second distinct pixel block arrays; and
  ii) each of the first distinct pixel block arrays corresponds to the first comparison pixel group array in a pixel group pair in the plurality of pixel group pairs, and each of the second distinct pixel block arrays corresponds to the second comparison pixel group array in a pixel group pair in the plurality of pixel group pairs;

operating the processor module to associate each pixel group pair with its distortion measure;

operating the processor module to determine a joint distribution weight for each pixel group pair, where the joint distribution weight is determined based on the first distribution weight corresponding to the first comparison pixel group array and the second distribution weight corresponding to the second comparison pixel group array; and operating the processor module to determine the average pixel group pair distortion based on the distortion measure and joint distribution weight for each pixel group pair.

2. The method as defined in claim 1 further comprising
operating the processor module to identify a first plurality of pixel arrays based on the first image array, each pixel array having a first number of pixels;
operating the processor module to generate a first pattern image array having the first number of pixels; and
operating the processor module to generate the first plurality of pixel group arrays by, for each pixel array in the first plurality of pixel arrays, superimposing the first pattern image array onto that pixel array such that the first plurality of pixel group arrays comprises a corresponding pixel group array for each pixel array in the first plurality of pixel arrays, wherein superimposing the first pattern image array onto that pixel array comprises a matrix addition of each array element in that pixel array with a corresponding array element in the first pattern image array.

3. The method as defined in claim 2 wherein the first pattern image array is generated by:
operating the processor module to identify a first plurality of pixel block arrays in the first image array with each pixel block array having k pixels by l pixels, where k is a positive integer divisor of M with no remainder and l is a positive integer divisor of N with no remainder;
operating the processor module to determine a first average pixel block array having k pixels by l pixels based on the first plurality of pixel block arrays, wherein each average pixel block array element in the first average pixel block array is determined based on an average value of an array element from each pixel block array of the first plurality of pixel block arrays having an array location corresponding to that average pixel block array element; and
operating the processor module to generate the first pattern image array based on the first average pixel block array.

4. The method as defined in claim 3 wherein the first pattern image array is k pixels by l pixels and corresponds to the first average pixel block array.

5. The method as defined in claim 3 wherein the first pattern image array comprises a plurality of pattern pixel block arrays, where each pattern pixel block array is k pixels by l pixels and each pattern pixel block corresponds to the first average pixel block array.

6. The method as defined in claim 1 further comprising
operating the processor module to identify a first plurality of pixel block arrays in the first image array, with each pixel block array having k pixels by l pixels, where k is a positive integer divisor of M with no remainder and l is a positive integer divisor of N with no remainder;

operating the processor module to identify a second plurality of pixel block arrays in the second image array, with each pixel block array having k pixels by l pixels;

configuring the processor module to generate a set of related image arrays from an original image array using a set mapping, the set mapping comprising a plurality of pixel block array permutations, such that, for each pixel block array permutation there is a corresponding image array in the set of related image arrays, this corresponding image array being obtained by applying that pixel block array permutation to the original image array, and each related image array in the set of related image arrays has at least as many pixels as the original image array;

operating the processor module to generate the first pixel group set using the set mapping, such that the first pixel group set is a first set of related digitized images having a first plurality of related digitized image arrays, each related digitized image array being generated by applying one of the pixel block array permutations to the first plurality of pixel block arrays such that each of the related digitized image arrays comprises an arrangement of the pixel block arrays in the first plurality of pixel block arrays and each of the related digitized image arrays has at least as many pixels as the first image array; and operating the processor module to generate the second pixel group set using the set mapping, such that the second pixel group set is a second set of related digitized images having a second plurality of related digitized image arrays, each related digitized image array being generated by applying one of the pixel block array permutations to the second plurality of pixel block arrays such that each of the related digitized image arrays comprises an arrangement of the pixel block arrays in the second plurality of pixel block arrays and each of the related digitized image arrays has at least as many pixels as the second image array.

7. The method as defined in claim 4 further comprising operating the processor module to determine the plurality of pixel group pairs such that i) for each pixel group pair in the plurality of pixel group pairs, the first comparison pixel group array in that pixel group pair corresponds to one of the related digitized image arrays in the first plurality of related digitized image arrays and the second comparison pixel group array in that pixel group pair corresponds to one of the related digitized image arrays in the second plurality of related digitized image arrays, and ii) each of the related digitized image arrays in the first plurality of related digitized image arrays corresponds to the first comparison pixel group array in a pixel group pair in the plurality of pixel group pairs, and each of the related digitized image arrays in the second plurality of related digitized image arrays corresponds to the second comparison pixel group array in a pixel group pair in the plurality of pixel group pairs;

operating the processor module to identify a lowest pixel group pair distortion based on the plurality of pixel group pair distortions; and operating the processor module to determine the similarity distance between the first digitized image and the second digitized image based on the lowest pixel group pair distortion.

8. A computer program product for use on a processor module with one or more processors to determine a measure of perceptual similarity between a first digitized image having a first arrangement of pixels, each pixel in the first arrangement of pixels having a first pixel value, and a second digitized image having a second arrangement of pixels, each pixel in the second arrangement of pixels having a second pixel value, using a similarity distance, the computer program product comprising:

a non-transitory recording medium; and instructions recorded on the recording medium, the instructions for configuring the processor module to:

determine a first image array having M pixels by N pixels corresponding to the first arrangement of pixels, where M and N are positive integers;

determine a second image array having M pixels by N pixels corresponding to the second arrangement of pixels;

generate a first pixel group set comprising a first plurality of pixel group arrays based on the first image array wherein each pixel group array in the first plurality of pixel group arrays comprises at least two pixels;

generate a second pixel group set comprising a second plurality of pixel group arrays based on the second image array wherein each pixel group array in the second plurality of pixel group arrays comprises at least two pixels;

generate a plurality of pixel group pairs, each pixel group pair comprising a first comparison pixel group array from the first plurality of pixel group arrays in the first pixel group set and a second comparison pixel group array from the second plurality of pixel group arrays in the second pixel group set, wherein the plurality of pixel group pairs is generated by pairing each pixel group array in the first pixel group set with each and every pixel group array in the second pixel group set;

associate each pixel group pair with a pixel group pair distortion, the pixel group pair distortion being a pixel-level distortion measure between the first comparison pixel group array and the second comparison pixel group array in that pixel group pair, wherein the pixel-level distortion measure is determined by determining, for each pixel in the first comparison pixel group array, a distortion measure based on that pixel and a corresponding pixel in the second comparison pixel group array, wherein each pixel in the first comparison pixel group array has one and only one corresponding pixel in the second comparison pixel group array and that corresponding pixel is different from the corresponding pixel of any other pixel in the first comparison pixel group array;

determine the similarity distance between the first digitized image and the second digitized image based on the plurality of pixel group pair distortions;

generate the first plurality of pixel group arrays by identifying a first plurality of pixel block arrays in the first image array, with each pixel block array having k pixels by l pixels, where k is a positive integer divisor of M with no remainder and l is a positive integer divisor of N with no remainder;

generate the second plurality of pixel group arrays by identifying a second plurality of pixel block arrays in the second image array, with each pixel block array having k pixels by l pixels;

determine the plurality of pixel group pairs such that
  i) for each pixel group pair in the plurality of pixel group pairs, the first comparison pixel group array in that pixel group pair corresponds to one of the pixel block arrays in the first plurality of pixel block arrays and the second comparison pixel group array in that pixel group pair corresponds to one of the pixel block arrays in the second plurality of pixel block arrays;
  ii) each of the pixel block arrays in the first plurality of pixel block arrays corresponds to the first comparison pixel group array in a pixel group pair in the plurality of pixel group pairs, and each of the pixel block arrays in the second plurality of pixel block arrays corresponds to the second comparison pixel group array in a pixel group pair in the plurality of pixel group pairs:

determine an average pixel group pair distortion based on the plurality of pixel group pair distortions; and determine the similarity distance between the first digitized image and the second digitized image based on the average pixel group pair distortion;

wherein the average pixel group pair distortion is determined by determining a plurality of first distinct arrangements of pixels, wherein each first distinct arrangement of pixels in the plurality of first distinct arrangements of pixels defines a first arrangement of pixels in one or more pixel block arrays in the first plurality of pixel block arrays;

determining a first set of distinct pixel block arrays wherein the first set of distinct pixel block arrays comprises a first distinct pixel block array for each first distinct arrangement of pixels in the plurality of first distinct arrangements of pixels;

assigning to each distinct pixel block array in the first set of distinct pixel block arrays a first distribution weight, the first distribution weight corresponding to a number of pixel block arrays in the first plurality of pixel block arrays having the first distinct arrangement of pixels corresponding to that distinct pixel block arrays;

generating the first pixel group set based on the first set of distinct pixel block arrays;

determining a plurality of second distinct arrangements of pixels, wherein each second distinct arrangement of pixels in the plurality of second distinct arrangements of pixels defines a second arrangement of pixels in one or more pixel block arrays in the second plurality of pixel block arrays;

determining a second set of distinct pixel block arrays, wherein the second set of distinct pixel block arrays comprises a second distinct pixel block array for each second distinct arrangement of pixels in the plurality of second distinct arrangements of pixels;

assigning to each distinct pixel block array in the second set of distinct pixel block arrays a second distribution weight, the second distribution weight corresponding to a number of pixel block arrays in the second plurality of pixel block arrays having the second distinct arrangement of pixels corresponding to that distinct pixel block arrays;

generating the second pixel group set based on the second set of distinct pixel block arrays;

determining the plurality of pixel group pairs such that
  i) for each pixel group pair in the plurality of pixel group pairs, the first comparison pixel group array in that pixel group pair corresponds to one of the first distinct pixel block arrays and the second comparison pixel group array in that pixel group pair corresponds to one of the second distinct pixel block arrays; and
  ii) each of the first distinct pixel block arrays corresponds to the first comparison pixel group array in a pixel group pair in the plurality of pixel group pairs, and each of the second distinct pixel block arrays corresponds to the second comparison pixel group array in a pixel group pair in the plurality of pixel group pairs;

associating each pixel group pair with its distortion measure;

determining a joint distribution weight for each pixel group pair, where the joint distribution weight is determined based on the first distribution weight corresponding to the first comparison pixel group array and the second distribution weight corresponding to the second comparison pixel group array; and determining the average pixel group pair distortion based on the distortion measure and joint distribution weight for each pixel group pair.

* * * * *